(12) United States Patent
Bar-Zohar et al.

(10) Patent No.: US 7,990,371 B2
(45) Date of Patent: Aug. 2, 2011

(54) METHOD FOR RECONSTRUCTING A THREE-DIMENSIONAL SURFACE OF AN OBJECT

(75) Inventors: Meir Bar-Zohar, Haifa (IL); Avi Yaron, Tenafly, NJ (US)

(73) Assignee: Visionsense Ltd., Petah Tikva (IL)

( * ) Notice: Subject to any disclaimer, the term of this patent is extended or adjusted under 35 U.S.C. 154(b) by 654 days.

(21) Appl. No.: 11/953,686

(22) Filed: Dec. 10, 2007

(65) Prior Publication Data

US 2009/0022393 A1    Jan. 22, 2009

Related U.S. Application Data

(63) Continuation of application No. PCT/IL2006/000443, filed on Apr. 6, 2006.

(60) Provisional application No. 60/669,136, filed on Apr. 7, 2005.

(51) Int. Cl.
  *G09G 5/00* (2006.01)
(52) U.S. Cl. .................... 345/204; 345/207; 345/212
(58) Field of Classification Search .......... 345/204–215, 345/690–699
See application file for complete search history.

(56) References Cited

U.S. PATENT DOCUMENTS

| | | | |
|---|---|---|---|
| 6,411,327 B1 | 6/2002 | Kweon et al. | |
| 6,624,935 B2 | 9/2003 | Weissman et al. | |
| 2005/0264558 A1 | 12/2005 | Vesely et al. | |
| 2005/0275914 A1 | 12/2005 | Vesely et al. | |
| 2009/0027337 A1* | 1/2009 | Hildreth | 345/158 |
| 2009/0079813 A1* | 3/2009 | Hildreth | 348/14.03 |

* cited by examiner

*Primary Examiner* — Vijay Shankar
(74) *Attorney, Agent, or Firm* — Merchant & Gould P.C.

(57) ABSTRACT

Method for determining a disparity value of a disparity of each of a plurality of points on an object, the method including the procedures of detecting by a single image detector, a first image of the object through a first aperture, and a second image of the object through a second aperture, correcting the distortion of the first image, and the distortion of the second image, by applying an image distortion correction model to the first image and to the second image, respectively, thereby producing a first distortion-corrected image and a second distortion-corrected image, respectively, for each of a plurality of pixels in at least a portion of the first distortion-corrected image representing a selected one of the points, identifying a matching pixel in the second distortion-corrected image, and determining the disparity value according to the coordinates of each of the pixels and of the respective matching pixel.

39 Claims, 20 Drawing Sheets

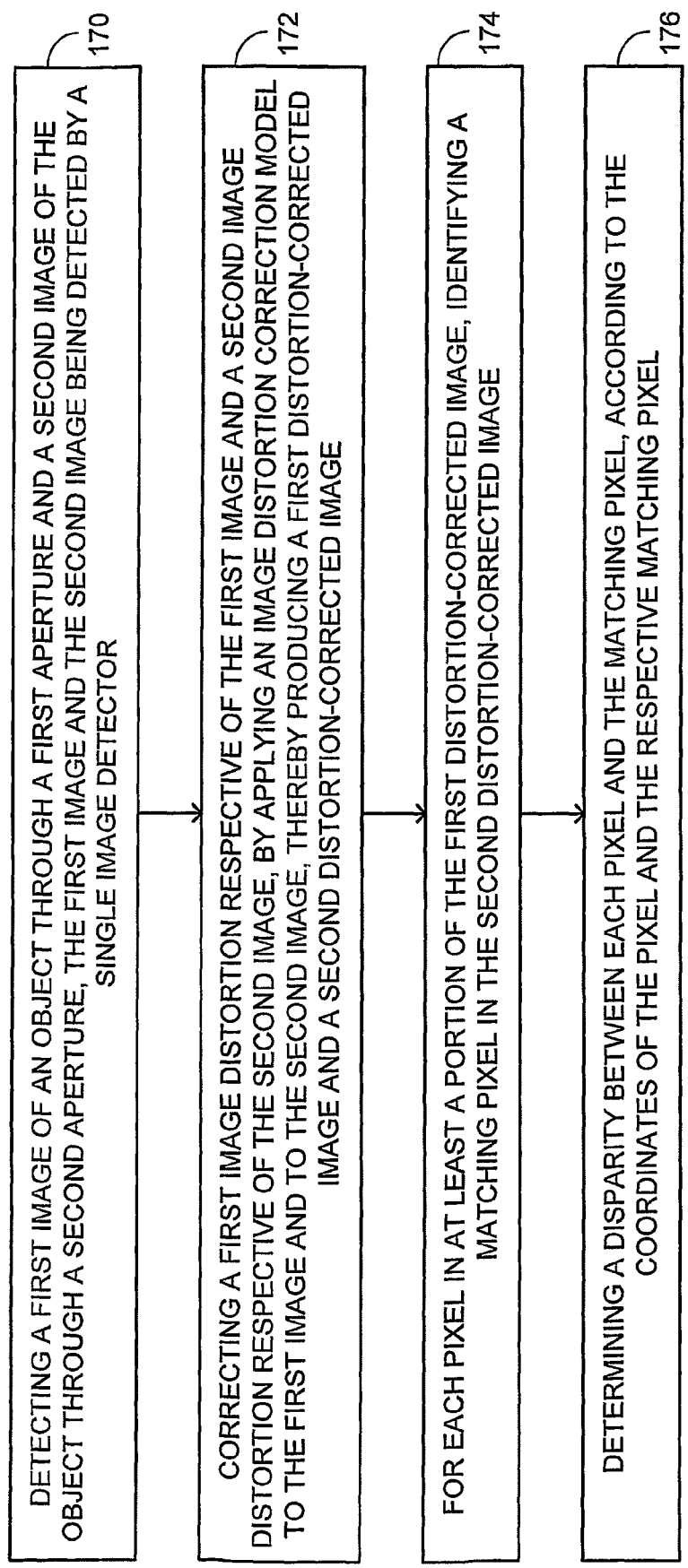

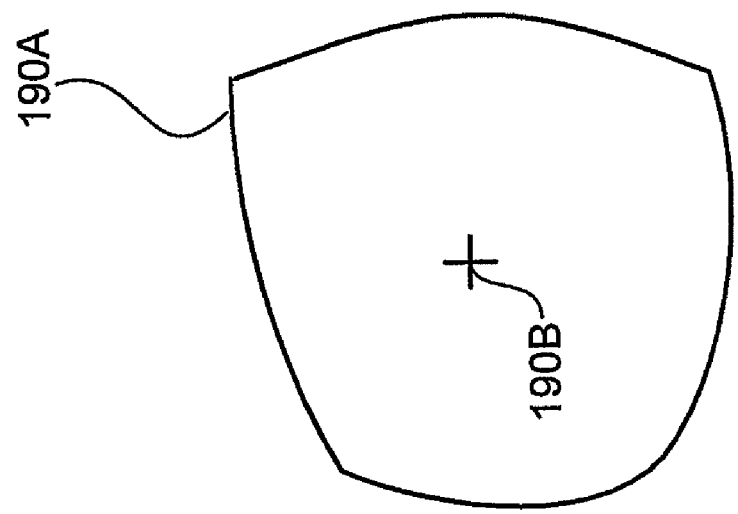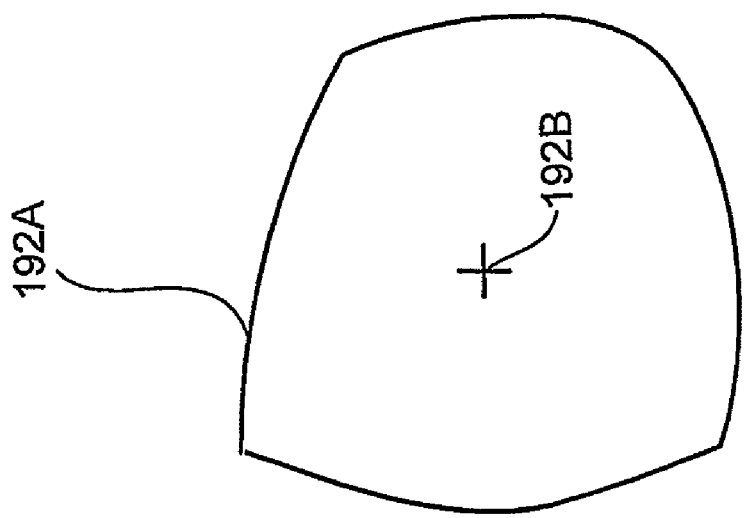
FIG. 5A

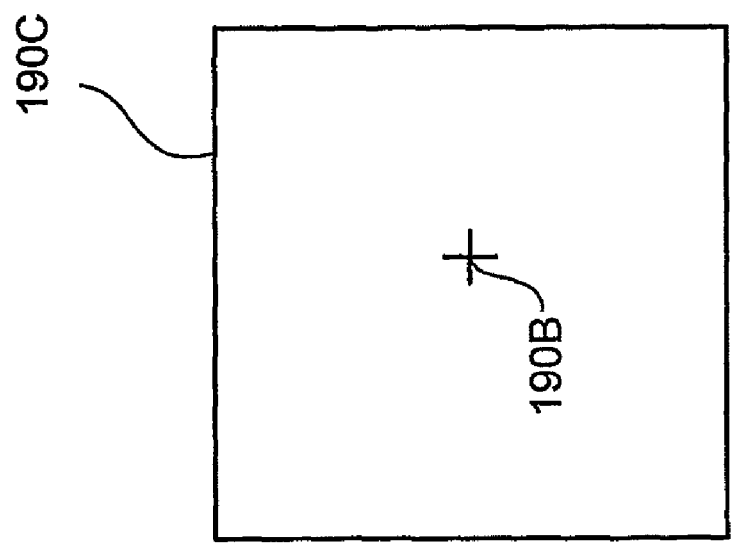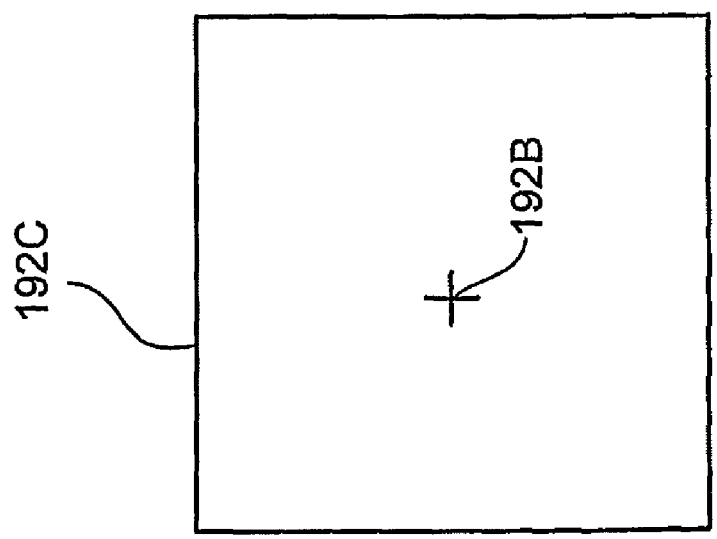
FIG. 5B

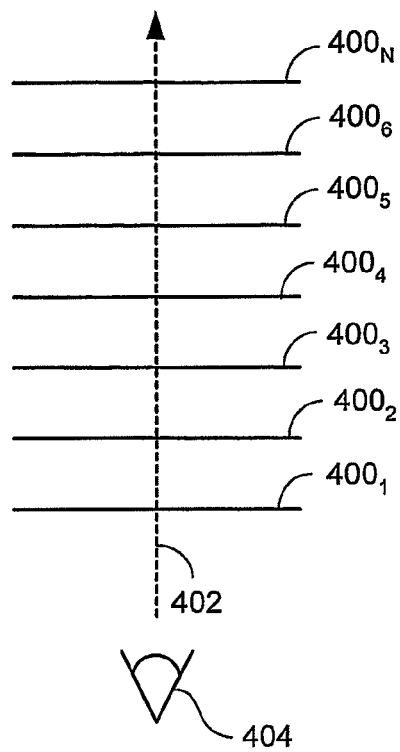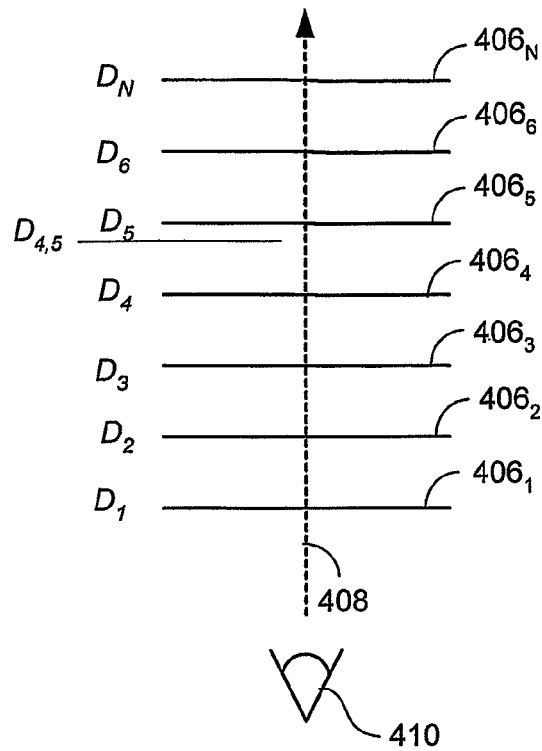
FIG. 16A    FIG. 16B
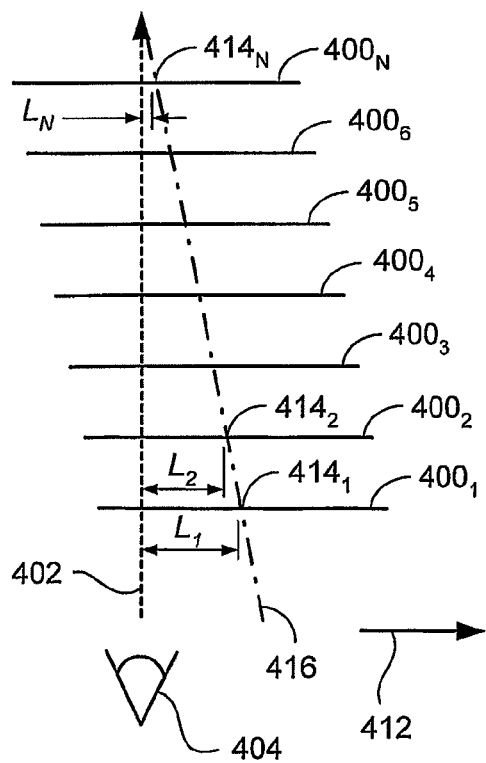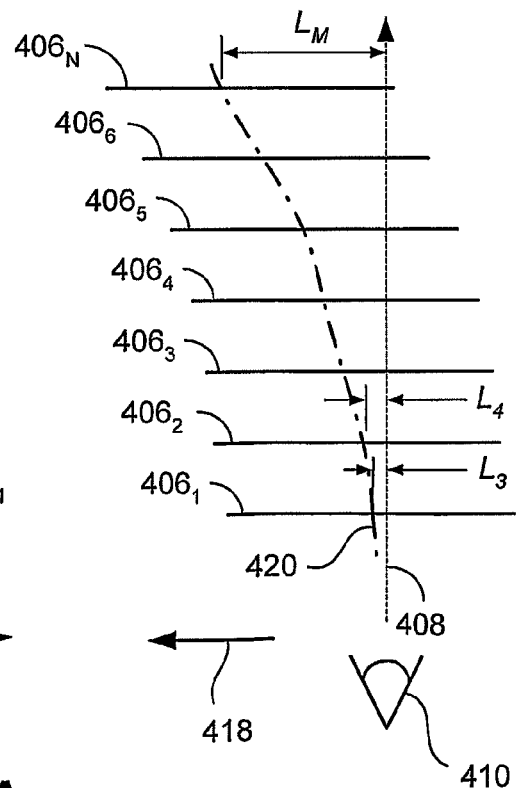
FIG. 17A    FIG. 17B

METHOD FOR RECONSTRUCTING A THREE-DIMENSIONAL SURFACE OF AN OBJECT

FIELD OF THE DISCLOSED TECHNIQUE

The disclosed technique relates to stereo vision algorithms in general, and to methods for reconstructing a three-dimensional surface of an object, in particular.

BACKGROUND OF THE DISCLOSED TECHNIQUE

A viewer gains a strong sense of depth by fusing the images recorded by the two eyes, and exploiting the difference (i.e., disparity) between these two images. Each eye detects a different image of an object, because the two eyes are separated by a certain distance (i.e., interpupilar distance—IPD), and furthermore, each eye observes the object from a different viewing point. The brain provides a stereoscopic perception to the viewer, by processing the two images detected by the two eyes. The ability of the brain to provide this stereoscopic perception decreases as the ratio between the IPD and the distance between the viewer and the object decreases, such that beyond a certain distance (i.e., about 600 meters) the viewer is unable to perceive the depth in the object.

Since the eyes of the viewer are separated along a horizontal line, there is a disparity between the two images along this horizontal line. The brain provides a perception of depth of a certain point of the object, according to the disparity associated with this point. Optical devices for providing stereoscopic perception are known in the art. Such devices include two image detectors, a display, and a processor connected to the image detectors and to the display. Since the image detectors are separated by a certain amount, each detects a different image of an object, from a different viewing point. The processor polarizes the right image and the left image at different polarization states, and provides these two polarized images to the display, for the display to display these two images side by side.

If a viewer wears a stereoscopic pair of glasses having two polarizers of the appropriates polarization states, the right eye detects only the right image displayed by the display, and the left eye only the left one, and in this manner the viewer gains a stereoscopic perception. This optical device is employed in medical devices for performing minimally invasive surgery (MIS), such as an endoscope, to provide the viewer a stereoscopic perception of an image of the inner wall of an organ (e.g., colon). The processor determines the depth of every point of the current image of the organ, according to the disparity associated with that point, and in case of a tumor in the colon, determines the volume of the tumor according to the depth data.

Reference is now made to FIG. 1, which is a schematic illustration of an optical device for providing a stereoscopic perception of an image of an object, generally referenced 50, as known in the art. Optical device 50 includes two lenses 52 and 54, two charge-coupled devices (CCD) 56 and 58, a processor 60 and a display 62. Processor 60 is connected with CCD's 56 and 58 and with display 62. Lenses 52 and 54 are located in front of CCD's 56 and 58, respectively. An object 64 is located in front of lenses 52 and 54. Each of the CCD's 56 and 58 is located behind lenses 52 and 54, respectively, at a focal length f respective of lenses 52 and 54.

The distance between object 64 and each of the lenses 52 and 54, in a direction parallel to an optical axis (not shown) respective of each of lenses 52 and 54, is referenced Z (i.e., depth). CCD's 56 and 58 receive light beams 66 and 68, respectively, from a point 70 on object 64, through lenses 52 and 54, respectively. Light beams 66 and 68 strike CCD's 56 and 58, respectively, to form projections 72 and 74 of point 70, respectively.

Projection 74 of point 70 on CCD 58 is represented by a projection 76 of the same point 70, on CCD 56. The distance between projections 72 and 76 of point 70 on CCD 56, along an epipolar line (not shown) on CCD 56, is referenced $\delta$ (i.e., disparity). Processor 60 determines the values of $\delta$ respective of different points on object 64, by processing the two images (not shown) detected by CCD's 56 and 58. Processor 60 determines the depth Z of each of these points, according to the respective value of $\delta$. Processor 60 produces a right image and a left image polarized at different polarization states, for display 62 to display the right polarized image and the left polarized image. A viewer who wears a stereoscopic pair of glasses having a pair of appropriate polarizers, gains a stereoscopic perception, when viewing the display. When the viewer selects a point on the image by clicking the point by a mouse, processor 60 determines the depth of that point according to the disparity associated with that point, and display 62 displays the value of that depth.

U.S. Pat. No. 6,411,327 B1 issued to Kweon et al., and entitled "Stereo Camera System for Obtaining a Stereo Image of an Object, and System and Method for Measuring Distance Between the Stereo Camera System and the Object Using the Stereo Image", is directed to a system for producing a stereo image and determining a disparity between the stereo images. The system includes a camera and a biprism. The camera is in form of a CCD. The biprism is in shape of a delta having a first incline, a second incline and a flat edge. The biprism is placed between an object and the camera, such that the first incline and the second incline obliquely face a lens of the camera. Furthermore, an edge of the biprism at which the first incline and the second incline meet, passes through an optical axis of the lens.

A real point located in front of the flat edge corresponds to a first imaginary point. A first distance between the real point and the first imaginary point along a plane parallel with the flat edge, depends on a distance between the real point and a center of the biprism, and on a first displacement angle of the biprism. The real point also corresponds to a second imaginary point, where a second distance there between along the plane, depends on the distance between the real point and the center of the biprism, and on a second displacement angle of the biprism.

The real point corresponds to the first imaginary point and to the second imaginary point, and in a frame of picture obtained in a single exposure, two images (i.e., stereo images) of the object are produced. A third distance (i.e., disparity), between two homologous points in the stereo images corresponding to the real point, is proportional to a sum of the first distance and the second distance. An object distance between the system and the object can be calculated from the third distance.

U.S. Pat. No. 6,624,935 B2 issued to Weissman et al., and entitled "Single-axis Stereoscopic Video Imaging System with Centering Capability", is directed to a system for producing a stereoscopic image of an object. The system includes an imaging device, a single-axis optical system and an electronic shutter. The electronic shutter is located between the single-axis optical system and the imaging device.

When controlled by an appropriate electronic signal, the electronic shutter alternately blocks light transmission through each side of an appropriate aperture of the single-axis optical system. A right-eye image is generated when a left side of the electronic shutter blocks light transmission, and a left-eye image is generated when a right side of the electronic shutter blocks light transmission.

SUMMARY OF THE DISCLOSED TECHNIQUE

It is an object of the disclosed technique to provide a novel method for determining the disparity of a plurality of points on an object, according to a stereoscopic color image pair of that object.

In accordance with an aspect of the disclosed technique, there is thus provided a method for determining the disparity of each of a plurality of points on an object. The method includes the procedure of detecting by a single image detector, a first image of the object through a first aperture, and a second image of the object through a second aperture. The method further includes the procedure of correcting the distortion of the first image, and the distortion of the second image, by applying an image distortion correction model to the first image and to the second image, respectively, thereby producing a first distortion-corrected image and a second distortion-corrected image, respectively. The method further includes the procedures of identifying a matching pixel in the second distortion-corrected image, for each of a plurality of pixels in at least a portion of the first distortion-corrected image, said pixels representing a selected one of the points, and determining the disparity according to coordinates of each of the pixels and the respective the matching pixel.

In accordance with another aspect of the disclosed technique, there is thus provided a method for determining a disparity of a point on an object being detected by at least one image detector, according to a stereoscopic color image pair of the object, the point being represented by a plurality of pixels in each image of the stereoscopic color image pair. The method includes the procedures of producing a first set of distortion-corrected color images respective of each of a plurality of colors of the image detector, producing a second set of distortion-corrected color images respective of the colors, and producing a set of modified images.

The method further includes the procedures of determining a distance range between the object and the image detector, and determining a disparity range respective of the stereoscopic color image pair, according to the distance range. The method further includes the procedures of defining a window of a predetermined size around an actual pixel in each of the distortion-corrected color images of the first set of distortion-corrected color images, and defining a plurality of windows around a plurality of central pixels in each of the modified images.

The method further includes the procedures of determining a plurality of color intensity distribution differences between the color intensity distribution of the window and each of the windows, and selecting a minimum color intensity distribution difference among the color intensity distribution differences. The method further includes the procedures of selecting a central pixel among the central pixels, as a pixel which matches the actual pixel, and determining the disparity according to a difference between the coordinates of the actual pixel and of the selected central pixel.

The first set of distortion-corrected color images is produced by applying an image distortion correction model to a first distorted image among the stereoscopic color image pair. The second set of distortion-corrected color images is produced by applying the image distortion correction model to a second distorted image among the stereoscopic color image pair. The modified images are produced by determining at least one interpolated pixel between every two adjacent actual pixels in each row of each of the distortion-corrected color images of the second set of distortion-corrected color images. The size of each of the windows is the same as the predetermined size. The central pixels have the same row indices respective of the row of the actual pixel, and a plurality of column indices within the disparity range from the column index of the actual pixel. The central pixel corresponds to a selected window among the windows, wherein the selected window corresponds to the minimum color intensity distribution difference.

In accordance with a further aspect of the disclosed technique, there is thus provided a method for determining a disparity of a point on an object being detected by at least one image detector, according to a stereoscopic color image pair of the object, the point being represented by a plurality of pixels in each image of the stereoscopic color image pair. The method includes the procedures of producing a first set of distortion-corrected color images respective of each of a plurality of colors of the image detector, producing a second set of distortion-corrected color images respective of the colors, and applying a first filter to each of the distortion-corrected color images in the first set and in the second set.

The method further includes the procedures of producing a set of modified images, determining a distance range between the object and the image detector, and determining a disparity range respective of the stereoscopic color image pair, according to the distance range. The method further includes the procedures of defining a window of a predetermined size around an actual pixel in each of the distortion-corrected color images of the first set of distortion-corrected color images, and defining a plurality of windows around a plurality of central pixels in each of the modified images.

The method further includes the procedures of determining a linear function of an absolute value of vectorial gradients, of another absolute value of vectorial gradient differences, and of the absolute value of the difference between color image intensities, respective of the window and of respective ones of each of the windows. The method further includes the procedures of selecting a minimum value among the linear functions, selecting a central pixel among the central pixels, as a pixel which matches the actual pixel, and determining the disparity according to a difference between the coordinates of the actual pixel and of the selected central pixel.

The first set of distortion-corrected color images is produced by applying an image distortion correction model to a first distorted image among the stereoscopic color image pair. The second set of distortion-corrected color images is produced by applying the image distortion correction model to a second distorted image among the stereoscopic color image pair. The set of modified images is produced by determining at least one interpolated pixel between every two adjacent actual pixels in each row of each of the filtered distortion-corrected color images of the second set of distortion-corrected color images. The size of each of the windows is the same as the predetermined size. The central pixels have the same row indices respective of the row of the actual pixel, and a plurality of column indices within the disparity range from the column index of the actual pixel. The central pixel corresponds to a selected window among the windows, wherein the selected window corresponds to the selected minimum value.

In accordance with another aspect of the disclosed technique, there is thus provided a method for determining a center of distortion of a first distorted image and a second distorted image of a target. The method includes the procedures of determining two-dimensional coordinates of a plurality of known points of the target, in the first distorted image and in the second distorted image, and correcting two-dimensional locations of the two-dimensional coordinates, in the first distorted image and in the second distorted image.

The method further includes the procedures of determining a first transformation model and a second transformation model, determining a first set of calculated points and a second set of calculated points, and determining a first set of distorted calculated points and a second set of distorted calculated points. The method further includes the procedures of determining a first set of distances between respective points in the first distorted image and in the first set of distorted calculated points, and determining a second set of distances between respective points in the second distorted image and in the second set of distorted calculated points. The method further includes the procedure of selecting one of the auxiliary centers as the center of distortion, wherein the auxiliary center corresponds to a minimum characteristic value respective of the first set of distances and the second set of distances.

The two-dimensional locations of the two-dimensional coordinates, in the first distorted image and in the second distorted image, are corrected according to an image distortion correction model, whose origin is selected as an image detector center. The first transformation model and the second transformation model are determined, according to respective ones of the corrected two-dimensional locations, and according to three-dimensional coordinates of the known points.

The first set of calculated points and the second set of calculated points are determined, by applying the first transformation model and the second transformation model, respectively, to the three-dimensional coordinates. The first set of distorted calculated points and the second set of distorted calculated points are determined, by applying an image distortion model to the first set of calculated points and to the second set of calculated points, respectively, about a set of auxiliary centers different than the image detector center.

In accordance with a further aspect of the disclosed technique, there is thus provided an image distortion correction model for correcting an image distortion in a first distorted image, and in a second distorted image of a stereoscopic image pair of an object being detected by an optical device. The image distortion correction model is defined by, $$f_c^X(X, Y) = a_{00} + a_{01}x' + a_{20}x'^2 + a_{30}x'^3 + a_{50}x'^5 +$$
$$a_{02}y'^2 + a_{12}x'y'^2 + a_{22}x'^2y'^2 + a_{32}x'^3y'^2 + a_{52}x'^5y'^2$$

in a horizontal direction, and by, $$f_c^Y(X, Y) = c_{01}y' + c_{11}x'y' + c_{21}x'^2y' + c_{30}y'^3 +$$
$$c_{13}x'y'^3 + + c_{23}x'^2y'^3 + c_{05}y'^5 + c_{15}x'y'^5 + c_{25}x'^2y'^5$$

in a vertical direction, wherein x' is defined by, $$x' = \frac{(x - x_0)}{x_{max}}$$

and y' is defined by, $$y' = \frac{(y - y_0)}{y_{max}}$$

x and y are the indices of a current pixel in each of the first distorted image and the second distorted image. $x_0$ and $y_0$ define a center of distortion of the first distorted image and of the second distorted image. $x_{max}$ is a distance along the horizontal direction, between a center of a substantially rectangular undistorted calculated image and a side of the substantially rectangular undistorted calculated image. The substantially rectangular undistorted calculated image is respective of the optical device. $y_{max}$ is another distance along the vertical direction, between the center and another side of the substantially rectangular undistorted calculated image.

The parameters $a_{00}$, $a_{01}$, $a_{20}$, $a_{30}$, $a_{50}$, $a_{02}$, $a_{12}$, $a_{22}$, $a_{32}$, $a_{52}$, $c_{01}$, $c_{11}$, $c_{21}$, $c_{30}$, $c_{13}$, $c_{23}$, $c_{05}$, $c_{15}$ and $c_{25}$ are a set of coefficients which are determined by solving a set of simultaneous Equations for a set of points, wherein each point has the indices x and y, and the points are respective of a target being detected by the optical device. The coordinates of these points are known in a global coordinate system.

$f_c^X(X,Y)$ designates a horizontal distortion of a point among these points, the horizontal distortion being along the horizontal direction. $f_c^Y(X,Y)$ designates a vertical distortion of the point along the vertical direction. For determining this set of coefficients, $x_0$ and $y_0$ are set to an image center of the substantially rectangular undistorted calculated image.

In accordance with another aspect of the disclosed technique, there is thus provided a method for providing a stereoscopic perception of a scene for a user, such that the vision associated complexions experienced by the user are minimized. The method includes the procedures of determining a shift between a pair of stereoscopic images to be displayed to the user, receiving another pair of stereoscopic images shifted relative to one another by a current shift, shifting the other pair of stereoscopic images by the difference between the determined shift and the current shift, and displaying the other pair of shifted stereoscopic images. The shift is associated with stereoscopic viewing characteristics of the user. The other pair of stereoscopic images is respective of the scene.

In accordance with a further aspect of the disclosed technique, there is thus provided a method for varying a local disparity between each depth plane pair of each of a plurality of depth plane pairs. Each depth plane of the depth plane pairs defines the depth of a given set of pixels in a first image and a second image of a stereoscopic image pair of an object, relative to an image detector detecting the stereoscopic image pair. The method includes the procedures of determining a pixel depth for each of the pixels, in the first image and in the second image, from a three-dimensional reconstruction of a volume represented by the stereoscopic image pair, and determining a plurality of depth planes at a plurality of different plane depths, for the first image and the second image.

The method further includes the procedures of associating each of the depth planes from the first image, with a corresponding depth plane from the second image, at the same plane depth, thereby determining a plurality of depth plane pairs, and associating each of the pixels with a respective one of the depth plane pairs, according to a respective one of the pixel depths, and according to a respective one of the plane depths. The method includes a further procedure of varying the local disparity by moving every pair of the depth plane pairs, relative to one another, in a direction substantially perpendicular to a line of sight respective of a respective one of the eyes of an observer. Each of the depth planes is substantially perpendicular to a respective line of sight.

BRIEF DESCRIPTION OF THE DRAWINGS

The disclosed technique will be understood and appreciated more fully from the following detailed description taken in conjunction with the drawings in which:

FIG. 4 is a schematic illustration of a method for determining the disparity of a pair of matching pixels in a right image and a left image of an object, operative in accordance with another embodiment of the disclosed technique;

FIG. 5A is a schematic illustration of a right distorted image and a left distorted image of an object, detected by the image detector of the optical device of FIG. 2;

FIG. 5B is a schematic illustration of a right distortion-corrected image and a left distortion-corrected image of the right distorted image and the left distorted image of FIG. 5A, respectively;

FIG. 16A is a schematic illustration of a first set of depth plans of a first view image of a stereoscopic image pair of an object observed by a first eye of an observer;

FIG. 16B is a schematic illustration of a second set of depth plans of a second view image of the stereoscopic image pair, observed by a second eye of the observer;

FIG. 17A is a schematic illustration of the depth planes of the first set of depth planes of FIG. 16A, displaced in a first direction relative a first line of sight of the first eye, constructed and operative according to a further embodiment of the disclosed technique;

FIG. 17B is a schematic illustration of the depth planes of the second set of depth planes of FIG. 16B, displaced in a second direction, relative to a second line of sight of the second eye, constructed and operative according to another embodiment of the disclosed technique.

DETAILED DESCRIPTION OF THE EMBODIMENTS

The disclosed technique overcomes the disadvantages of the prior art by providing methods to determine the disparity of a certain point on an object in a pair of stereoscopic color images of the object. According to a first method, the disparity at which the color intensity distribution difference between a window in a right image of the pair of images, and a plurality of windows in a left image, is a minimum, is selected as the disparity of that point. According to a second method, the disparity of a point on the object is determined, by determining and selecting a minimum of a certain function, which relates a pixel representative of that point, in the right image, to a matching pixel in the left image. This function is a linear function of the absolute values of the vectorial gradient of a pixel in the right image, and of a pixel in the left image, of the vectorial gradient difference between the pixel in the right image and of the pixel in the left image, and of the difference between the color image intensity of the pixel in the right image, and of the pixel in the left image. The depth value of every point on the object can be determined according to the respective disparity value, and superposed on an image of the object which is displayed on a display.

Each method takes into account the different colors of the color mosaic of an image detector. Furthermore, each method takes into account a plurality of interpolated pixels determined between every two adjacent pixels, thereby increasing the accuracy of the disparity value. The disparity values are determined for pairs of distortion-corrected color images, thereby obtaining a more accurate disparity value than in the case of distorted color image pairs. The disclosed technique provides a method for determining an image distortion correction model, and a method for determining the center of distortion for the right image and the left image. The distortions in each of the right image and left image are corrected about this center of distortion, before determining the disparity value.

The term "3D coordinate system" herein below, refers to a three-dimensional coordinate system respective of an object. The term "2D coordinate system" herein below, refers to a two-dimensional coordinate system respective of an image of the object. The term "disparity" herein below, refers to a difference between the coordinates of projections of a point on the object, in a right image of the object and a left image thereof.

Figure 1:
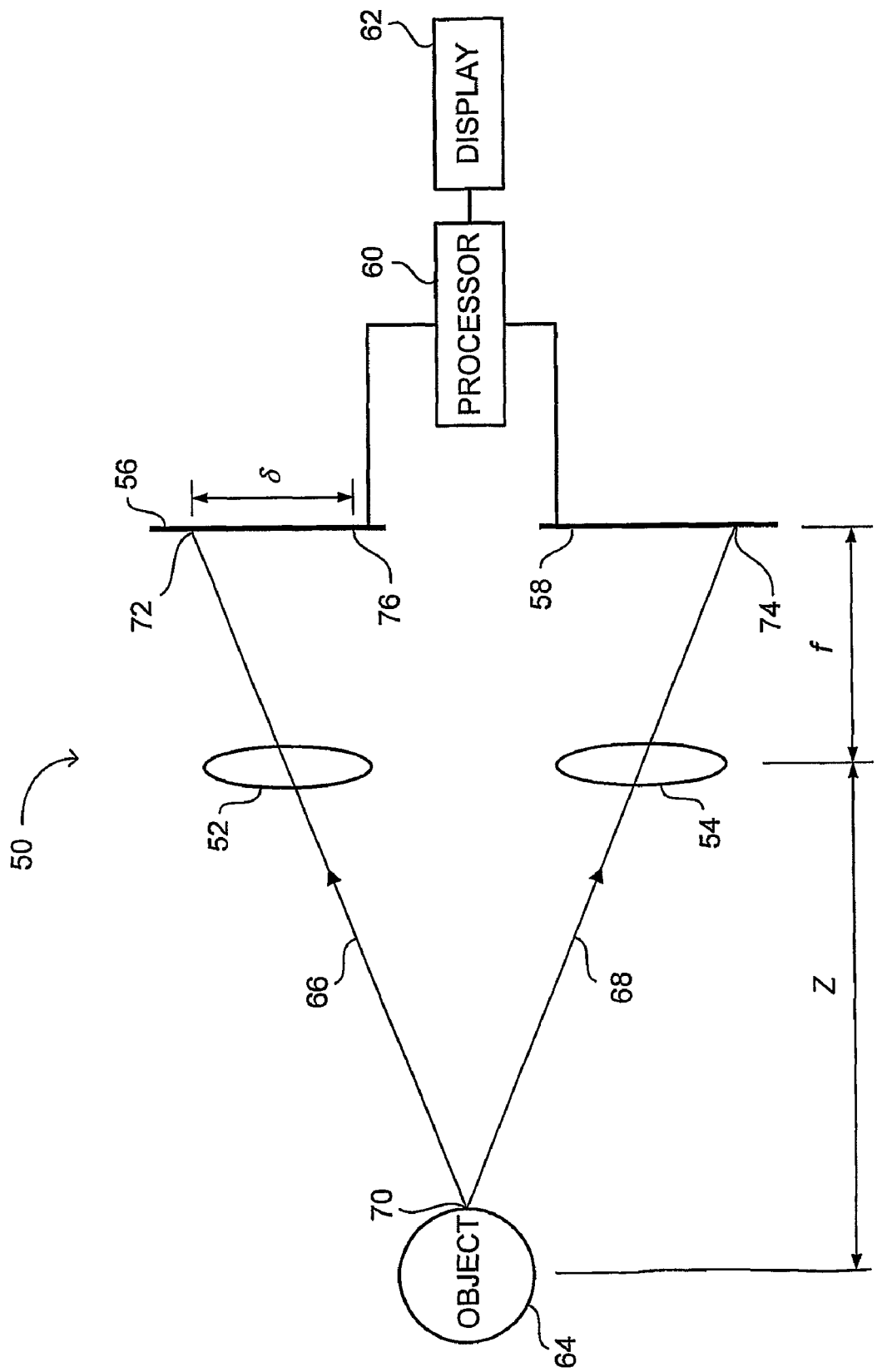
FIG. 1 is a schematic illustration of an optical device for providing a stereoscopic perception of an image of an object, as known in the art.
Figure 2:
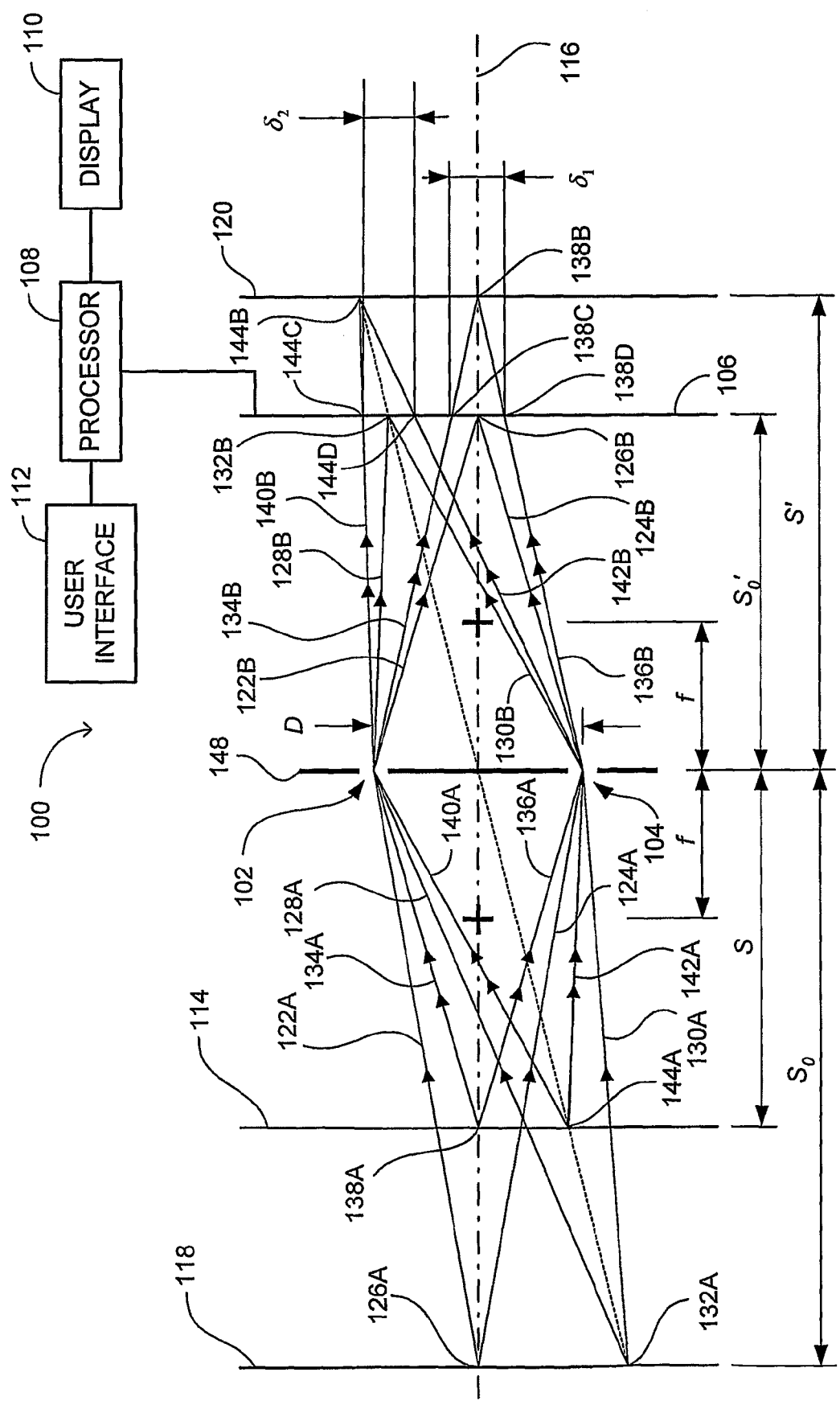
FIG. 2 is a schematic illustration of an optical device for providing a stereoscopic perception of an image of an object, constructed and operative in accordance with an embodiment of the disclosed technique.
Figure 3:
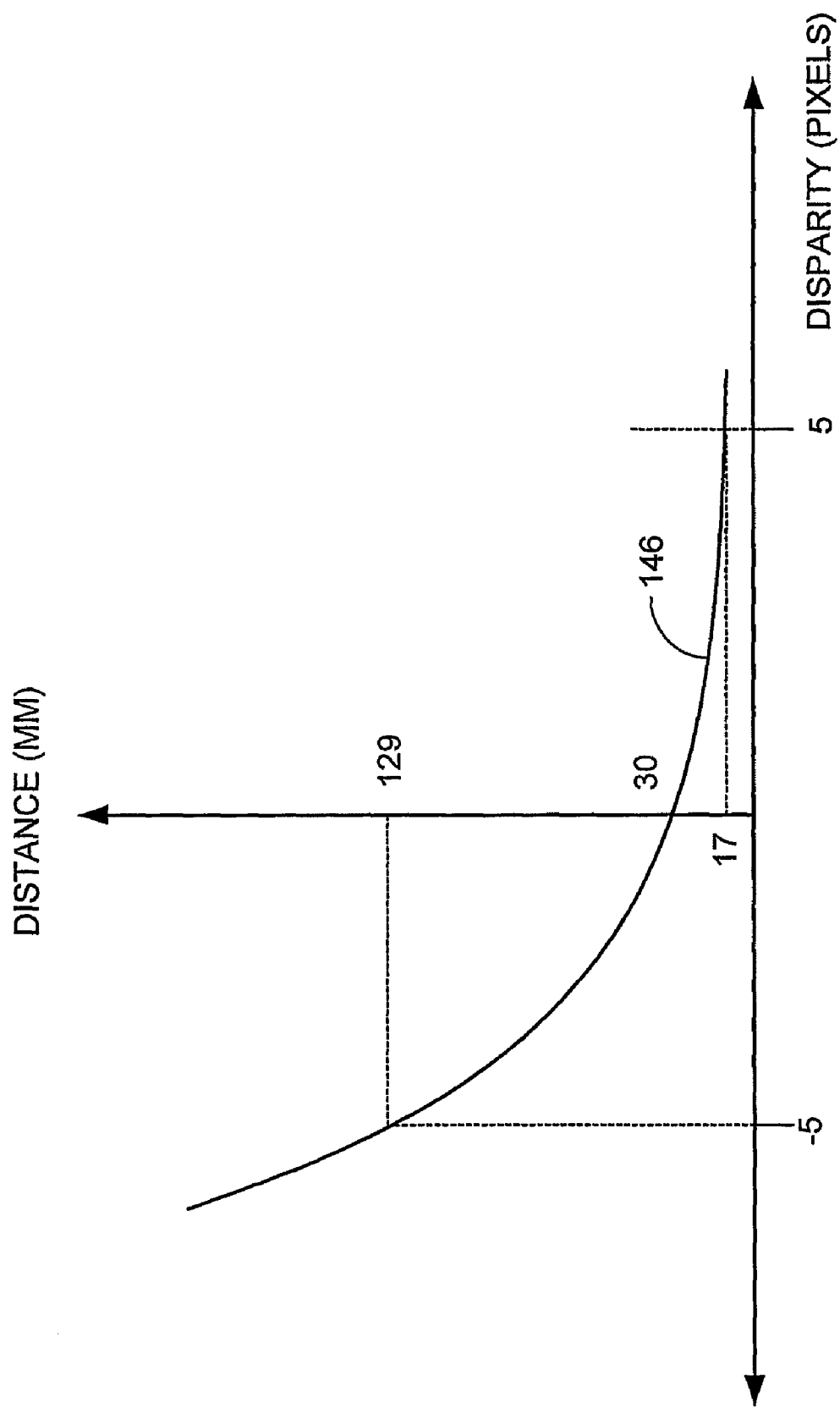
FIG. 3 is a schematic illustration of a plot of the variation of distance of an object from the image detector of the optical device of FIG. 2, as a function of the disparity between a right image and a left image of the object.

Reference is now made to FIGS. 2 and 3. FIG. 2 is a schematic illustration of an optical device for providing a stereoscopic perception of an image of an object, constructed and operative in accordance with an embodiment of the disclosed technique. FIG. 3 is a schematic illustration of a plot of the variation of distance of an object from the image detector of the optical device of FIG. 2, as a function of the disparity between a right image and a left image of the object of FIG. 2, described by a curve generally referenced 146.

Optical device 100 includes apertures 102 and 104, an image detector, a processor 108, a display 110 and a user interface 112. Processor 108 is coupled with the image detector, display 110 and with user interface 112.

Apertures 102 and 104 in combination with an optical assembly (not shown) are schematically represented by an optical assembly principle plane 148, located between a zero disparity object plane 118 and a zero disparity image plane 106. A near object (not shown) can be located on a near object plane 114 located between zero disparity object plane 118 and optical assembly principle plane 148. A far object (not shown) can be located on a far object plane (not shown) located in front of zero disparity object plane 118. Each of zero disparity object plane 118, the near object plane and the far object plane, is representative of a two-dimensional section of an object (not shown).

An image of a point of near object plane 114 on a near object image plane 120 has substantially a zero disparity. An image of a point of the far object plane on a far object image plane (not shown) has substantially a zero disparity. An image detector (not shown) is located on a zero disparity image plane 106 located behind optical assembly principle plane 148. Near object image plane 120 is located behind zero disparity image plane 106. The far object image plane is located between optical assembly principle plane 148 and zero disparity image plane 106.

An image of a point of zero disparity object plane 118 on zero disparity image plane 106 (i.e., the point image detected by the image detector), has substantially a zero disparity. An image of a point of near object plane 114 on zero disparity image plane 106, has a near object plane disparity value. An image of a point of the far object plane on zero disparity image plane 106, has a far object plane disparity value, whose value is opposite to that of the near object plane disparity value. For example, if a point image of the near object on zero disparity image plane 106 has a disparity of plus 5 pixels, another point image of the far object on zero disparity image plane 106, can have a disparity of minus 3 pixels.

Each of apertures 102 and 104 is in form of a substantially round pinhole. The image detector can be a charge-coupled device (CCD), complementary metal-oxide semiconductor (CMOS), and the like. User interface 112 can be a pointing device (e.g., a mouse, stylus and tablet), keyboard, and the like.

An optical axis of apertures 102 and 104 and the optical assembly is referenced 116. Optical assembly principle plane 148 is substantially perpendicular to optical axis 116. Apertures 102 and 104 are located substantially symmetrically about optical axis 116. A distance between the centers of apertures 102 and 104 on optical assembly principle plane 148 is referenced D (i.e., interpupilar distance—IPD). A focal length of apertures 102 and 104 is referenced f. The focal points of the optical assembly principle plane 148 are referenced by crosses.

Near object plane 114 is located at a distance S in front of optical assembly principle plane 148. Zero-disparity object plane 118 is located at a distance $S_O$ in front of optical assembly principle plane 148. Zero disparity image plane 106 is located at a distance $S_O'$ behind optical assembly principle plane 148. Near object image plane 120 is located behind optical assembly principle plane 148, at a distance S'.

The optical assembly receives light beams 122A and 124A, through apertures 102 and 104, respectively, from a point 126A located at an intersection of optical axis 116 and zero disparity object plane 118. Apertures 102 and 104 and the optical assembly direct light beams 122B and 124B, respective of light beams 122A and 124A, respectively, toward the image detector. Light beams 122B and 124B meet at a point 126B at the intersection of optical axis 116 and zero disparity image plane 106.

The optical assembly receives light beams 128A and 130A, respectively, from a point 132A of zero disparity object plane 118. Apertures 102 and 104 and the optical assembly direct light beams 128B and 130B, respective of light beams 128A and 130A, respectively, toward the image detector. Light beams 128B and 130B meet at a point 132B on zero disparity image plane 106.

The optical assembly receives light beams 134A and 136A through apertures 102 and 104, respectively, from a point 138A of near object plane 114, located at an intersection of optical axis 116 and near object plane 114. Apertures 102 and 104 and the optical assembly direct light beams 134B and 136B, respective of light beams 134A and 136A, respectively, toward the image detector. Light beams 134B and 136B meet at a virtual point 138B at the intersection of optical axis 116 and near object image plane 120.

The optical assembly receives light beams 140A and 142A through apertures 102 and 104, respectively, from a point 144A of near object plane 114. Apertures 102 and 104 and the optical assembly direct light beams 140B and 142B, respective of light beams 140A and 142A, respectively toward the image detector. Light beams 140B and 142B meet at a virtual point 144B on near object image plane 120.

Projection 138C of point 138A on the image detector is formed by light beam 134A passing through aperture 102, and striking the image detector as light beam 134B. Projection 138D of point 138A on the image detector is formed by light beam 136A passing through aperture 104, and striking the image detector as light beam 136B. The distance between projections 138C and 138D of point 138A on the image detector, is referenced $\delta_1$ (i.e., disparity).

Projection 144C of point 144A on the image detector is formed by light beam 140A passing through aperture 102, and striking the image detector as light beam 140B. Projection 144D of point 144A on the image detector is formed by light beam 142A passing through aperture 104, and striking the image detector as light beam 142B. The distance between projections 144C and 144D of point 144A on the image detector, is referenced $\delta_2$. By similar triangles, $$\delta/D = \delta_1/D = \delta_2/D = (S' - S'_0)/S' \qquad (1)$$

according to the Lens law, $$1/S_0 + 1/S'_0 = 1/f \qquad (2)$$

solving for $S'_0$, $$S'_0 = fS_0/(S_0 - f) \qquad (3)$$

solving (1) for $S'$, $$S' = DS'_0/(D - \delta) \qquad (4)$$

according to (3) and (4), $$S' = DfS_0/(S_0 - f)(D - \delta) \qquad (5)$$

according to the Lens law, $$1/S + 1/S' = 1/f \qquad (6)$$

solving for S, $$S = fS'/(S' - f) \qquad (7)$$

plugging in S' from (5) into (7), yields, $$S = \frac{DfS_0}{Df + \delta(S_0 - f)} \qquad (8)$$

The disparity $\delta$ in (8) is in units of length (e.g., millimeters). Alternatively, disparity can be expressed in units of pixels N, where $$N = \delta/\sigma \qquad (9)$$

where $\sigma$ is the width of a pixel in millimeters. And thus, $$S = \frac{DfS_0}{Df + N\sigma(S_0 - f)} \qquad (10)$$

According to (10), disparity in unit of pixels can be expressed as, $$N = \frac{fD}{\sigma(S_0 - f)}\left(\frac{S_0}{S} - 1\right) \qquad (11)$$

Processor 108 produces a right image and a left image of the object according to an output of the image detector. Processor 108 determines the center of distortion in each of the right and the left images, and corrects the distortion according to methods described herein below, in connection with FIGS. 4 and 6. Processor 108 takes into account the center of distortion, while correcting the distortion.

Processor 108 reconstructs an image of the object (e.g., a stereoscopic image, a 3D image, a topographical map) according to the right image and the left image, and display 110 displays the reconstructed image. Processor 108 searches in a left distortion-corrected image of the object, for the projection of a certain point of the object, matching another projection of the same point in a right distortion-corrected image of the object, and so on for other points of the object. In this manner, processor 108 determines a plurality of disparity values, and thus depth values, respective of different points on the object, by employing a depth determination model (e.g., Equation 10, a look-up table, a mathematical function). The procedure of determining the disparity is described herein below, in connection with FIG. 4.

Processor 108, further determines a confidence percent level respective of each match, to indicate the certainty at which this match is true. Processor 108 determines the confidence percent level according to (32) which is described herein below.

A user (not shown) can designate any two points on the reconstructed image via user interface 112, and processor 108 superposes the value of the distance between these two points on the reconstructed image. The user can designate a point on the reconstructed image via user interface 112, and processor 108 superposes the depth value respective of this point relative to the stereoscopic plane, on the reconstructed image, as well as the confidence percent level associated with this depth. Processor 108 determines a shift between the right image and the left image for display 110 to display the images, wherein this shift is respective of vision characteristics of the user, thereby reducing vision associated discomfort while the user views the stereoscopic image.

With further reference to FIG. 3, when the object is located for example, 30 mm away from the image detector (i.e., at zero-disparity image plane 118), the disparity between the right image and the left image is substantially zero. As the object moves closer to the image detector, for example at a distance of 17 mm, the disparity decrease to 5 pixels. As the object moves away from the image detector, for example at a distance of 129 mm, the disparity increases to 5 pixels in the opposite direction. Hence, the absolute value of the disparity between the right image and the left image at 17 mm and 129 mm are substantially the same, however different in sign. Therefore, curve 146 is a decreasing function within the disparity range of minus 5 pixels and plus 5 pixels, having an intercept at 30 mm.

The optical device can include additional elements known in the art, in order to produce the right image and the left image of the object, from the output of the image detector. For example, a set of lenticular lenses can be placed in front of the image detector, to direct the light beams respective of the right image and the left image, to the respective predetermined cells on the image detector. The processor, then produces the right image and the left image according to the output of these cells. The optical device can include an optical assembly (e.g., one or more lenses) to direct the light beams from the apertures toward the image detector.

Alternatively, the optical device can include an image differentiator to alternately differentiate between the right image of the object and the left image thereof, thereby enabling the image detector to detect the right image and the left image, alternately. It is noted that in case an image differentiator is employed, a center of the right image and another center of the left image, substantially match the center of the image detector. Following are some examples of an image differentiator.

As one example, a pair of static polarizers having different polarization directions, are placed in front of the respective aperture, and a dynamic polarizer is placed behind the optical assembly principle plane. As the dynamic polarizer alternates between the two polarization directions respective of the static polarizers, the image detector alternately detects the right image and the left image.

As another example, two different light filters are located in front of the respective aperture, and a rotating disk is located behind the optical assembly principle plane, wherein each light filter receives light beams reflected from the object, from a different viewpoint. The rotating disk is equally divided to two sections, each transmitting light only within the range of wavelengths of the respective light filter. As the rotating disk rotates, the rotating disk alternately admits a right image in the color of the first light filter, and a left image thereof in another color of the second light filter, to the image detector. Alternatively, the light filters can be located behind the respective aperture.

Further alternatively, the rotating disk can be equally divided to a transparent section and an opaque section. Alternatively, the transparent section can be divided to different sectors each admitting light within a different range of wavelengths (e.g., red, green, and blue—RGB). Further alternatively, the rotating disk can be divided to a quarter transparent sector and a three-quarter opaque sector. Alternatively, the rotating disk can be divided alternately to transparent sectors and opaque sectors, wherein each transparent sector admits light within a different range of wavelengths (e.g., red, green and blue).

As a further example, a dynamic light valve is placed behind the optical assembly principle plane. The dynamic light valve is divided to two sections, each corresponding to a different one of the two apertures, wherein a controller controls the two sections to alternately admit and block light. The controller controls the light valve to alternately admit the right image and the left image to the image detector. Additionally, the optical device can include a Y-shaped fiber bundle, wherein each tip of the letter Y faces the corresponding dynamic light valve and the leg of the letter Y faces the image detector.

As another example, a static light valve is placed behind the optical assembly principle plane. The static light valve is divided to two equal sections, each corresponding to a different one of the two apertures, wherein each section admits light within a different range of wavelengths (e.g., different range of wavelengths in an RGB palette—$RGB_1$ and $RGB_2$). A light source alternately illuminates the object within the range of wavelengths of these two different RGB palettes (i.e., $RGB_1$ and $RGB_2$). Thus, the image detector alternately detects the right image and the left image of the object, in the corresponding type of the RGB palette.

Instead of the static light valve, a multi-wavelength rotating disk can be employed. As one example, the rotating disk can be alternately divided to $RGB_1$, opaque, $RGB_2$, and again opaque. As another example, the multi-wavelength rotating disk can be alternately divided to the following sectors: $R_1$, $G_1$, $B_1$, $R_2$, $G_2$, and $B_2$.

As a further example, a pair a static mirrors are placed behind the respective aperture, and a rotating mirror is placed between the pair of the static mirrors to alternately reflect light from each one of the pair of the static mirrors. As the rotating mirror alternates between two positions relative to the static mirrors, the image detector alternately detects the right image and left image of the object.

Additionally, the optical device can include a pair of periscopes located between the image differentiator and the optical assembly principle plane. The periscopes provide a larger IPD, thereby increasing the disparity at every pixel, increasing the accuracy at which the depth is determined, and enabling the processor to reconstruct a more refined image of the object. In case an image differentiator or a pair of periscopes are employed, the set of lenticular lenses can be eliminated from the optical device.

Figure 5C:
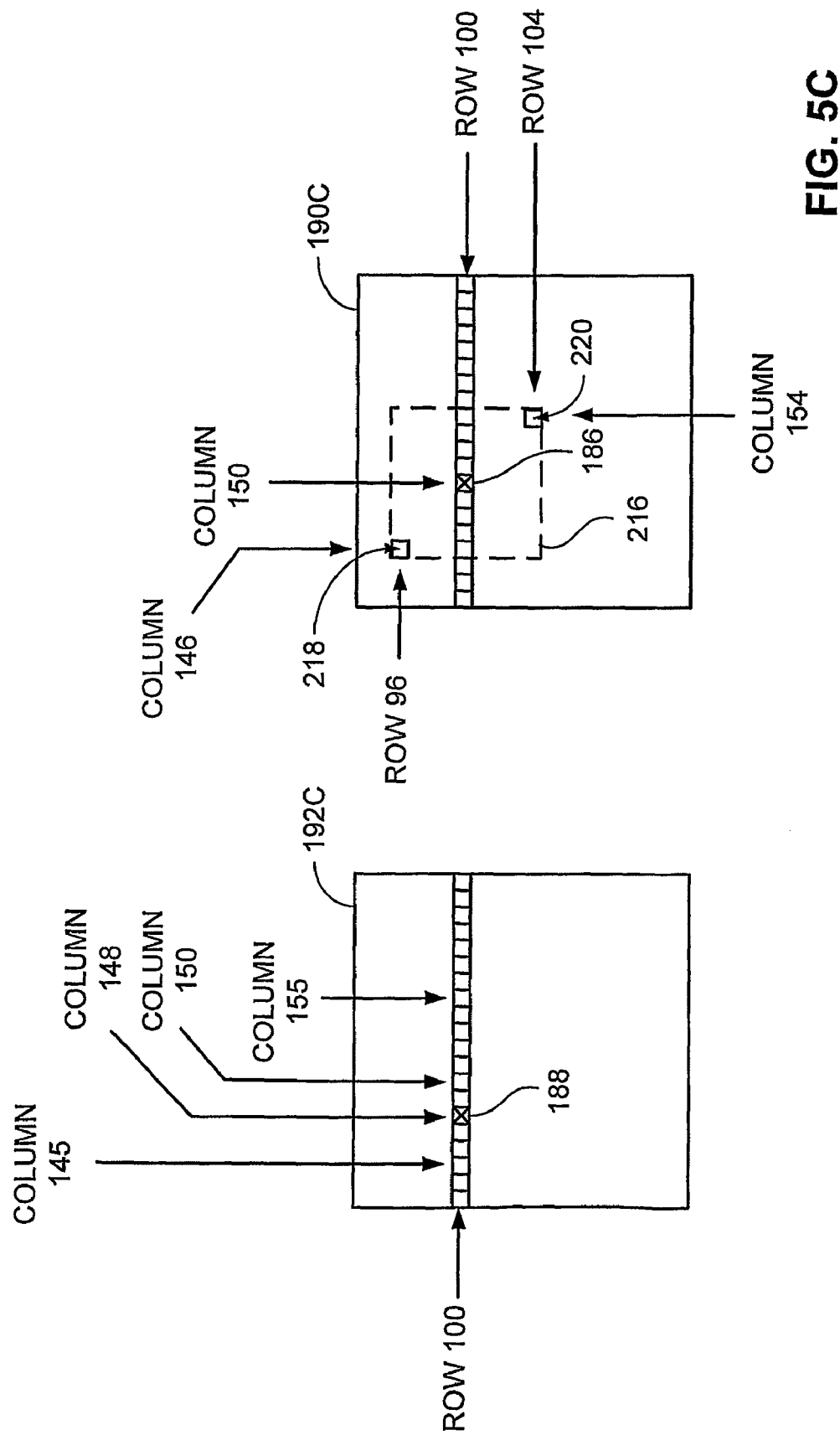
FIG. 5C is a schematic illustration of a pixel in the left distortion-corrected image of FIG. 5B, being matched to another pixel in the right distortion-corrected image of FIG. 5B.
Figure 5D:
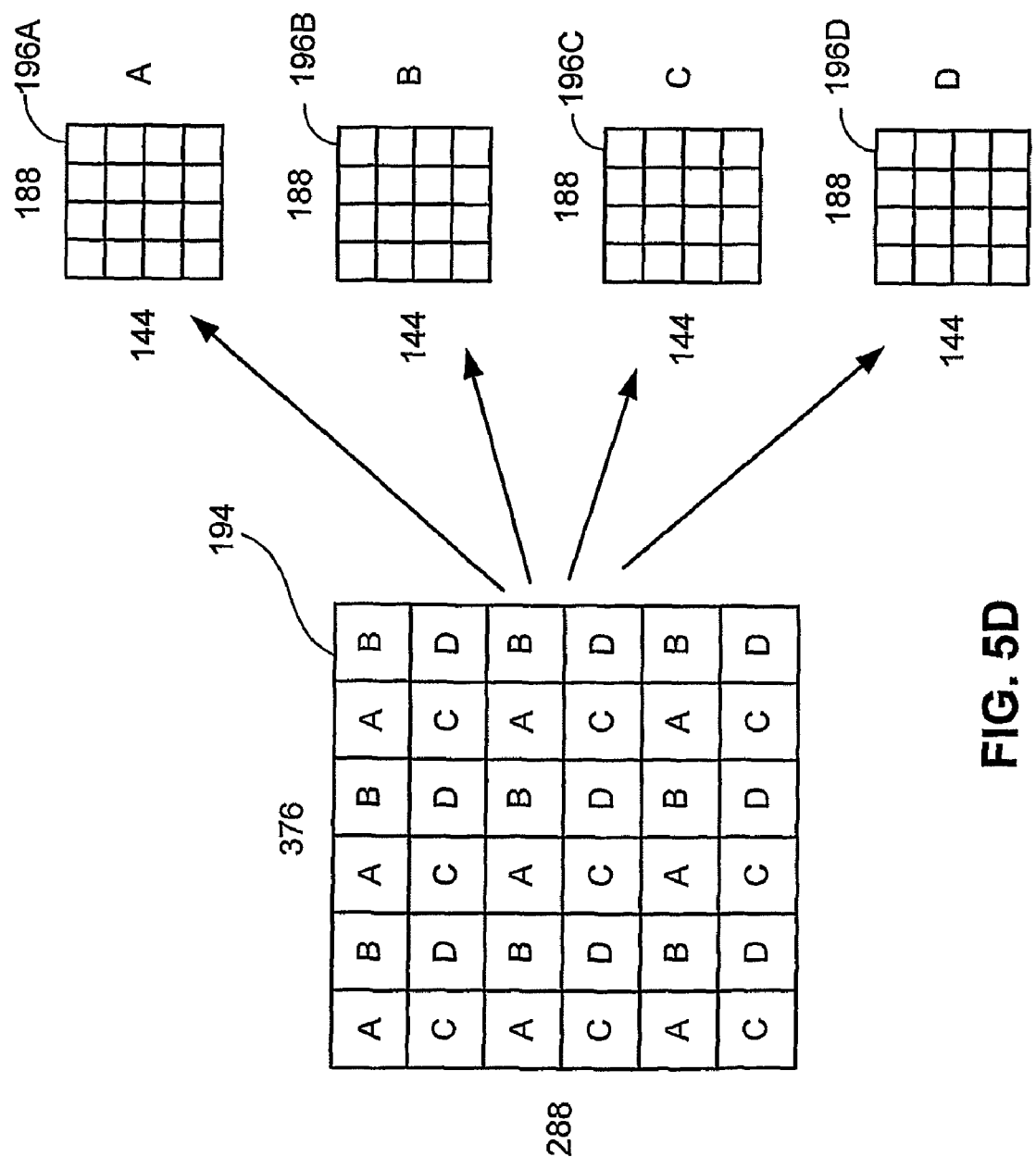
FIG. 5D is a schematic illustration of the color composition of the image detector of FIG. 2, and the four virtual images which the processor of the optical device of FIG. 2 produces for one of the right or left images of an object.
Figure 5E:
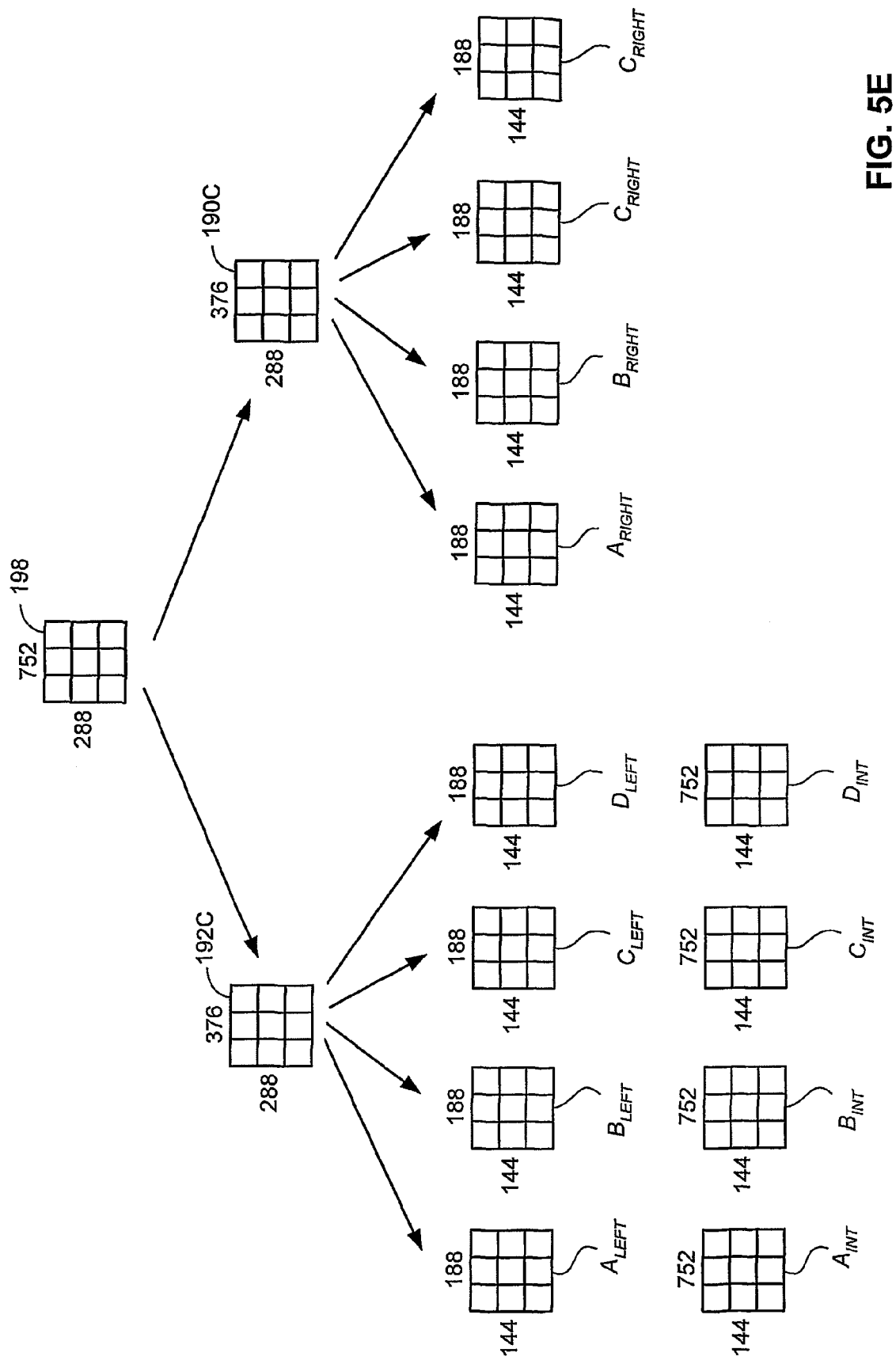
FIG. 5E is a schematic illustration of the virtual images which the processor of the optical device of FIG. 2 produces, according to a right image and a left image detected by the image detector of the optical device, and according to the color mosaic filters on the image detector.
Figure 5F:
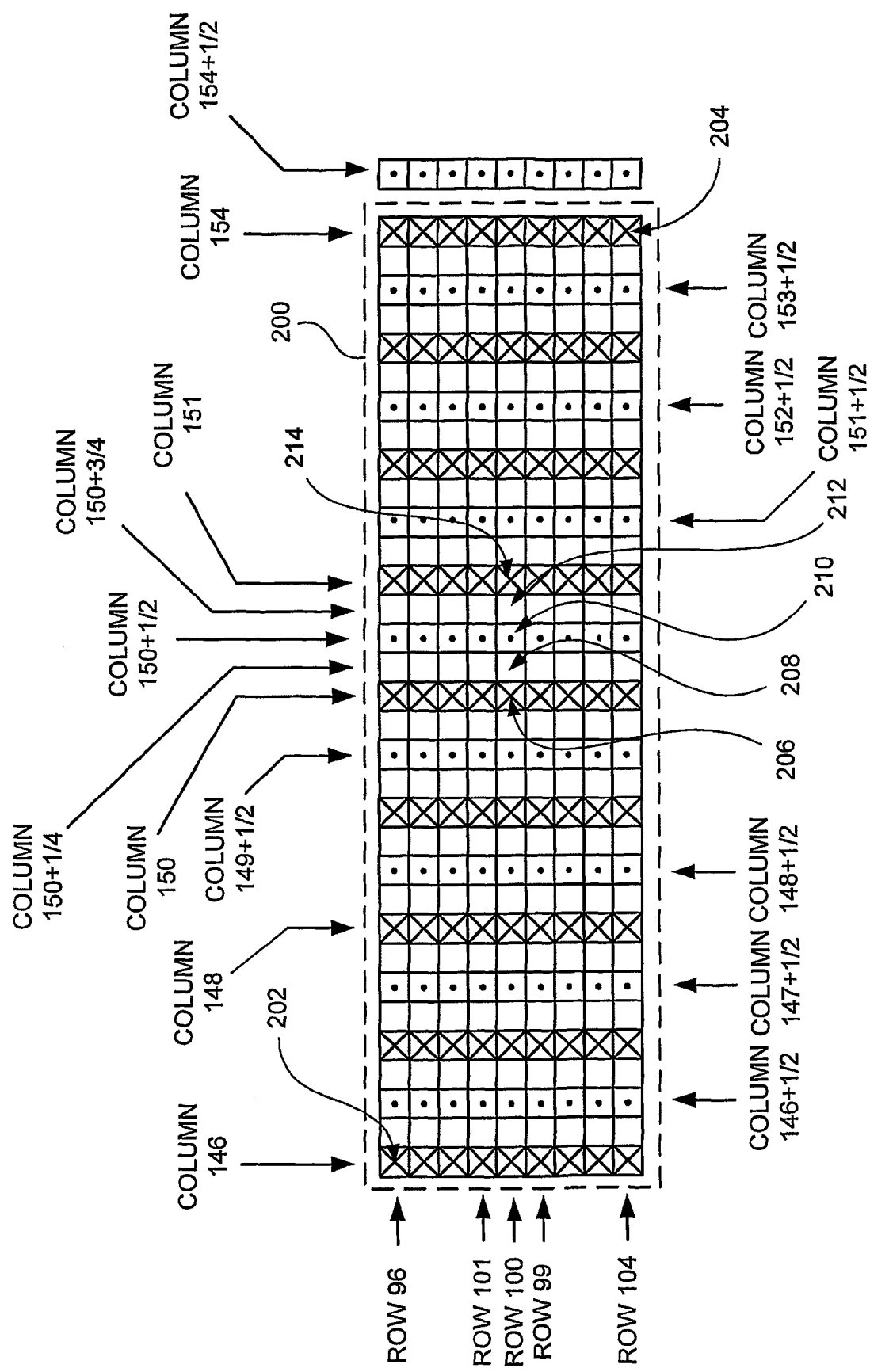
FIG. 5F is a schematic illustration of a window including a plurality of actual pixels and interpolated pixels in the left distortion-corrected image of FIG. 5C, in order to perform a cross correlation with another window in the right distortion-corrected image of FIG. 5C, which includes a plurality of only actual pixels.

Reference is now made to FIGS. 4, 5A, 5B, 5C, 5D, 5E, and 5F. FIG. 4 is a schematic illustration of a method for determining the disparity of a pair of matching pixels in a right image and a left image of an object, operative in accordance with another embodiment of the disclosed technique. FIG. 5A is a schematic illustration of a right distorted image and a left distorted image of an object, detected by the image detector of the optical device of FIG. 2. FIG. 5B is a schematic illustration of a right distortion-corrected image and a left distortion-corrected image of the right distorted image and the left distorted image of FIG. 5A, respectively. FIG. 5C is a schematic illustration of a pixel in the left distortion-corrected image of FIG. 5B, being matched to another pixel in the right distortion-corrected image of FIG. 5B. FIG. 5D is a schematic illustration of the color composition of the image detector of FIG. 2, and the four virtual images which the processor of the optical device of FIG. 2 produces for one of the right or left images of an object. FIG. 5E is a schematic illustration of the virtual images which the processor of the optical device of FIG. 2 produces, according to a right image and a left image detected by the image detector of the optical device, and according to the color mosaic filters on the image detector. FIG. 5F is a schematic illustration of a window including a plurality of actual pixels and interpolated pixels in the left distortion-corrected image of FIG. 5C, in order to perform a cross correlation with another window in the right distortion-corrected image of FIG. 5C, which includes a plurality of only actual pixels.

In procedure 170, a first image of an object is detected through a first aperture and a second image of the object is detected through a second aperture, the first image and the second image being detected by a single image detector. With reference to FIG. 2, the image detector detects a right image (not shown) and a left image (not shown) of the object. The right image is composed of a plurality of projections of different points (not shown) of the object, similar to projection 138C of point 138A, and the left image is composed of a plurality of other projections of the same points of the object, similar to projection 138D of point 138A.

With reference to FIG. 5A, the image detector detects a right distorted image 190A of the object and a left distorted image 192A thereof. Right distorted image 190A and left distorted image 192A, can form a stereoscopic image pair, which when displayed together on a display and viewed by a viewer using a suitable pair of glasses, can provide the viewer a stereoscopic perception of the detected object. Due to the characteristics of the optical assembly of optical assembly 100, images 190A and 192A are distorted, and furthermore, they are distorted symmetrically about centers of distortion 190B and 192B, respectively. Images 190A and 192A are generally distorted in a radial manner about centers of distortion 190B and 192B, respectively.

In procedure 172, a first image distortion respective of the first image and a second image distortion respective of the second image are corrected, by applying an image distortion correction model to the first image and to the second image, thereby producing a first distortion-corrected image and a second distortion-corrected image. With reference to FIGS. 2 and 5A, processor 108 corrects the image distortions in right distorted image 190A and in left distorted image 192A, by applying a distortion correction model to each of right distorted image 190A and left distorted image 192A, while taking into account centers of distortion 190B and 192B. The centers of distortion 190B and 192B are determined as described herein below in connection with FIG. 6.

The image detector can include for example, the complementary color mosaic filters of yellow, cyan, magenta, and green. With reference to FIG. 5D, an image 194 detected by the image detector is represented by a field of 288 rows and 376 columns, wherein each pixel has a filter in either of the colors A, B, C, or D, which are defined as follows: A=cyan+green, B=yellow+magenta, C=cyan+magenta, and D=yellow+green. In order to determine the disparity associated with a certain point on the object, processor 108 produces four virtual images 196A, 196B, 196C, and 196D, corresponding to the respective colors A, B, C, and D, each having a field of 144 rows and 188 columns.

When processor 108 corrects the distortions in a distorted color image, it moves each color pixel according to an image distortion correction model. Therefore, the outcome of a distortion correction procedure applied to a distorted color image, is a separate distortion corrected image in each of the colors of the original distorted color image (i.e., each of the pixels in each color image is shifted by a certain amount relative to the ones in the original distorted color image).

In case of the four colors A, B, C, and D, when processor 108 corrects the distortion in right distorted image 190A, processor 108 produces four distortion-corrected color images $A_{RIGHT}$, $B_{RIGHT}$, $C_{RIGHT}$, and $D_{RIGHT}$, (FIG. 5D) according to the image distortion correction model. Likewise, when processor 108 corrects the distortion in left distorted image 192A, processor 108 produces four distortion-corrected color images $A_{LEFT}$, $B_{LEFT}$, $C_{LEFT}$, and $D_{LEFT}$, according to the image distortion correction model.

The image detector detects an image 198 of the object. Processor 108 produces a right distortion-corrected image 190C (FIG. 5B), by producing the four distortion-corrected color images $A_{RIGHT}$, $B_{RIGHT}$, $C_{RIGHT}$, and $D_{RIGHT}$. Likewise, processor 108 produces left distortion-corrected image 192C, by producing the four distortion-corrected color images $A_{LEFT}$, $B_{LEFT}$, $C_{LEFT}$, and $D_{LEFT}$.

Hence, in the description herein below, the term "distortion-corrected image" equally refers to each of the distortion-corrected color images of the original distorted image. Likewise, the term "right distortion-corrected image" equally refers to each of the four distortion-corrected images $A_{RIGHT}$, $B_{RIGHT}$, $C_{RIGHT}$, and $D_{RIGHT}$, and the term "left distortion-corrected image" equally refers to each of the four distortion-corrected images $A_{LEFT}$, $B_{LEFT}$, $C_{LEFT}$, and $D_{LEFT}$.

Image 198 can have for example, a field of 288 rows and 752 columns. Each of right distortion-corrected image 190C and left distortion-corrected image 192C, would then have a field of 288 rows and 376 columns, and each of distortion-corrected color images $A_{RIGHT}$, $B_{RIGHT}$, $C_{RIGHT}$, $D_{RIGHT}$ and $A_{LEFT}$, $B_{LEFT}$, $C_{LEFT}$, and $D_{LEFT}$, a field of 144 rows and 188 columns.

Since the image detector receives the light beams respective of a first viewing direction and a second viewing direction through the same optical assembly, the distortion in right distorted image 190A and in left distorted image 192A are symmetric and are mirror images of one another. Hence, the two distortion correction models for right distorted image 190A and left distorted image 192A are similar, except the respective differences in signs. An actual pixel 186 (FIG. 5C) in right distortion-corrected image 190C represents projection 138C (FIG. 2) of point 138A on the image detector. An actual pixel 188 in left distortion-corrected image 192C represents projection 138D of point 138A on the image detector. It is noted that due to the distortion in right distorted image 190A and in left distorted image 192A, actual pixels 186 and 188 are shifted relative to one another. Therefore, in order to determine the disparity between actual pixels 186 and 188 in a substantially accurate manner, it is imperative that the distortions are corrected beforehand.

In procedure 174, for each pixel in at least a portion of the first distortion-corrected image, a matching pixel is identified in the second distortion-corrected image. With reference to FIG. 5B, processor 108 determines for each pixel in at least a portion of right distortion-corrected image 190C, a matching pixel in at least a portion of left distortion-corrected image 192C. Due to the properties of the block matching method for determining a matching pixel as described herein below, processor 108 does not determine the disparities at the margins of right distortion-corrected image 190C and left distortion-corrected image 10192C. This is so, because a window (as described herein below in connection with FIGS. 5C and 5F), formed in the neighborhood of each of the pixels in an outer region of an image, includes pixels which fall outside this image, causing the block matching procedure to yield unreliable results with respect to these windows.

In an image which is for example, 144×188 pixels in each color, processor 108 can for example, form an inner region by excluding 10 pixels vertically from the upper and lower boundaries of the original image, and furthermore excluding 15 pixels horizontally from the right and left boundaries of the original image. Processor 108, then determines the matching pixels only in this inner region, and likewise determines the disparity only for pixels within this inner region.

With reference to FIGS. 2 and 5C, processor 108 identifies the matching pixels in left distortion-corrected image 192C, for every pixel in right distortion-corrected image 190C, by employing a block matching method as described herein below. According to the epipolar constraint, actual pixels 186 and 188 are located in the same row of the respective images. Since the object is located at near object plane 114, actual pixels 186 and 188 are located in the same row, but in different columns. According to the example set forth in FIG. 5C, actual pixel 186 is located in row 100, and column 150 in right distortion-corrected image 190C, while actual pixel 188 is located in row 100, and column 148 in left distortion-corrected image 192C. Processor 108 attempts to find actual pixel 188 in left distortion-corrected image 192C, which matches actual pixel 186 in right distortion-corrected image 190C.

Therefore, processor 108 searches for actual pixel 188 in row 100 of left distortion-corrected image 192C, by employing a block matching technique known in the art, such as cross correlation, cross entropy, squares of differences, absolute value of differences, a histogram, Kalmagorov distance method, and the like. The input to each method can be either the intensity of a pixel, the directional differential of the intensity of the pixel along the horizontal axis, along the vertical axis, or a combination thereof.

According to an aspect of the disclosed technique, the processor determines a matching pixel in a first image for a pixel in a second image, by cross correlating a first window formed around that pixel in the second image, with a plurality of windows formed around each of a plurality of pixels in the first image. The processor determines a disparity value respective of that pixel in the second image, according to the indices of the pixel in the second image, and those of the matching pixel in the first image.

The processor produces a modified image according to the first image, by interpolating between every two adjacent pixels in each row of the first image, thereby producing a set of interpolated pixels in the first image. The processor determines the indices of each of the pixels in the first image, according to the index of the row of the pixel in the second image, and according to a range of column indices about the index of the column of the pixel in the second image. Due to the presence of the interpolated pixels, the column indices of adjacent pixels among the pixels in the first image differ by a portion of a pixel, thereby enabling the processor to determine the disparity value at an accuracy which is inversely proportional to this portion of a pixel.

The processor cross correlates the first window in the second image with each of the windows in the first image, by taking into account a predetermined set of colors associated with the image detector. For this purpose, the processor produces a modified image for each color, according to the first image, and cross correlates the window in each color image of the second image, with the windows in the modified image of the respective color.

Following is a description of the process for identifying the matching pixel according to the cross correlation method, which is unique for the disclosed technique. According to the cross correlation theory, given two one-dimensional signals f and g, wherein the amplitudes of these signals are different at different points in time, and wherein the two signals are shifted relative to one another by an amount r, the method attempts to determine the similarity between f and g in the following manner. The criterion for similarity of f and g is, $$\text{Min}_{\tau,\rho}\left(\int_{t_1}^{t_2}\left|\frac{f(t)}{\|f\|}-\rho\frac{g(t-\tau)}{\|g\|}\right|^2 dt\right) \quad (12)$$

where, $\|f\|$ and $\|g\|$ are the magnitudes of f and g, respectively, and $\tau$ is continuous. The solution of (12) is $$\rho = \frac{\int_{t_1}^{t_2} f(t)g(t-\tau)dt}{\|f(t)\| \cdot \|g(t)\|} \quad (13)$$

$$\|f(t)\| = \sqrt{\int_{t_1}^{t_2} f^2(t)dt} \quad (14)$$

$$\|g(t)\| = \sqrt{\int_{t_1}^{t_2} g^2(t-\tau)dt} \quad (15)$$

and where $-1<\rho<1$. The value of $\tau$ is selected such that $|\rho|$ is maximal. At this maximal value of $|\rho|$, (12) is equal to $1-\rho^2$. It is noted that if f and g are similar, then $\rho=1$ and (12) is equal to zero. (13) is known in the art as the cross correlation between f and g. The cross correlation theory is generalized to two-dimensional signals (i.e., images) in the disclosed technique, in order to determine a pixel in left distortion-corrected image 192C, which matches actual pixel 186 in right distortion-corrected image 190C.

Processor 108 operates as follows in order to find actual pixel 188 in left distortion-corrected image 192C, which matches actual pixel 186 in right distortion-corrected image 190C. Processor 108 produces additional pixels within every pair of adjacent pixels, in each row of left distortion-corrected image 192C, by interpolating the intensity between every such adjacent pairs. Processor 108 can perform a bilinear interpolation (i.e., employing a linear function), a cubic interpolation (i.e., employing a non-linear function), and the like, in order to produce the interpolated pixels. Processor 108 can produce for example, three additional pixels between every pair of adjacent pixels. Thus, processor 108 produces interpolated images $A_{INT}$, $B_{INT}$, $C_{INT}$, and $D_{INT}$ according to $A_{LEFT}$, $B_{LEFT}$, $C_{LEFT}$, and $D_{LEFT}$, respectively, wherein each of $A_{INT}$, $B_{INT}$, $C_{INT}$, and $D_{INT}$ images includes a field of 144 rows and 752 columns.

In order to determine the matching pixel, processor 108 cross correlates between right distortion-corrected image 190C and left distortion-corrected image 192C, as described herein below. Processor 108 determines beforehand, that the object is located within a certain range from the image detector (e.g., between 17 mm and 129 mm away from the optical assembly principle plane, as described herein above in connection with FIG. 3). In this case processor 108 determines that the range of disparities between a pixel in right distortion-corrected image 190C and left distortion-corrected image 192C, is between minus 5 pixels and plus 5 pixels.

Processor 108 can for example, cross correlate at steps of quarter of a pixel within a range of between minus 5 pixels and plus 5 pixels, about the column index of actual pixel 186. Processor 108 performs each cross correlation with respect to each of the colors (according to above example, four colors) associated with the image detector. In this case, processor 108 performs a total of 44 (11×4=44) cross correlations, in order to find the matching pixel in left distortion-corrected image 192C, for pixel 186 in right distortion-corrected image 190C.

With reference back to FIG. 5C, according to the example described herein above, and according to this range of disparities, processor 108 searches for actual pixel 188 in row 100 of left distortion-corrected image 192C and between columns 145 and 155 in left distortion-corrected image 192C.

The signal produced by the image detector is generally noisy. Therefore, actual pixel 188 (i.e., the matching pixel) has to be found by employing a window of a suitable kernel size which is an uneven number. Following is a description of the procedure for finding the matching pixel for a pixel in right distortion-corrected image 190C, according to the cross correlation method, by employing a window, while additional pixels have been previously interpolated between every pair of pixels in each row of each of $A_{INT}$, $B_{INT}$, $C_{INT}$, and $D_{INT}$ images. The interpolation is performed in order to increase the accuracy at which processor 108 determines the disparity map.

With reference to FIG. 5F, processor 108 produces a window 200 in left distortion-corrected image 192C, wherein the center of window 200 is row 100 and column 150. Window 200 includes a set of actual pixels (designated by crossed squares), located between an actual pixel 202 in row 96 (100−4=96) and column 146 (150−4=146), and an actual pixel 204 in row 104 (100+4=104) and column 154 (150+4=154). In addition, window 200 includes a set of interpolated pixels (designated by dotted squares and empty squares), which processor 108 produces by interpolating between every two adjacent actual pixels in an image, such as images $A_{INT}$, $B_{INT}$, $C_{INT}$, and $D_{INT}$, in each row of that image. In the example set forth in FIG. 5F, processor 108 produces three interpolated pixels between every two adjacent actual pixels. Therefore, window 200 includes 9 rows and 33 columns.

Window 200 is representative of a window (not shown) in each of $A_{INT}$, $B_{INT}$, $C_{INT}$, and $D_{INT}$ images. It is noted in connection with above example, that the width of each interpolated pixel is one quarter that of an actual pixel. In the example of FIG. 5F, a central actual pixel 206 at row 100 and column 150 is located at the center of window 200.

Processor commences the procedure for finding actual pixel 188 (FIG. 5C), in left distortion-corrected image 192C, which matches actual pixel 186 in right distortion-corrected image 190C, by producing window 200 in each of $A_{INT}$, $B_{INT}$, $C_{INT}$, and $D_{INT}$ images, wherein window 200 includes central actual pixel 206 at row 100 and column 150. Processor 108 performs a cross correlation (as described herein below), and then produces another window (not shown) similar to window 200, whose central pixel is an interpolated pixel 208 (designated by an empty square) located a quarter of a pixel to the right of central actual pixel 206 (i.e., at row 100 and column 150+¼ pixel). Processor 108 performs another cross correlation with respect to the last window, and produces another window (not shown) similar to window 200, whose central pixel is an interpolated pixel 210 (designated by a dotted square) located a quarter of a pixel to the right of interpolated pixel 208 (i.e., at row 100 and column 150+½ pixel).

Processor 108 performs a further cross correlation with respect to the last window, and produces a further window (not shown) similar to window 200, whose central pixel is an interpolated pixel 212 (designated by an empty square) located a quarter of a pixel to the right of interpolated pixel 210 (i.e., at row 100 and column 150+¾ pixel). Processor 108 performs another cross correlation with respect to the last window, and produces another window (not shown) similar to window 200, whose central pixel is an actual central pixel 214 (designated by a crossed square) located a quarter of a pixel to the right of interpolated pixel 212 (i.e., at row 100 and at column 151). Each of the windows similar to window 200 includes a field of 9 rows and 33 columns.

Processor 108 produces a window 216 (FIG. 5C) in right distortion-corrected image 190C, which includes a set of actual pixels located between an actual pixel 218 at row 96 (100−4=96) and column 146 (150−4=146), and an actual pixel 220 at row 104 (100+4=104) and column 154 (150+4=154). Hence, window 216 includes a field of 9 rows and 9 columns of actual pixels, wherein actual pixel 186 is a central actual pixel in window 216.

Processor 108 cross correlates window 216 (FIG. 5C) with a plurality of windows (not shown) similar to window 200 (FIG. 5F), by producing a new window around each central pixel (either actual or interpolated), in row 100 of left distortion-corrected image 192C, and within a range of between minus 5 pixels and plus 5 pixels about central actual pixel 206, wherein the central pixels are selected at an increment of quarter of a pixel. Processor 108 determines that a certain window in left distortion-corrected image 192C is similar to window 216. Processor 108 determines that the central pixel (either an actual pixel or an interpolated pixel), in that certain window of left distortion-corrected image 192C matches actual pixel 186 in right distortion-corrected image 190C. Processor 108, furthermore determines a similarity level parameter (as described herein below), to indicate the certainty of this match.

Processor 108 determines that a certain window in left distortion-corrected image 192C is similar to window 216 in right distortion-corrected image 190C, according to the following criterion, $$\text{Min}_{\delta, \rho_A, \rho_B, \rho_C, \rho_D} \left\{ \sum_{i=-m}^{m} \sum_{j=-n}^{n} \left[ \frac{I_{A,R}(k+i, l+j)}{\|I_{A,R}(k, l)\|} - \rho_A \frac{I_{A,L}(k+i+\delta, l+j)}{\|I_{A,L}(k+\delta, l)\|} \right]^2 + \sum_{i=-m}^{m} \sum_{j=-n}^{n} \left[ \frac{I_{B,R}(k+i, l+j)}{\|I_{B,R}(k, l)\|} - \rho_B \frac{I_{B,L}(k+i+\delta, l+j)}{\|I_{B,L}(k+\delta, l)\|} \right]^2 + \sum_{i=-m}^{m} \sum_{j=-n}^{n} \left[ \frac{I_{C,R}(k+i, l+j)}{\|I_{C,R}(k, l)\|} - \rho_C \frac{I_{C,L}(k+i+\delta, l+j)}{\|I_{C,L}(k+\delta, l)\|} \right]^2 + \sum_{i=-m}^{m} \sum_{j=-n}^{n} \left[ \frac{I_{D,R}(k+i, l+j)}{\|I_{D,R}(k, l)\|} - \rho_D \frac{I_{D,L}(k+i+\delta, l+j)}{\|I_{D,L}(k+\delta, l)\|} \right]^2 \right\} \quad (16)$$

where, $\delta$ is the disparity between an actual pixel in right distortion-corrected image 190C and the matching pixel (either actual or interpolated) in left distortion-corrected image 192C, in units of pixels (i.e., $\delta$ is discrete). $\delta$ depends on the resolution of the pixels in the modified images of left distortion-corrected image 192C, which according to above example is quarter of a pixel.

k and l are the column and row indices, respectively, of a central actual pixel in a window (not shown) similar to each of windows 216 and 200 m is the number of columns of actual pixels to the right and left of a central actual pixel in a window (not shown) similar to each of windows 200 and 216 n is the number of rows of actual pixels above and below a central actual pixel in a window (not shown) similar to each of windows 200 and 216

$I_{A,R}(k,l)$ is the intensity of a pixel in a window (not shown) similar to window 216 in the distortion-corrected color image $A_{RIGHT}$, wherein the center of this window is defined by indices (k,l)

$I_{B,R}(k,l)$ is the intensity of a pixel in a window (not shown) similar to window 216 in the image $B_{RIGHT}$, wherein the center of this window is defined by indices (k,l)

$I_{C,R}(k,l)$ is the intensity of a pixel in a window (not shown) similar to window 216 in the image $C_{RIGHT}$, wherein the center of this window is defined by indices (k,l)

$I_{D,R}(k,l)$ is the intensity of a pixel in a window (not shown) similar to window 216 in the image $D_{RIGHT}$, wherein the center of this window is defined by indices (k,l)

$I_{A,L}(k+\delta,l)$ is the intensity of a pixel in a window (not shown) similar to window 200 in the image $A_{INT}$, wherein the center of this window is defined by indices (k+δ,l)

$I_{B,L}(k+\delta,l)$ is the intensity of a pixel in a window (not shown) similar to window 200 in the image $B_{INT}$, wherein the center of this window is defined by indices (k+δ,l)

$I_{C,L}(k+\delta,l)$ is the intensity of a pixel in a window (not shown) similar to window 200 in the image $C_{INT}$, wherein the center of this window is defined by indices (k+δ,l)

$I_{D,L}(k+\delta,l)$ is the intensity of a pixel in a window (not shown) similar to window 200 in the image $D_{INT}$, wherein the center of this window is defined by indices (k+δ,l)

$\rho_A$ is the cross correlation between a window (not shown) similar to window 216 in the distortion-corrected color image $A_{RIGHT}$, and another window (not shown) similar to window 200 in the $A_{INT}$ image $\rho_B$ is the cross correlation between a window (not shown) similar to window 216 in the $B_{RIGHT}$ image, and another window (not shown) similar to window 200 in the $B_{INT}$ image $\rho_C$ is the cross correlation between a window (not shown) similar to window 216 in the $C_{RIGHT}$ image, and another window (not shown) similar to window 200 in the $C_{INT}$ image $\rho_D$ is the cross correlation between a window (not shown) similar to window 216 in the $D_{RIGHT}$ image, and another window (not shown) similar to window 200 in the $D_{INT}$ image $$\|I_{A,R}(k,l)\| = \sqrt{\sum_{i=-m}^{m}\sum_{j=-n}^{n} I_{A,R}^2(k+i,l+j)} \tag{17}$$

$$\|I_{B,R}(k,l)\| = \sqrt{\sum_{i=-m}^{m}\sum_{j=-n}^{n} I_{B,R}^2(k+i,l+j)} \tag{18}$$

$$\|I_{C,R}(k,l)\| = \sqrt{\sum_{i=-m}^{m}\sum_{j=-n}^{n} I_{C,R}^2(k+i,l+j)} \tag{19}$$

$$\|I_{D,R}(k,l)\| = \sqrt{\sum_{i=-m}^{m}\sum_{j=-n}^{n} I_{D,R}^2(k+i,l+j)} \tag{20}$$

$$\|I_{A,L}(k+\delta,l)\| = \sqrt{\sum_{i=-m}^{m}\sum_{j=-n}^{n} I_{A,L}^2(k+i+\delta,l+j)} \tag{21}$$

$$\|I_{B,L}(k+\delta,l)\| = \sqrt{\sum_{i=-m}^{m}\sum_{j=-n}^{n} I_{B,L}^2(k+i+\delta,l+j)} \tag{22}$$

$$\|I_{C,L}(k+\delta,l)\| = \sqrt{\sum_{i=-m}^{m}\sum_{j=-n}^{n} I_{C,L}^2(k+i+\delta,l+j)} \tag{23}$$

$$\|I_{D,L}(k+\delta,l)\| = \sqrt{\sum_{i=-m}^{m}\sum_{j=-n}^{n} I_{D,L}^2(k+i+\delta,l+j)} \tag{24}$$

$$\rho_A(k,l) = \frac{\sum_{i=-m}^{m}\sum_{j=-n}^{n}[I_{A,R}(k+i,l+j)-\bar{I}_{A,R}(k,l)]\cdot[I_{A,L}(k+i+\delta,l+j)-\bar{I}_{A,L}(k+\delta,l)]}{\sqrt{\sum_{i=-m}^{m}\sum_{j=-n}^{n}[I_{A,R}(k+i,l+j)-\bar{I}_{A,R}(k,l)]^2}\sqrt{\sum_{i=-m}^{m}\sum_{j=-n}^{n}[I_{A,L}(k+i+\delta,l+j)-\bar{I}_{A,L}(k+\delta,l)]^2}} \tag{25}$$

$$\rho_B(k,l) = \frac{\sum_{i=-m}^{m}\sum_{j=-n}^{n}[I_{B,R}(k+i,l+j)-\bar{I}_{B,R}(k,l)]\cdot[I_{B,L}(k+i+\delta,l+j)-\bar{I}_{B,L}(k+\delta,l)]}{\sqrt{\sum_{i=-m}^{m}\sum_{j=-n}^{n}[I_{B,R}(k+i,l+j)-\bar{I}_{B,R}(k,l)]^2}\sqrt{\sum_{i=-m}^{m}\sum_{j=-n}^{n}[I_{B,L}(k+i+\delta,l+j)-\bar{I}_{B,L}(k+\delta,l)]^2}} \tag{26}$$

$$\rho_C(k,l) = \frac{\sum_{i=-m}^{m}\sum_{j=-n}^{n}[I_{C,R}(k+i,l+j)-\bar{I}_{C,R}(k,l)]\cdot[I_{C,L}(k+i+\delta,l+j)-\bar{I}_{C,L}(k+\delta,l)]}{\sqrt{\sum_{i=-m}^{m}\sum_{j=-n}^{n}[I_{C,R}(k+i,l+j)-\bar{I}_{C,R}(k,l)]^2}\sqrt{\sum_{i=-m}^{m}\sum_{j=-n}^{n}[I_{C,L}(k+i+\delta,l+j)-\bar{I}_{C,L}(k+\delta,l)]^2}} \tag{27}$$

$$\rho_D(k,l) = \frac{\sum_{i=-m}^{m}\sum_{j=-n}^{n}[I_{D,R}(k+i,l+j)-\bar{I}_{D,R}(k,l)]\cdot[I_{D,L}(k+i+\delta,l+j)-\bar{I}_{D,L}(k+\delta,l)]}{\sqrt{\sum_{i=-m}^{m}\sum_{j=-n}^{n}[I_{D,R}(k+i,l+j)-\bar{I}_{D,R}(k,l)]^2}\sqrt{\sum_{i=-m}^{m}\sum_{j=-n}^{n}[I_{D,L}(k+i+\delta,l+j)-\bar{I}_{D,L}(k+\delta,l)]^2}} \tag{28}$$

where, $\bar{I}_{A,R}(k,l)$ is the average intensity of the actual pixels in a window (not shown) similar to window 216 in the distortion-corrected color image $A_{RIGHT}$, wherein the center of this window is defined by indices (k,l)

$\bar{I}_{B,R}(k,l)$ is the average intensity of the actual pixels in a window (not shown) similar to window 216 in the image $B_{RIGHT}$, wherein the center of this window is defined by indices (k,l)

$\bar{I}_{C,R}(k,l)$ is the average intensity of the actual pixels in a window (not shown) similar to window 216 in the image $C_{RIGHT}$, wherein the center of this window is defined by indices (k,l)

$\bar{I}_{D,R}(k,l)$ is the average intensity of the actual pixels in a window (not shown) similar to window 216 in the image $D_{RIGHT}$, wherein the center of this window is defined by indices (k,l)

$\bar{I}_{A,L}(k+\delta,l)$ is the average intensity of the pixels (either actual or interpolated) in a window (not shown) similar to window 200 in the image $A_{INT}$, wherein the center of this window is defined by indices (k+δ,l)

$\bar{I}_{B,L}(k+\delta,l)$ is the average intensity of the pixels (either actual or interpolated) in a window (not shown) similar to window 200 in the image $B_{INT}$, wherein the center of this window is defined by indices (k+δ,l)

$\bar{I}_{C,L}(k+\delta,l)$ is the average intensity of the pixels (either actual or interpolated) in a window (not shown) similar to window 200 in the image $C_{INT}$, wherein the center of this window is defined by indices (k+δ,l)

$\bar{I}_{D,L}(k+\delta,l)$ is the average intensity of the pixels (either actual or interpolated) in a window (not shown) similar to window 200 in the image $D_{INT}$, wherein the center of this window is defined by indices (k+δ,l)

In the example set forth in FIG. 5E, assuming that each of right distortion-corrected image 190C and left distortion-corrected image 192C includes no margins, $$1 \leq k \leq 188 \tag{29}$$

and $$1 \leq l \leq 144 \tag{30}$$

The solution of (16) is, $$(1-\rho_A^2)+(1-\rho_B^2)+(1-\rho_C^2)+(1-\rho_D^2) \tag{31}$$

and is designated by s, which herein below is referred to as "similarity level parameter". At each discrete value (in units of pixels and at a resolution of quarter of a pixel) of δ, processor 108 computes $\rho_A(k,l)$, $\rho_B(k,l)$, $\rho_C(k,l)$ and $\rho_D(k,l)$, according to (25), (26), (27), and (28), respectively, and further computes (31) according to (25), (26), (27), and (28), thereby yielding a set of values s for the similarity level parameter. Processor 108 selects an optimum value of δ among different values of δ, for which the value of s is the minimum among different values of s, as the disparity δ of pixel 186 in right distortion-corrected image 190C. At this minimum value of s, $\rho_A(k,l)$, $\rho_B(k,l)$, $\rho_C(k,l)$ and $\rho_D(k,l)$ are equal to the right side of (25), (26), (27), and (28), respectively. It is noted that as s approaches zero, the certainty that a certain window in left distortion-corrected image 192C is similar to window 216 in right distortion-corrected image 190C, increases.

For example, if m=4 and n=4, then window 216 includes a field of 9 rows (2×4+1=9) and 9 columns (2×4+1=9), four columns to the right and to the left of central actual pixel 186 (i.e., m=4), and four rows above and below central actual pixel 186 (i.e., n=4). With respect to a window similar to window 200 (FIG. 5F), processor 108 computes (31) while taking into account only the actual pixels in this window, when the central pixel of this window is an actual pixel, and the interpolated pixels, when the central pixel of this window is an interpolated pixel.

For example, if the central interpolated pixel in a certain window (not shown), is interpolated pixel 210 (FIG. 5F), which is located at row 100 and column 150+½ pixel, then processor 108 takes into account only the interpolated pixels in columns 146+½ pixel, 147+½, 148+½, 149+½, 150+½, 151+½, 152+½, 153+½, and 154+½ (which are designated by dotted squares in FIG. 5F). It is noted that in this case, window 200 has shifted by two quarters of a pixel (i.e., half a pixel) to the right, relative to central actual pixel 206.

According to the example described herein above, where it is assumed that the disparity range is between minus 5 pixels and plus 5 pixels, and the central pixels are selected at increments of quarter of a pixel, processor 108 computes (31), (i.e., examines criterion (16)) a total of 44 times (11×1/0.25=44) in order to determine a matching pixel for actual pixel 186. For computing (31) for each value of δ, processor 108 produces a window similar to window 200, for each of the colors A, B, C, and D (i.e., a window in each of the images $A_{INT}$, $B_{INT}$, $C_{INT}$, and $D_{INT}$).

Processor 108 computes the confidence percent level according to, $$(1-s/4)\cdot 100 \qquad (32)$$

In case the successive confidence percent levels are greater than a predetermined threshold, then processor 108 can reduce the range of disparities, thereby narrowing down the search in left distortion-corrected image 192C, to a smaller number of windows similar to window 200 (FIG. 5F), and finding the matching pixel much more rapidly. For example, processor 108 can set the range of disparities to between plus 3 pixels and minus 3 pixels, and thereby according to above example, search for the matching pixel in left distortion-corrected image 192C, between columns 147 (150−3=147) and 153 (150+3=153). It is noted that the optimum value of δ is substantially the same between the $A_{RIGHT}$ and $A_{INT}$ images, as well between $B_{RIGHT}$ and $B_{INT}$ images, $C_{RIGHT}$ and $C_{INT}$ images, and $D_{RIGHT}$ and $D_{INT}$ images.

It is noted that the matching pixel could be either an actual pixel or an interpolated pixel. It is further noted that since processor 108 performs the cross correlation in increments of a fraction of a pixel (and not a whole pixel, according to above example every quarter of a pixel), the accuracy by which processor 108 can locate the matching pixel and determine the disparity, and thus determine the depth, is increased four fold, compared to the case where the processor advances in whole pixel increments.

If actual pixel 188 (FIG. 5C) in column 148 of left distortion-corrected image 192C, matches actual pixel 186 in right distortion-corrected image 190C, then processor 108 determines that the disparity for point 138A (FIG. 2) of the object is 2 pixels (150−148=2), at a confidence percent level of for example, 85% (procedure 176 in FIG. 4). Processor 108 determines the depth of point 138A, accordingly, and likewise the depth of other points of the object. When the user selects via user interface 112 (FIG. 2), a point on an image (not shown) of the object displayed in display 110, processor 108 determines the depth at this point (as described herein below), and display 110 displays a superposition of the value of this depth on the image.

Alternatively, the user can select two points on the image, respective of two respective points on the object, for processor 108 to determine the distance between these two points. Display 110 then displays a superposition of the value of this distance on the image. Further alternatively, processor 108 can determine the volume of the object (e.g., a tumor), the mass thereof, the surface area, the amount by which the tumor protrudes from a background, and the like, according to the depth data, and perform graphical operations on the object, such as rotation, translation, zoom, stretch, and the like.

The outcome of the cross correlation procedure described herein above, is a disparity value associated with each pixel of right distortion-corrected image 190C (FIG. 5C), except those pixels which are located at the margins of the image. The disparity for that pixel in each of the images for the A, B, C, and D colors is substantially the same.

According to the cross correlation procedure described herein above, processor 108 determines a plurality of color intensity distribution differences between the color intensity distribution of a window similar to window 216 (FIG. 5C), and those of a plurality of windows similar to window 200 (FIG. 5F). Processor 108 selects pixel 188 (FIG. 5C) as the pixel matching pixel 186, which is located at the center of a window similar to window 200, which corresponds to the minimum difference among the color intensity distribution differences.

According to another aspect of the disclosed technique, and according to a first filtering procedure, the processor eliminates a disparity value associated with a certain pixel (i.e., removes outliers), from the disparity map, which satisfies either one of the following criteria:

The disparity associated with the pixel, is larger than a certain multiple of the standard deviation (e.g., 3σ) of the average disparity of a predetermined number of pixels in the neighborhood of the pixel (e.g., four pixels in the immediate neighborhood of the pixel)

The similarity level parameter s is larger than a certain multiple of the standard deviation of the average similarity level parameter respective of a predetermined number of pixels in the neighborhood of the pixel The cross validation of the surface normal associated with the pixel is unacceptable The larger the window, the more sensitive is the cross correlation procedure to the image data, the better processor 108 can overcome inaccuracies due to noise, and the smaller the window, the less reliable is the result of the cross correlation procedure. However, if the window is too large, and since in case of windows the image data is averaged, then sharp changes in depth (i.e., sharp changes in the value of disparity), are substantially equalized. The appropriate size of the window can be found by trial and error. It is noted that the cross correlation method described herein above, applies to a right image and a left image of an object detected by a single image detector, as well as to those detected by two separate image detectors.

According to a further aspect of the disclosed technique, the processor can eliminate the disparity of certain pixels from the disparity map, according to a second filtering procedure. As described herein above, the processor determines a first matching pixel in a first image, for a pixel in a second image, according to a first cross correlation procedure in which the second image is a reference image. In this manner, the processor determines a first disparity value respective of the pixel in the second image, according to the indices of that pixel and those of the first matching pixel.

According to the second filtering procedure, the processor determines a second matching pixel in the second image for the first matching pixel, and a second disparity value respective of the pixel in the second image, according to the indices of the first matching pixel and those of the second matching pixel. The processor determines whether to eliminate the first disparity value from the disparity map, or not, according to the first disparity value, the second disparity value, and a predetermined range. In case the processor determines to leave the first disparity value, the processor determines a more accurate value respective of the first disparity value, according to the first disparity value and the second disparity value.

Assume that processor 108 has performed a first cross correlation procedure on right distortion-corrected image 190C, as described herein above in connection with FIGS. 5C, 5D, 5E, and 5F, and determined that a first disparity associated with pixel 186 has a value of a, and that pixel 188 in left distortion-corrected image 192C matches pixel 186. According to the second filtering procedure, processor 108 performs another cross correlation procedure in a direction opposite to that of the first cross correlation procedure, for determining a pixel in right distortion-corrected image 190C, which matches pixel 188 in left distortion-corrected image 192C.

For this purpose, processor 108 produces four images similar to images $A_{INT}$, $B_{INT}$, $C_{INT}$, and $D_{INT}$ (FIG. 5E), according to $A_{RIGHT}$, $B_{RIGHT}$, $C_{RIGHT}$, $D_{RIGHT}$, respectively, in the four colors A, B, C, and D, by interpolating between every two adjacent pixels in each of the $A_{RIGHT}$, $B_{RIGHT}$, $C_{RIGHT}$, $D_{RIGHT}$ images. Processor 108 finds a pixel (not shown) in right distortion-corrected image 190C, which matches pixel 188 in left distortion-corrected image 192C, and determines a second disparity value having a value of b, according to the indices of pixel 188 and those of the matching pixel in right distortion-corrected image 190C. Processor 108 determines a sum e of the first disparity and the second disparity, $$e=a+b \quad (33)$$

The ideal case for keeping the first disparity associated with pixel 186 is that e=0, (i.e., a=−b). If e≠0, and $$-\epsilon \leq e \leq \epsilon \quad (34)$$

where $\epsilon$ is a predetermined constant (e.g., $\epsilon$=1), then processor calculates a calculated disparity value of $$c=(|a|+|b|)/2 \cdot \text{sign}(a) \quad (35)$$

and assigns the value of c for the disparity of pixel 186. Otherwise, processor 108 eliminates the disparity associated with pixel 186 from the disparity map. It is noted that processor 108 can determine whether to eliminate or not to eliminate a disparity associated with a pixel in right distortion-corrected image 190C, by employing either the first filtering procedure, the second filtering procedure, or both. It is noted that the second cross correlation method described herein above, applies to a right image and a left image of an object detected by a single image detector, as well as to those detected by two separate image detectors.

According to another aspect of the disclosed technique, the processor determines a matching pixel in a first image, for a pixel in a second image, by employing a gradient procedure, according to the gradient of the pixel in the second image, and the gradients of a plurality of pixels in the first image. The processor performs the gradient procedure by producing a modified image according to the first image, for each color, wherein each modified image includes a plurality of interpolated pixels.

Assume that processor 108 is operative to determine a pixel in left distortion-corrected image 192C, which matches pixel 186 in right distortion-corrected image 190C. Processor 108 produces the distortion-corrected color images $A_{RIGHT}$, $B_{RIGHT}$, $C_{RIGHT}$, $D_{RIGHT}$, $A_{LEFT}$, $B_{LEFT}$, $C_{LEFT}$, and $D_{LEFT}$ (FIG. 5E), and filters the noise from the distortion-corrected color images $A_{RIGHT}$, $B_{RIGHT}$, $C_{RIGHT}$, $D_{RIGHT}$, $A_{LEFT}$, $B_{LEFT}$, $C_{LEFT}$, and $D_{LEFT}$. Processor 108 performs this filtering operation by employing a low-pass filter.

For each pixel (except those in the margins) in each of the images distortion-corrected color images $A_{RIGHT}$, $B_{RIGHT}$, $C_{RIGHT}$, $D_{RIGHT}$, processor 108 determines a gradient component $h_{RX}$ along a horizontal axis of the image detector, and a gradient component $h_{RY}$ along a vertical axis thereof. Likewise, processor 108 determines gradient components $h_{LX}$ and $h_{LY}$ respective of each pixel in each of the images $A_{LEFT}$, $B_{LEFT}$, $C_{LEFT}$, and $D_{LEFT}$.

Processor 108 determines a vectorial gradient $h_R$ for each pixel in right distortion-corrected image 190C, according to $$h_R(k,l)=[h_{RX}(k,l) h_{RY}(k,l)]^T \quad (36)$$

and a vectorial gradient $h_L$ for each pixel in left distortion-corrected image 192C, according to $$h_L(k,l)=[h_{LX}(k,l) h_{LY}(k,l)]^T \quad (37)$$

where k and l are the two-dimensional coordinates of a pixel in right distortion-corrected image 190C (respective of Equation 36), and of a pixel in left distortion-corrected image 192C (respective of Equation 37).

In the following example, processor 108 interpolates three pixels between every two adjacent pixels. Hence, processor 108 produces four images associated with each of the images $A_{INT}$, $B_{INT}$, $C_{INT}$, and $D_{INT}$ (i.e., modified images). For example, for the $A_{INT}$ image, processor 108 produces an actual image $A_L$ which includes only the actual pixels, an interpolated image $A_L+\frac{1}{4}$ which includes only the interpolated pixels located in the columns $\frac{1}{4}$ pixel to the right of each of the actual pixels, an interpolated image $A_L+\frac{1}{2}$ which includes only the interpolated pixels located in the columns $\frac{1}{2}$ pixel to the right of each of the actual pixels, and an interpolated image $A_L+\frac{3}{4}$ which includes only the interpolated pixels located in the columns $\frac{3}{4}$ pixel to the right of each of the actual pixels. In this case, each of the images $A_L$, $A_L+\frac{1}{4}$, $A_L+\frac{1}{2}$, and $A_L+\frac{3}{4}$ has a field of 144 rows and 188 columns. The images $B_L$, $B_L+\frac{1}{4}$, $B_L+\frac{1}{2}$, $B_L+\frac{3}{4}$, $C_L$, $C_L+\frac{1}{4}$, $C_L+\frac{1}{2}$, $C_L+\frac{3}{4}$, $D_L$, $D_L+\frac{1}{4}$, $D_L+\frac{1}{2}$, and $D_L+\frac{3}{4}$, are defined in a similar manner, with respect to the colors B, C, and D. Likewise, processor 108 produces four distortion-corrected color images $A_{RIGHT}$, $B_{RIGHT}$, $C_{RIGHT}$, and $D_{RIGHT}$, as described herein above in connection with FIG. 5E.

According to above example, where processor 108 interpolates three pixels between every two adjacent pixels, in every row of left distortion-corrected image 190C, processor 108 searches for a pixel in left distortion-corrected image, which matches pixel 186 in right distortion-corrected image 190C, according to $$\text{Max}_\delta[U_T(k,l,\delta), U_{T+1/4}(k,l,\delta), U_{T+1/2}(k,l,\delta), U_{T+3/4}(k,l,\delta)] \quad (38)$$

where $U_T(k,l,\delta)$ is associated with the images $A_L$, $A_{RIGHT}$, $B_L$, $B_{RIGHT}$, $C_L$, $C_{RIGHT}$, $D_L$, and $D_{RIGHT}$, $U_{T+1/4}(k,l,\delta)$ is associated with the images $A_L+\frac{1}{4}$, $A_{RIGHT}$, $B_L+\frac{1}{4}$, $B_{RIGHT}$, $C_L+\frac{1}{4}$, $C_{RIGHT}$, $D_L+\frac{1}{4}$, and $D_{RIGHT}$, where $U_{T+1/2}(k,l,\delta)$ and $U_{T+3/4}(k,l,\delta)$ are defined in a similar manner, where, $$U_T(k,l) = \sum_{i=-m}^{m} \sum_{j=-n}^{n} Q_T(k+i, l+j, \delta) W(i,j) \quad (39)$$

$$U_{T+1/4}(k,l) = \sum_{i=-m}^{m} \sum_{j=-n}^{n} Q_{T+1/4}(k+i, l+j, \delta) W(i,j) \quad (40)$$

$$U_{T+1/2}(k,l) = \sum_{i=-m}^{m} \sum_{j=-n}^{n} Q_{T+1/2}(k+i, l+j, \delta) W(i,j) \quad (41)$$

$$U_{T+3/4}(k,l) = \sum_{i=-m}^{m} \sum_{j=-n}^{n} Q_{T+3/4}(k+i, l+j, \delta) W(i,j) \quad (42)$$

$$Q_T(k, l, \delta) = Q_A(k, l, \delta) + Q_B(k, l, \delta) + Q_C(k, l, \delta) + Q_D(k, l, \delta) \quad (43)$$

$$Q_{T+1/4}(k, l, \delta) = \quad (44)$$
$$Q_{A+1/4}(k, l, \delta) + Q_{B+1/4}(k, l, \delta) + Q_{C+1/4}(k, l, \delta) + Q_{D+1/4}(k, l, \delta)$$

$$Q_{T+1/2}(k, l, \delta) = \quad (45)$$
$$Q_{A+1/2}(k, l, \delta) + Q_{B+1/2}(k, l, \delta) + Q_{C+1/2}(k, l, \delta) + Q_{D+1/2}(k, l, \delta)$$

$$Q_{T+3/4}(k, l, \delta) = \quad (46)$$
$$Q_{A+3/4}(k, l, \delta) + Q_{B+3/4}(k, l, \delta) + Q_{C+3/4}(k, l, \delta) + Q_{D+3/4}(k, l, \delta)$$

$$Q_A(k, l, \delta) = \quad (47)$$
$$K_1 \left\{ \sqrt{[h_R(k,l)]^T \cdot [h_R(k,l)]} + \sqrt{[h_L(k+\delta,l)]^T \cdot [h_L(k+\delta,l)]} \right\} +$$
$$K_2 \sqrt{[h_R(k,l) - h_L(k+\delta,l)]^T \cdot [h_R(k,l) - h_L(k+\delta,l)]} +$$
$$K_3 \| I_{A,R}(k,l) - I_{A,L}(k+\delta,l) \|$$

where the terms $Q_B(k,l,\delta)$, $Q_C(k,l,\delta)$ and $Q_D(k,l,\delta)$ are defined as in (47), by replacing the letter A with B, C, and D, respectively, and $K_1$, $K_2$, and $K_3$ are constants, where $K_1 \geq 0$, $K_2 < 0$, and $K_3 \leq 0$, $I_{A,R}(k,l)$ is the intensity of a pixel in color A, in a window (not shown) similar to window 216 in the distortion-corrected color image $A_{RIGHT}$, wherein the center of this window is defined by indices (k,l), and $I_{A,L}(k+\delta,l)$ is the intensity of a pixel in a window (not shown) similar to window 200 in the image $A_{INT}$, wherein the center of this window is defined by indices $(k+\delta,l)$.

Thus, $Q_A(k,l,\delta)$ relates to the images $A_{RIGHT}$ and $A_L$, $Q_B(k,l,\delta)$ relates to the images $B_{RIGHT}$ and $B_L$, $Q_C(k,l,\delta)$ relates to the images $C_{RIGHT}$ and $C_L$, and $Q_D(k,l,\delta)$ relates to the images $D_{RIGHT}$ and $D_L$. The term $Q_{A+1/4}(k,l,\delta)$ is defined as in (47), by replacing the letter A by $A+\frac{1}{4}$, and likewise for other terms on the right side of (44), and for the terms on the right side of (45) and (46). For example, the term $Q_A+\frac{1}{4}(k,l,\delta)$ relates to the images $A_{RIGHT}$ and $A_L+\frac{1}{4}$. Furthermore, $\delta$, k, and l are as defined herein above in connection with (16), and W(i,j) is a weighted function.

Processor 108 produces a window (not shown) of 2 m+1 by 2 n+1 around a central pixel (either actual or interpolated), in each of the images A, $A+\frac{1}{4}$, $A+\frac{1}{2}$, and $A+\frac{3}{4}$. Processor 108 produces similar windows in each of the images B, $B+\frac{1}{4}$, $B+\frac{1}{2}$, and $B+\frac{3}{4}$, in each of the images C, $C+\frac{1}{4}$, $C+\frac{1}{2}$, and $C+\frac{3}{4}$, and in each of the images D, $D+\frac{1}{4}$, $D+\frac{1}{2}$, and $D+\frac{3}{4}$.

In the example described herein above, processor 108 searches for a matching pixel in left distortion-corrected image 192C, for pixel 186 in right distortion-corrected image 190C, within a range of plus 5 pixels and minus 5 pixels about the column index of pixel 186 in the same row as that of pixel 186. Thus, processor 108 computes each of (39), (40), (41), and (42) a total of 11 times.

Processor 108 attributes the central pixel (either actual or interpolated) which is associated with the greatest value among the terms $U_T$, $U_{T+1/4}$, $U_{T+1/2}$ and $U_{T+3/4}$, as the pixel which matches pixel 186 in right distortion-corrected image 190C. Processor 108 determines the disparity associated with pixel 186, accordingly, and so on for other pixels in right distortion-corrected image 190C. The first term on the right side of (47) can be regarded as the absolute value of the vectorial gradients of a pixel in the right image (e.g., the image $A_{RIGHT}$), and of a pixel in the left image (e.g., the image $A_L$). The second term on the right side of (47) can be regarded as the absolute value of the vectorial gradient difference between the pixel in the right image and the pixel in the left image. The third term on the right side of (47), can be regarded as the absolute value of the difference between the color image intensity of the pixel in the right image, and of the pixel in the left image. The greater the value of the first term on the right side of (47), and the less the value of the second and the third terms on the right side of (47), the greater the value of $Q_A(k,l,\delta)$, and the greater the probability that the two pixels are similar and match with one another. Therefore, this is the reason for selecting the maximum of (38) as the criterion for the matching pixel.

Processor 108 can eliminates from the disparity map, certain disparities thus determined, either by employing the first filtering procedure, the second filtering procedure, or both, as described herein above. In case processor 108 had determined the disparities according to the gradient procedure, processor 108 performs the second filtering procedure according to the gradient procedure. It is noted that the gradient method described herein above, applies to a right image and a left image of an object detected by a single image detector, as well as to those detected by two separate image detectors.

Applicant has found that each of right distortion-corrected image 190C and left distortion-corrected image 192C is still distorted after correcting the image distortion as described herein below, especially at the margins of each of right distortion-corrected image 190C and left distortion-corrected image 192C (i.e., the epipolar constraint does not hold within the margins). Therefore, in the margins of left distortion-corrected image 192C, processor 108 searches for a matching pixel for an examined actual pixel in right distortion-corrected image 190C, in two rows of left distortion-corrected image 192C, one above and one below the row in which the examined pixel is located, in addition to the row in which the examined actual pixel is located (according to the example in FIGS. 5C, 5D, 5E, and 5F, in rows 99 and 101, as well as in row 100).

In case of each of windows 216 (FIG. 5C) and 200 (FIG. 5F), which is 9×9, applicant has found that this margin is 10 pixels from each of the right boundary and the left boundary horizontally, and 6 pixels from each of the upper boundary and the lower boundary vertically. The epipolar constraint for the inner region (not shown) excluding the margins, substantially holds, and processor 108 performs either the cross correlation procedure or the gradient procedure, as described herein above in connection with FIGS. 5C, 5D, 5E and 5F, respective of the pixels which are located within this inner region. Since the gradient procedure as described herein above, generates noise, it is necessary to employ a filter in order to filter out this noise.

Processor 108 produces a 3D image of the object as follows. Processor 108 determines the X and Y coordinates of every pixel of the 3D image according to, $$X=(z/v)[(x_1+x_2)/2] \quad (48)$$

and $$Y=(z/v)[(y_1+y_2)/2] \quad (49)$$

where the Z coordinate of the 3D image is, $$z = \frac{DfS_0}{Df + \delta(S_0 - f)\sigma v} \quad (50)$$

and where, $$v = S_0 f / (S_0 - f) \quad (51)$$

$$x_1 = (x_{right} - X_0)\sigma_x v \quad (52)$$

$$x_2 = (x_{left} - X_0)\sigma_x v \quad (53)$$

$$y_1 = (y_{right} - Y_0)\sigma_y v \quad (54)$$

$$y_2 = (y_{left} - Y_0)\sigma_y v \quad (55)$$

$$\delta = |x_1 - x_2| \quad (56)$$

$\sigma_x$ is the resolution of the image detector along the X axis, $\sigma_y$ is the resolution of the image detector along the Y axis, v (image dilution) is the number of color filters on the image detector (e.g., in case of the A, B, C, and D colors, v=4), $X_{right}$ and $Y_{right}$ are the coordinates of actual pixel 186 (FIG. 5C) in right distortion-corrected image 190C (according to above example, 100 and 150, respectively), $x_{left}$ and $y_{left}$ are the coordinates of the matching pixel 188 in left distortion-corrected image 192C (according to above example, 100 and 148, respectively), and $X_0$ and $Y_0$ are the coordinates of the center (not shown) of the image detector. It is noted that the method for producing a 3D image of an object described herein above, applies to a right image and a left image of the object detected by a single image detector, as well as to those detected by two separate image detectors.

The value of $S_0$ during calibration of optical device 100, is found by employing a substantially flat target (not shown), which is divided to a right white section (not shown) and a left black section (not shown). The target is placed at zero-disparity object plane 118 (FIG. 2), wherein point 126A falls on a vertical dividing line (not shown) between the white and black sections.

At some positions of the target relative to the optical assembly principle plane, the image detector detects two sets of 2D images (not shown) for the dividing line (i.e., the disparity is non-zero). The target is moved back and forth along optical axis 116, until the image detector detects a single set of 2D images respective of the dividing line (i.e., a position where the change in intensity is greater than a predetermined threshold, for example, 50% and the disparity $\delta_1$ is substantially zero). The value of $S_0$ is determined at this position of zero-disparity object plane 118. The value of $S_0$ can be found either manually or automatically.

Processor 108 eliminates certain disparity values from the disparity map, by employing either the first filtering procedure, the second filtering procedure, or both, as described herein above. As a result of the filtering procedure, the disparity map is substantially discontinuous. Processor 108 performs an interpolation procedure, such as radial basis function (RBF), and the like, on the disparity map, in order to smooth out the discontinuities and produce a substantially continuous disparity map (i.e., to fill out those disparity values which processor 108 had eliminated, according to the remaining disparity values which processor 108 had not eliminated). Since the intensity of every pair of matching pixels (e.g., pixels 186 and 188—FIG. 5C) in right distortion-corrected image 190C, and in left distortion-corrected image 192C are substantially identical, processor 108 performs the RBF function on only one of right distortion-corrected image 190C and left distortion-corrected image 192C.

The RBF function g(x) is of the general form, $$g(x) = q(x) + \sum_{i=1}^{N} \lambda_i \phi(|x - x_i|) \quad (57)$$

where x is the location at which interpolation is to be performed, $x_i$ is the center of the RBF, q(x) is for example, a first order polynomial, $\lambda$ is a constant, and $$\phi(r) = r^2 \log(r) \quad (58)$$

This form of $\phi(r)$ of the RBF function is known as the thin-plate spline. (57) can be written in matrix form, $$\begin{vmatrix} A & Q \\ Q^T & 0 \end{vmatrix} \begin{vmatrix} \lambda \\ c \end{vmatrix} = \begin{vmatrix} g \\ 0 \end{vmatrix} \quad (59)$$

where, $$A_{i,j} = \phi(|x_i - x_j|) \quad i, j = 1, 2 \ldots N \quad (60)$$

$$Q_{i,j} = q_j(x_i) \quad i = 1, 2 \ldots N \quad j = 1, 2 \ldots L \quad (61)$$

and Q is for example, a first order polynomial.

Equation (59) solves for the coefficients $\lambda$ and c, thereby finding the RBF function g(x). The centers $x_i$ of the RBF are determined by employing a clustering algorithm such as K mean, Fuzzy K mean, C mean, and the like. The clustering algorithm is employed to select a set of representative points (i.e., maximum gray level gradient in Y format) among a cloud of points, in order to reduce the number of simultaneous equations which have to be solved.

Processor 108 can examine the validity of the block matching method (e.g., cross correlation procedure, or gradient procedure, as described herein above), and the RBF function according to the following procedure. Processor 108 applies a known disparity function (e.g., a parabolic function) to one of the two images of the object (e.g., the left image), thereby obtaining a right image. In this manner, processor 108 produces a controlled disparity map between the right and left images, and stores this controlled disparity map in a memory (not shown).

Processor 108 determines an empirical disparity map between these right and left images, by applying a block matching procedure (e.g., cross correlation procedure or gradient procedure), and the RBF method to these two images, as described herein above. Processor 108 determines the validity of the block matching method and the RBF method by comparing the empirical disparity map with the controlled disparity map.

Processor 108 can determine the depth of selected points on the object, according to the respective disparity value, by employing a look-up table which is constructed during a calibration stage of optical device 100. For this purpose, the image detector detects a plurality of images of a point, such as a fiducial (not shown) located on near object plane 114, while the depth S is incrementally varied. Processor 108 determines the disparity of the image of that point at each of the known depths, thereby forming a look-up table of depth versus disparity.

Processor 108 can determine the depth respective of every pixel, by identifying the depth in the look-up corresponding with the determined disparity, or by interpolating between two disparity entries. Processor 108 can perform this interpolation for example, according to the first two terms of the Taylor series. Alternatively, processor 108 can construct a mathematical function, such as a power series (i.e., polynomial), and the like, according to the entries of the look-up table, and determine the depth according to this mathematical function.

It is noted that since a single optical assembly is employed with a single image detector in optical device 100, the differences between the optical characteristics of the right image and the left image, such as scale, aberration, distortion, and the like, are substantially smaller than in the case of a device which employs two image detectors to obtain the right image and left images.

Following is a description of the image distortion correction model which is utilized in procedure 172 (FIG. 4), to correct the image distortion in right distorted image 190A (FIG. 5A) and left distorted image 192A. It is assumed that the theoretical distortion model of the optical assembly is determined during design of the optical assembly. Hence, the theoretical image distortion caused by the optical assembly at every pixel of the image detector is known. Likewise, the horizontal correction value $h_c^X$ for correcting the theoretical image distortion along the horizontal axis, as well as the vertical correction value $h_c^Y$ for correcting the theoretical image distortion along the vertical axis, are known.

Thus, a look-up table can be constructed during calibration of optical device 100, which includes a horizontal correction value entry and a vertical correction value entry for every pixel entry of the image detector. During operation of optical device 100, processor 108 can correct the image distortion in each of right distorted image 190A and left distorted image 192A, by retrieving the horizontal correction value and the vertical correction value for a selected pixel, and applying the respective correction to each pixel of each image. Processor 108 interpolates between pixels to determine the corresponding horizontal correction value and vertical correction value, for those pixels which are missing from the look-up table.

Alternatively, each of horizontal correction model $f_c^X$ and vertical correction model $f_c^Y$ can be represented as a power series, $$\frac{(x_{CORRECTED} - x_0)}{x_{max}} = f_c^X(x_{DISTORTED}, y_{DISTORTED}) == \quad (62)$$

$$\sum_{n=0}^{N}\sum_{m=0}^{M} A_{n,m} \left[\frac{(x_{DISTORTED} - x_0)}{x_{max}}\right]^n \left[\frac{(y_{DISTORTED} - y_0)}{y_{max}}\right]^m$$

and, $$\frac{(y_{CORRECTED} - y_0)}{y_{max}} = f_c^Y(x_{DISTORTED}, y_{DISTORTED}) == \quad (63)$$

$$\sum_{n=0}^{N}\sum_{m=0}^{M} B_{n,m} \left[\frac{(x_{DISTORTED} - x_0)}{x_{max}}\right]^n \left[\frac{(y_{DISTORTED} - y_0)}{y_{max}}\right]^m$$

where $c_{CORRECTED}$ and $y_{CORRECTED}$ are the coordinates of the corrected distorted current pixel, $x_0$ and $y_0$ are the coordinates of the center of distortion of right distorted image 190A and of left distorted image 192A, respectively, $x_{DISTORTED}$ and $y_{DISTORTED}$ are the coordinates of the distorted current pixel, and $A_{n,m}$ and $B_{n,m}$ are the coefficients of the respective power series. Each of $x_{max}$ and $y_{max}$ is determined according to an optical model of the optical device at the design stage. For this purpose, for example, a rectangular region is determined in order to define the boundaries of an undistorted image which is detected by a round lens. $x_{max}$ then is the distance between a center of this rectangular region and one of the sides of the rectangular region, along a horizontal axis of the undistorted image. Likewise, the value of $y_{max}$ is determined along a vertical axis of the undistorted image. The value of $x_0$ and $y_0$ in the optical model is substantially equal to zero. A method for determining the coordinates of the center of distortion according to the disclosed technique, is described herein below in connection with FIG. 6.

Applicant has found out that the following correction models are appropriate for the optical parameters of optical device 100 which were mentioned in the example herein above, $$f_c^X(X, Y) = a_{00} + a_{01}x' + a_{20}x'^2 + a_{30}x'^3 + a_{50}x'^5 + \quad (64)$$
$$a_{02}y'^2 + a_{12}x'y'^2 + a_{22}x'^2y'^2 + a_{32}x'^3y'^2 + a_{52}x'^5y'^2$$

$$f_c^Y(X, Y) = c_{01}y' + c_{11}x'y' + c_{21}x'^2y' + c_{30}y'^3 + \quad (65)$$
$$c_{13}x'y'^3 + c_{23}x'^2y'^3 + c_{05}y'^5 + c_{15}x'y'^5 + c_{25}x'^2y'^5$$

where, $$x' = \frac{(x - x_0)}{x_{max}} \quad (66)$$

$$y' = \frac{(y - y_0)}{y_{max}} \quad (67)$$

$$-1 \leq x' \leq 1 \text{ and,} \quad (68)$$

$$-1 \leq y' \leq 1 \quad (69)$$

where x and y are the coordinates of the current pixel (i.e., the pixel whose distortion has to be corrected), and $x_0$ and $y_0$ define the center of each of the color images $A_{RIGHT}$, $B_{RIGHT}$, $C_{RIGHT}$, $D_{RIGHT}$, $A_{LEFT}$, $B_{LEFT}$, $C_{LEFT}$, and $D_{LEFT}$. Thus, each of x' and y' is a normalized value of each of x and y parameters. The term $(x-x_0)$ in (66) is in units of pixels while $x_{max}$ is in units of length (e.g., millimeters). Units of pixels are converted to units of length, by taking into account the resolution of a pixel of the image detector along the horizontal axis. Likewise, the units of pixels in (67) are converted to units of length. Equation (64) is an even function along the X axis and an odd function along the Y axis, whereas Equation (65) is an odd function along the X axis and an even function along the Y-axis.

During design of the optical device, two images of for example, a 21×21 grid (i.e., 441 points) are produced according to the optical model. In one image these points describe a plurality of distorted locations, and in the other image, a plurality of distortion corrected locations. The coordinates of the 441 points in the two images are known in a global coordinate system. The left side of (64) and (65) is the amount by which a pixel is distorted according to the optical model of the optical device. The x' and y' coordinates of each of the 441 points is plugged in the right side of each of (64) and (65). In this manner, 441 simultaneous Equations are obtained, the solution of which provides the values of the coefficients of (64) and (65). The value of the coefficients in each of (64) and

(65) depends on the IPD value of the optical device. During operation of optical device 100, processor 108 determines the image distortion correction model for the right image and for the left image, according to (64) and (65), and further determines the coordinates of the center of distortion, and the coordinates of at least a portion of the pixels in each of the right and the left image.

Figure 6:
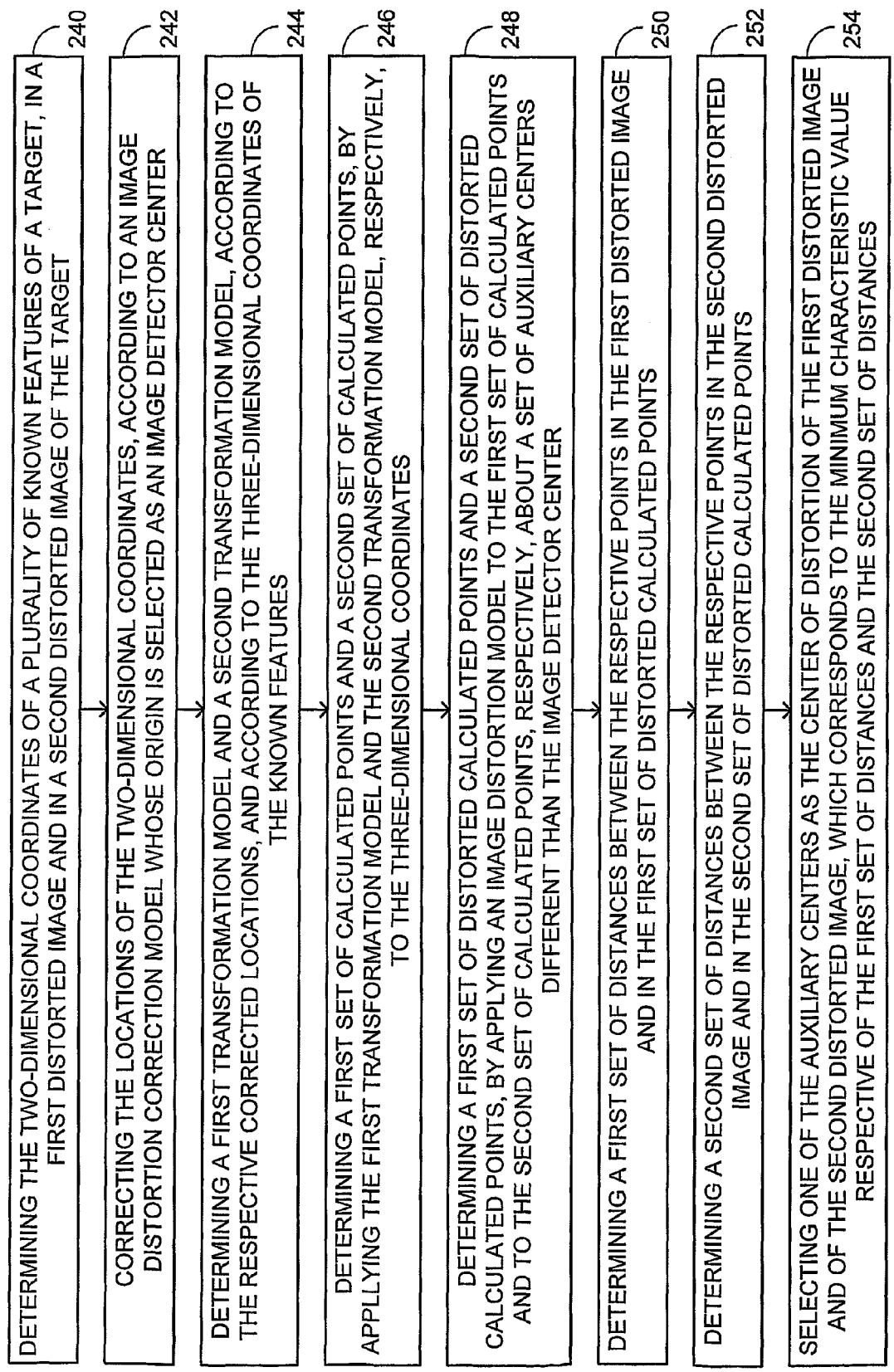
FIG. 6 is a schematic illustration of a method for determining a center of distortion of a first distorted image and a second distorted image respective of an optical device, operative in accordance with a further embodiment of the disclosed technique.

In applying the distortion correction models (64) and (65) to correct a distorted image, as in procedure 172 described herein above, x is set to the horizontal index of the current pixel, $x_0$ is set to the center of distortion of the distorted image, as determined in the method of FIG. 6 described herein below, and $x_{max}$ is determined according to the optical model, as described herein above. Likewise, the values of y, $y_0$ and $y_{max}$ are plugged into (67).

Since a single optical assembly and a single image detector are employed in optical device 100, the image distortions in each of the right image and the left image are substantially symmetric and a mirror image of one another. Therefore, (64) and (65) for the right image and the left image are identical, except the appropriate differences in the signs of one or more of the coefficients on the right side of each of Equations (64) and (65).

It is noted that distortion correction models (64) and (65) apply to a right image and a left image of an object detected by a single image detector, as well as to those detected by two separate image detectors. In case of two image detectors, if the optical models of the two image detectors are substantially identical, and if the two image detectors are substantially identical, then the coefficients of each of (64) and (65) are substantially the same for the two image detectors. Therefore, it is sufficient to determine the coefficients of each of (64) and (65) for only one of the image detectors. In case the optical models for the two image detectors are different and the image detectors are different, then the distortion correction models for the two image detectors are different.

An image distortion model $f_d^X(X,Y)$ along the horizontal axis and another image distortion model $f_d^Y(X,Y)$ along the vertical axis can be determined according to design parameters of the optical assembly. These image distortion models are similar to (64) and (65), respectively, and are employed in procedure 248 (FIG. 6), in order to distort an image of a three-dimensional object, substantially the same way the optical assembly would distort the image.

Figure 7:
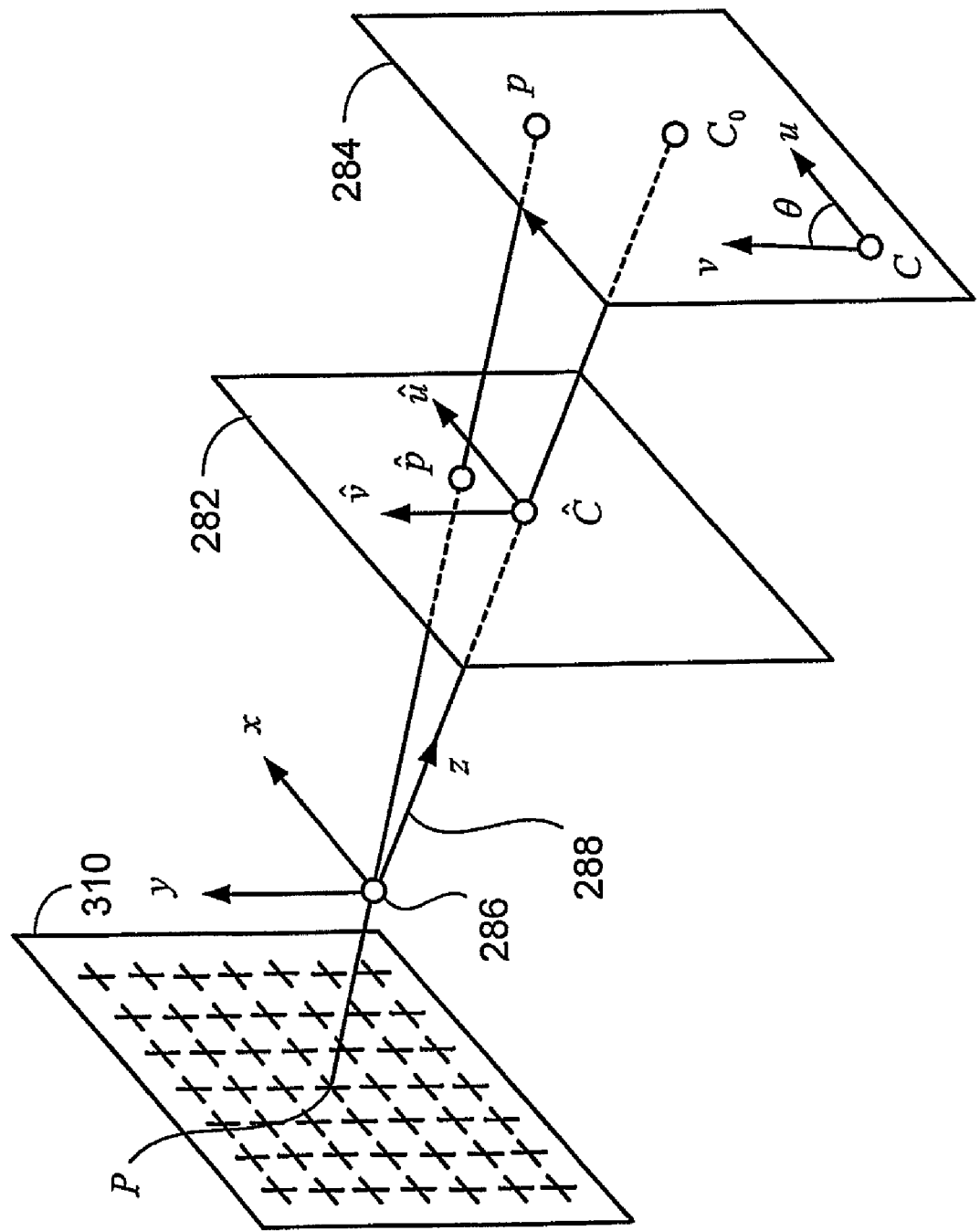
FIG. 7 is a schematic illustration of the relative positions of the image of a point on a target, on a normalized image plane, and on a physical retina image plane.
Figure 10A:
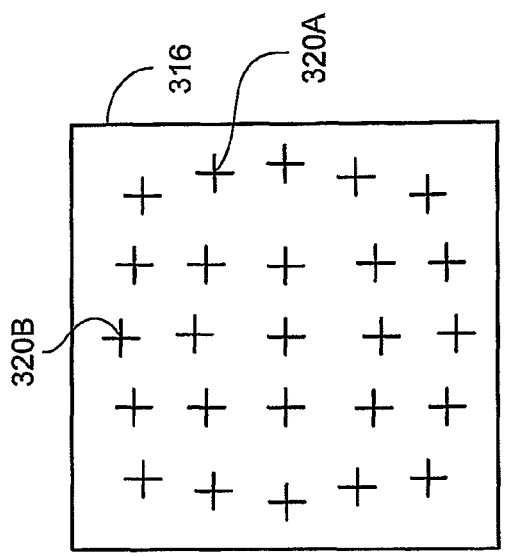
FIG. 10A is a schematic illustration of a first distorted image of the target of FIG. 8, being detected by the image detector of FIG. 9.
Figure 10B:
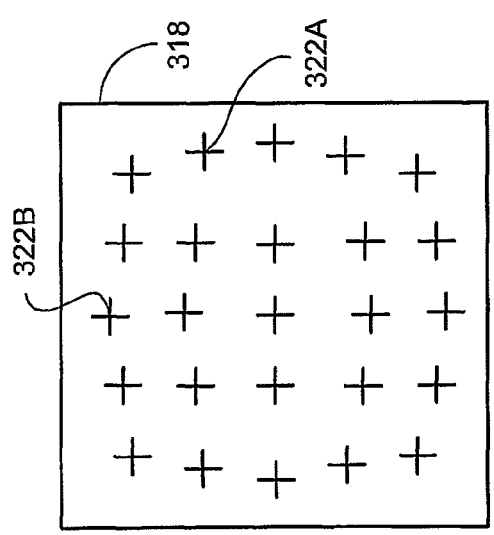
FIG. 10B is a schematic illustration of a second distorted image of the target of FIG. 8, being detected by the image detector of FIG. 9.
Figure 8:
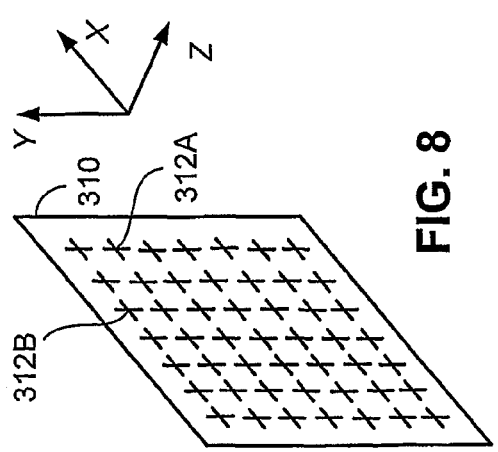
FIG. 8 is a schematic illustration of the target of FIG. 7, which is employed to determine the center of distortion according to the method of FIG. 6.
Figure 9:
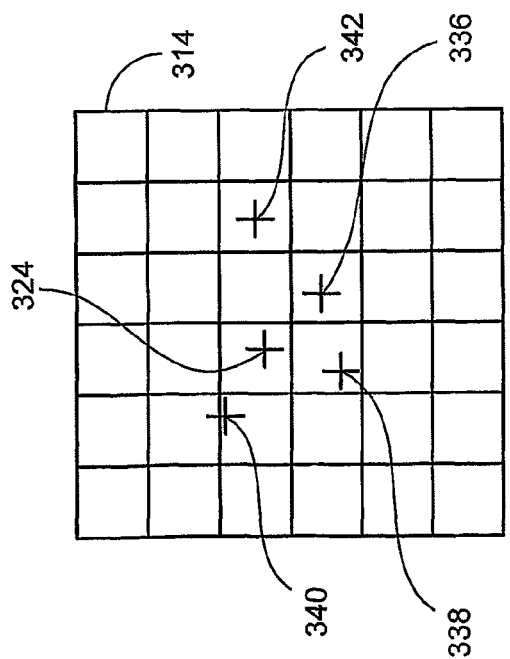
FIG. 9 is a schematic illustration of an image detector, detecting an image of the target of FIG. 8.
Figure 11A:
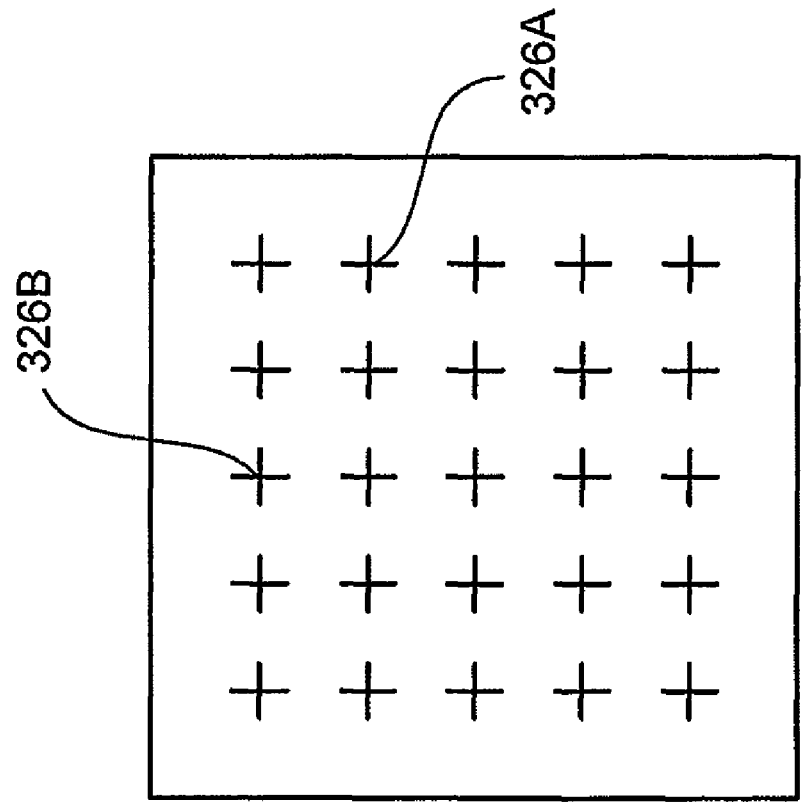
FIG. 11A is a schematic illustration of corrected locations of the detected points of the first distorted image of FIG. 10A.
Figure 11B:
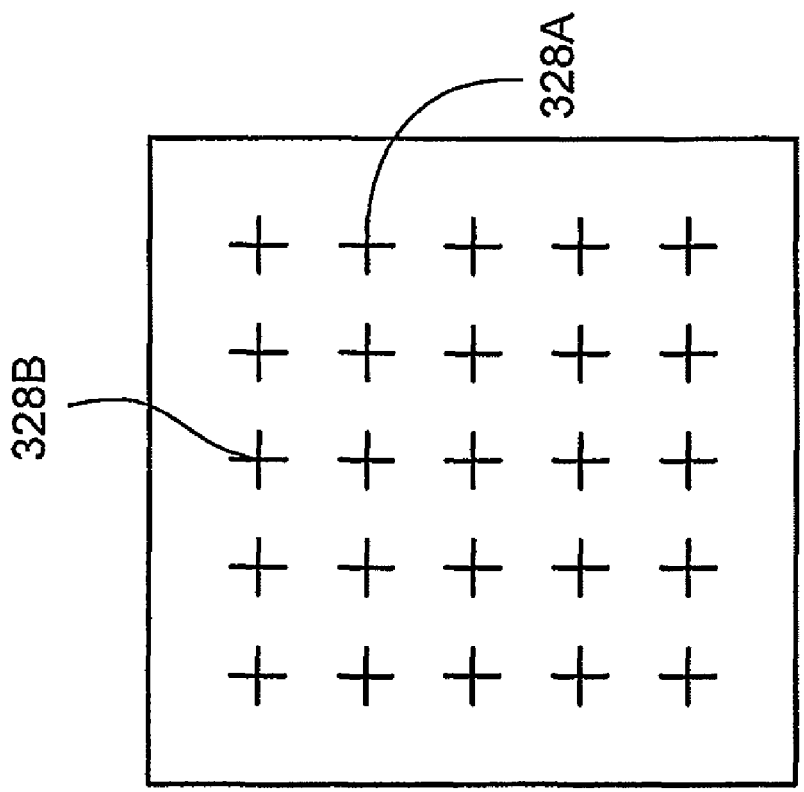
FIG. 11B is a schematic illustration of corrected locations of the detected points of the second distorted image of FIG. 10B.
Figure 12A:
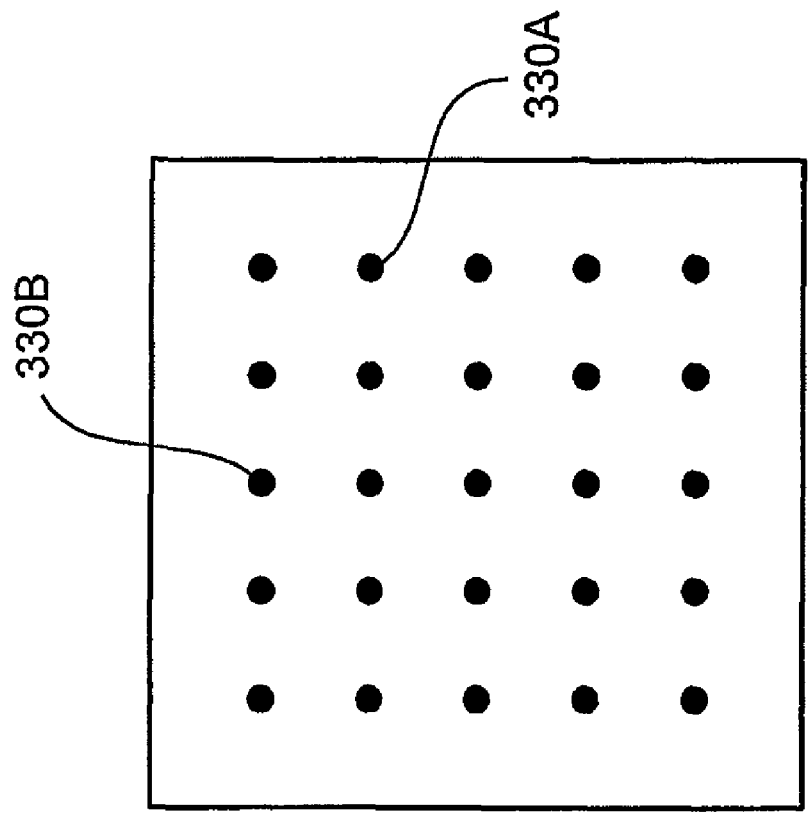
FIG. 12A is a schematic illustration of a first set of calculated points, obtained by applying a first transformation model to the three-dimensional coordinates of the points of the target of FIG. 8.
Figure 12B:
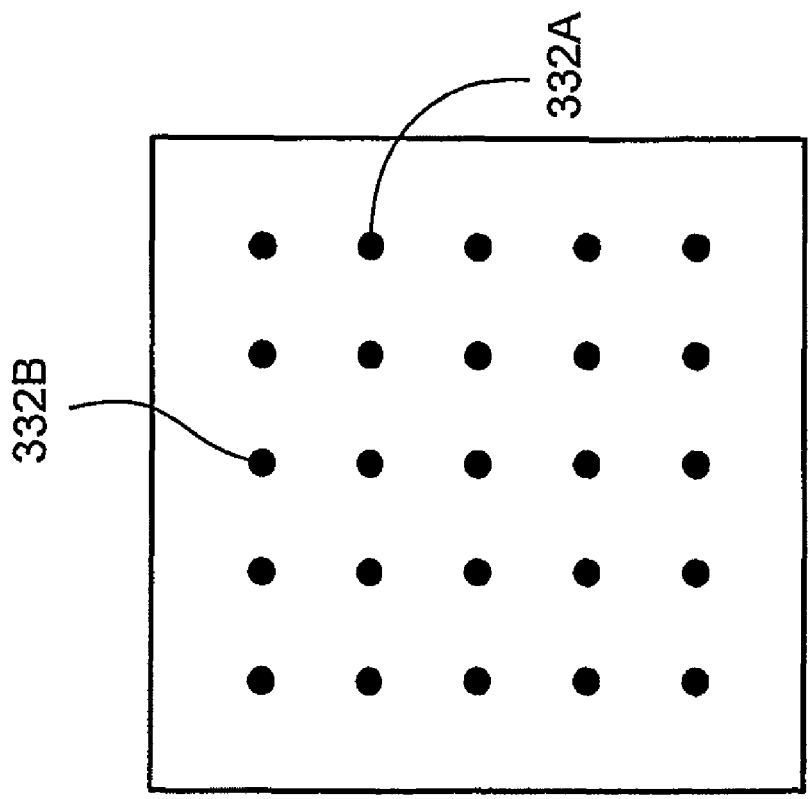
FIG. 12B is a schematic illustration of a second set of calculated points, obtained by applying a second transformation model to the three-dimensional coordinates of the points of the target of FIG. 8.
Figure 13A:
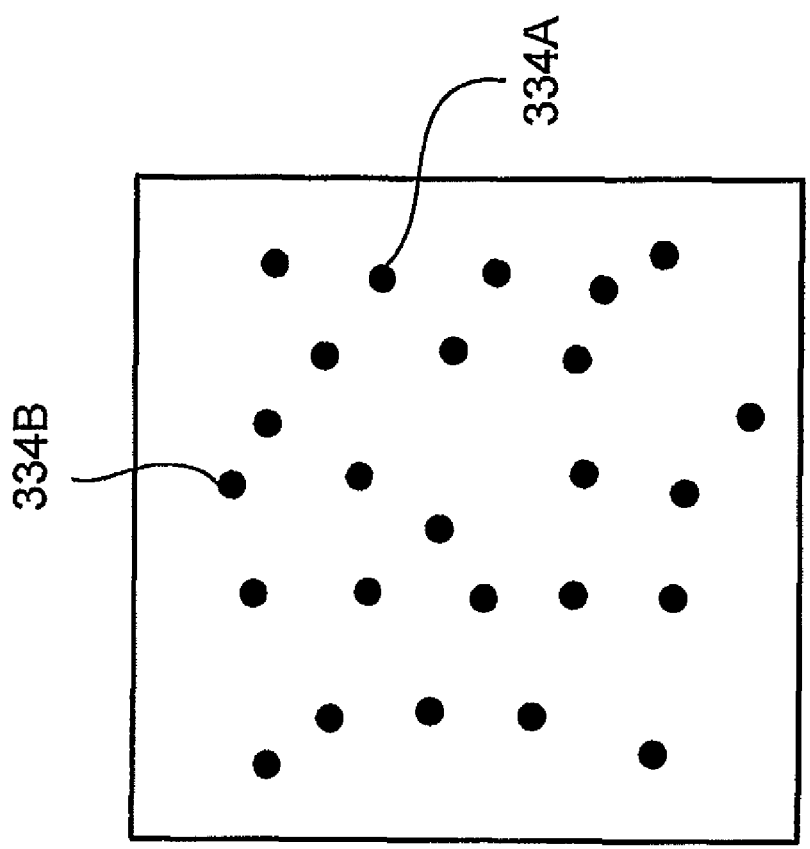
FIG. 13A is a schematic illustration of a first set of distorted calculated points, respective of the points of the target of FIG. 8.
Figure 13B:
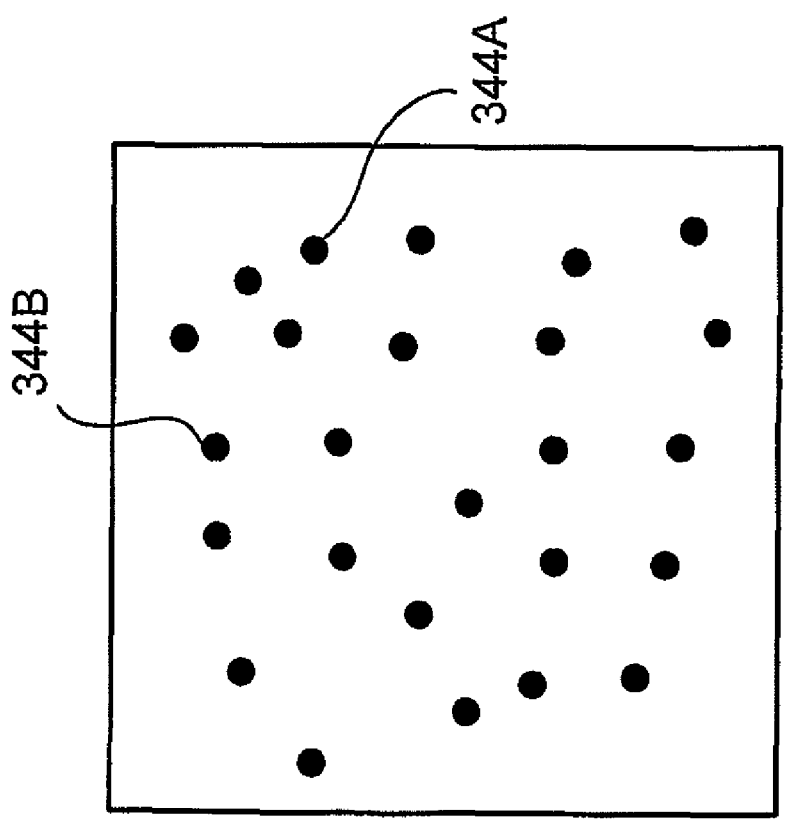
FIG. 13B is a schematic illustration of a second set of distorted calculated points, respective of the points of the target of FIG. 8.
Figure 14A:
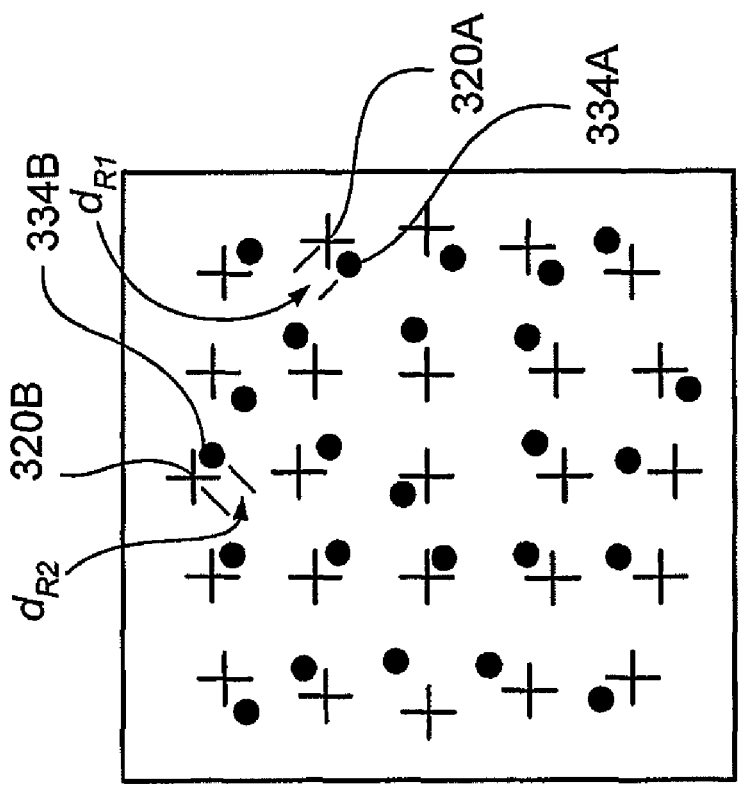
FIG. 14A is a schematic illustration of the distances between the points of the first distorted image of FIG. 10A, and the first set of distorted calculated points of FIG. 13A.
Figure 14B:
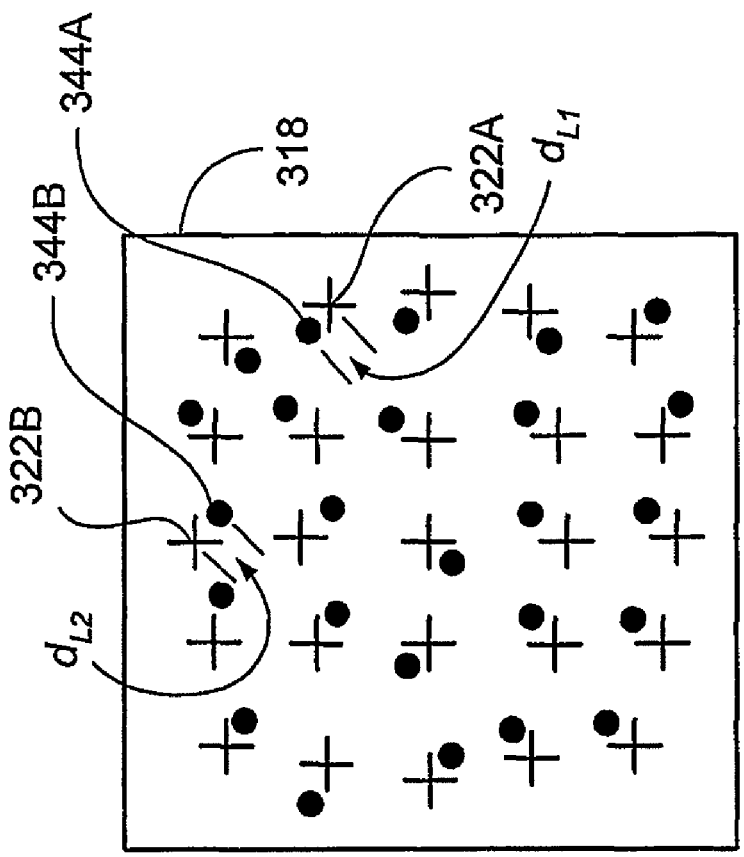
FIG. 14B is a schematic illustration of the distances between the points of the second distorted image of FIG. 10B, and the second set of distorted calculated points of FIG. 13B.

Reference is now made to FIGS. 6, 7, 8, 9, 10A, 10B, 11A, 11B, 12A, 12B, 13A, 13B, 14A and 14B. FIG. 6 is a schematic illustration of a method for determining a center of distortion of a first distorted image and a second distorted image respective of an optical device, operative in accordance with a further embodiment of the disclosed technique. FIG. 7 is a schematic illustration of the relative positions of the image of a point on a target generally referenced 310, on a normalized image plane generally referenced 282, and on a physical retina image plane generally referenced 284. FIG. 8 is a schematic illustration of the target of FIG. 7, which is employed to determine the center of distortion according to the method of FIG. 6. FIG. 9 is a schematic illustration of an image detector generally referenced 314, detecting an image of the target of FIG. 8. FIG. 10A is a schematic illustration of a first distorted image generally referenced 316, of the target of FIG. 8, being detected by the image detector of FIG. 9. FIG. 10B is a schematic illustration of a second distorted image generally referenced 318, of the target of FIG. 8, being detected by the image detector of FIG. 9. FIG. 11A is a schematic illustration of corrected locations of the detected points of the first distorted image of FIG. 10A. FIG. 11B is a schematic illustration of corrected locations of the detected points of the second distorted image of FIG. 10B. FIG. 12A is a schematic illustration of a first set of calculated points, obtained by applying a first transformation model to the three-dimensional coordinates of the points of the target of FIG. 8. FIG. 12B is a schematic illustration of a second set of calculated points, obtained by applying a second transformation model to the three-dimensional coordinates of the points of the target of FIG. 8. FIG. 13A is a schematic illustration of a first set of distorted calculated points, respective of the points of the target of FIG. 8. FIG. 13B is a schematic illustration of a second set of distorted calculated points, respective of the points of the target of FIG. 8. FIG. 14A is a schematic illustration of the distances between the points of the first distorted image of FIG. 10A, and the first set of distorted calculated points of FIG. 13A. FIG. 14B is a schematic illustration of the distances between the points of the second distorted image of FIG. 10B, and the second set of distorted calculated points of FIG. 13B. The method according to FIG. 6 is performed during calibration of optical device 100 (FIG. 2).

In procedure 240, the two-dimensional coordinates of a plurality of known points of a target are determined, in a first distorted image and in a second distorted image of the target. With reference to FIG. 8, target 310 is a substantially flat plate which includes a plurality of points 312A and 312B. The position of points 312A and 312B are known in a three-dimensional world coordinate system X, Y, Z. Points 312A and 312B can be a plurality of points of intersection of a plurality of intersecting horizontal and vertical lines (i.e., a grid). With reference to FIGS. 9, 10A, and 10B, image detector 314 detects first distorted image 316 and second distorted image 318, of target 310. Processor 108 (FIG. 2) determines the two-dimensional coordinates of points 320A and 320B, respectively, in first distorted image 316, respective of points 312A and 312B, respectively. Processor 108 determines the two-dimensional coordinates of points 322A, and 322B, respectively, in second distorted image 318, respective of points 312A and 312B, respectively.

Instead of image detector 314, a first image detector (not shown) and a second image detector (not shown), can be employed to detect the first distorted image and the second distorted image, respectively. The image distortions in each of first distorted image 316 and second distorted image 318, can be caused by the optical elements of the optical assembly and apertures 102 (FIG. 2) and 104. Image distortions can be caused by manufacturing errors, for example, aberrations in lenses.

In procedure 242, the locations of the two-dimensional coordinates are corrected, according to an image distortion correction model, whose origin is selected as an image detector center. With reference to FIG. 9, the center of image detector 314 is referenced 324. With reference to FIGS. 10A and 11A, processor 108 corrects the location of points 320A and 320B, to locations 326A and 326B, respectively. With reference to FIGS. 10B and 11B, processor 108 corrects the location of points 322A and 322B, to locations 328A and 328B, respectively. Processor 108 corrects these locations according to the image distortion correction model defined by (64) and (65), wherein $x_0$ and $y_0$ in (64) and (65) are selected as center 324 of image detector 314.

In case two image detectors (not shown) are employed to detect first distorted image 316 and second distorted image 318, distortion correction models (64) and (65) are applied to each of first distorted image 316 and second distorted image 318, with respect to the center of the respective image detector. If the optical models of the two image detectors are substantially the same, and the two image detectors are substantially identical, then the coefficients of (64) and (65) for the two image detectors are substantially the same. Otherwise, a different distortion correction model is employed to determine the center of distortion for each image detected by each image detector.

In procedure 244, a first transformation model and a second transformation model are determined, according to the respective corrected locations, and according to the three-dimensional coordinates of the known points. The term "transformation model" herein below, refers to the first transformation model as well as to the second transformation model.

The transformation model can be a projection matrix $$M=K[Rt] \quad (70)$$

whose elements are determined by solving (71)

$$PM=0 \quad (71)$$

where K are the intrinsic parameters of image detector 314, R and t are the extrinsic parameters of image detector 314 (i.e., rotation and translation), and $$P = \begin{bmatrix} P_1^T & 0^T & -u_1 P_1^T \\ 0^T & P_1^T & -v_1 P_1^T \\ \ldots & \ldots & \ldots \\ P_n^T & 0^T & -u_n P_n^T \\ 0^T & P_n^T & -v_n P_n^T \end{bmatrix} \quad (72)$$

(71) can be solved according to linear least squares method, nonlinear least squares method, and the like. The projection matrix of (70) includes both the intrinsic parameters and the extrinsic parameters of image detector 314.

With reference to FIG. 7, a normalized image plane 282 is substantially parallel with a physical retina image plane 284. Normalized image plane 282 is located between a point P of target 310, and physical retina image plane 284. Normalized image plane 282 is located at a unit distance from target 310. Physical retina image plane 284 is located at a focal point of target 310 (i.e., a distance f≠1 from target 310). Point P is similar to points 312A (FIG. 8) and 312B. Image detector 314 detects an image p of point P on physical retina image plane 284, through a pinhole 286 located at an origin of a world coordinate system x, y, z. A projection of point P on normalized image plane 282 is referenced p̂. Normalized image plane 282 is associated with a normalized coordinate system û,v̂ whose origin is located at Ĉ, where an optical axis 288 passes through. The projection of pinhole 286 through point Ĉ on physical retina image plane 284, and along optical axis 288, is referenced by a principle point $C_0$. The normalized coordinate system is defined by $$\begin{cases} \hat{u} = \frac{x}{z} \\ \hat{v} = \frac{y}{z} \end{cases} \Leftrightarrow \hat{p} = \frac{1}{z}(Id \ 0)\begin{pmatrix} P \\ 1 \end{pmatrix} \quad (73)$$

where Id is a 3×3 unity matrix, and where by definition, $$\hat{p}=(\hat{u}\hat{v}1)^T \quad (74)$$

An origin of the coordinate system of image detector 314 is located at a point C of physical retina image plane 284. Point C is generally located at a corner of physical retina image plane 284, and does not coincide with the principle point $C_0$. Due to the intrinsic parameters, the coordinates (u, v) of point p can be written as, $$\begin{cases} u = \alpha\frac{x}{z} - \alpha\cot\theta\frac{y}{z} + u_0 \\ v = \frac{\beta}{\sin\theta}\frac{y}{z} + v_0 \end{cases} \quad (75)$$

where, $$\alpha = kf \quad (76)$$

and $$\beta = lf \quad (77)$$

where f is a distance expressed for example, in meters, a pixel has dimensions $$\frac{1}{k} \times \frac{1}{l},$$

where k and l are in units of for example, pixel per meter, $u_0$ and $v_0$ define the location of the principle point $C_0$ in the coordinate system of physical retina image plane 282, and θ defines the skewed angle between the coordinate system of image detector 314 and a normalized coordinate system û,v̂, due to manufacturing errors.

Each of coordinates $u_1, v_1, u_n, v_n$ in (72) is given by the left sides of (75), which define the coordinates of the projections of different points on target 310, similar to point P, on physical retina image plane 284, as detected by image detector 314. Processor 108 can determine the coordinates $u_1, v_1, u_n, v_n$ by employing a feature extraction algorithm. Alternatively, a user can enter the coordinates $u_1, v_1, u_n, v_n$ to processor 108, by selecting each of the points 312A (FIG. 8) and 312B, via user interface 112 (e.g., by employing a pointing device and a display). $P_n$ in (72) designates the known actual three-dimensional coordinates of point P on target 310, and by definition is given by, $$P_n=(x_n y_n z_n 1)^T \quad (78)$$

Projection matrix M can be represented by, $$M = \begin{bmatrix} \alpha(r_{11} + \cot\theta r_{21}) + u_0 r_{31} & \frac{\beta}{\sin\theta}r_{21} + v_0 r_{31} & r_{31} \\ \alpha(r_{12} + \cot\theta r_{22}) + u_0 r_{32} & \frac{\beta}{\sin\theta}r_{22} + v_0 r_{32} & r_{32} \\ \alpha(r_{13} + \cot\theta r_{23}) + u_0 r_{33} & \frac{\beta}{\sin\theta}r_{23} + v_0 r_{33} & r_{33} \\ \alpha(t_x - \cot\theta t_y) + u_0 t_z & \frac{\beta}{\sin\theta}t_y + v_0 t_z & t_z \end{bmatrix}^T \quad (79)$$

where $r_{11}, r_{12}, r_{13}, r_{21}, r_{22}, r_{23}, r_{31}, r_{32}, r_{33}$ are the rotation parameters and $t_x, t_y, t_z$ are the translation parameters. Thus, processor 108 determines the first transformation model according to the coordinates of the corrected locations 326A (FIG. 11A) and 326B of points 320A (FIG. 10A) and 320B given by (75), and the known three-dimensional coordinates of points 312A (FIG. 8) and 312B given by (78). Likewise, processor 108 determines the second transformation model according to the coordinates of the corrected locations 328A (FIG. 11B) and 328B of points 322A (FIG. 10B) and 322B given by (75), and the known three-dimensional coordinates of points 312A (FIG. 8) and 312B given by (78). The coefficients of M in (70) are determined by solving a system of 2 n homogeneous linear equations according to (71), where n is the number of selected points of intersection on the calibration object.

In procedure 246, a first set of calculated points and a second set of calculated points are determined, by applying the first transformation model and the second transformation model, respectively, to the three-dimensional coordinates. With reference to FIG. 8, processor 108 applies the first transformation model given by (79) to the three-dimensional coordinates of points 312A (FIG. 8) and 312B, thereby determining calculated points 330A (FIG. 12A) and 330B, respective of points 312A (FIG. 8) and 312B. The coordinates of calculated points 330A and 330B represent the projections of points 312A and 312B on image detector 314 (FIG. 9), which would be detected by an optical device (not shown), which is substantially devoid of any image distortions, as if the optical assembly was free of manufacturing errors. Likewise, processor 108 applies the second transformation model given by (79) to the three-dimensional coordinates of points 312A and 312B, thereby determining calculated points 332A (FIG. 12B) and 332B, respective of points 312A (FIG. 8) and 312B.

In procedure 248, a first set of distorted calculated points and a second set of distorted calculated points are determined, by applying an image distortion model to the first set of calculated points and to the second set of calculated points, respectively, about a set of auxiliary centers different than the image detector center. With reference to FIG. 13A, processor 108 determines distorted calculated points 334A and 334B, by applying the image distortion models $f_d^X(X,Y)$ and $f_d^Y(X,Y)$, as described herein above, to calculated points 330A (FIG. 12A) and 330B, respectively, while setting $x_0$ and $y_0$ to an auxiliary center 336 (FIG. 9) of image detector 314, other than center 324. The coordinates of distorted calculated points 334A and 334B represents the coordinates of calculated points 330A (FIG. 12A) and 330B, respectively, which a distorting optical device would produce. Processor 108 determines other distorted calculated points by applying the image distortion models, to calculated points 330A (FIG. 12A) and 330B, while setting $x_0$ and $y_0$ to another auxiliary center 338 (FIG. 9) of image detector 314, other than center 324.

In the same manner, processor 108 determines additional distorted calculated points, while setting $x_0$ and $y_0$ to auxiliary centers 340 (FIG. 9) and 342 of image detector 314, other than center 324. With reference to FIG. 13B, processor 108 determines distorted calculated points 344A and 344B, by applying the image distortion models $f_d^X(X,Y)$ and $f_d^Y(X,Y)$, to calculated points 332A (FIG. 12B) and 332B, respectively, while setting $x_0$ and $y_0$ to auxiliary center 336 (FIG. 9) of image detector 314, other than center 324. Processor 108 determines additional distorted calculated points according to calculated points 332A (FIG. 12B) and 332B, while each time setting $x_0$ and $y_0$ to each of the auxiliary centers 336, 338, 340, and 342.

In procedure 250, a first set of distances between the respective points in the first distorted image and in the first set of distorted calculated points are determined. With reference to FIG. 14A, processor 108 determines a distance $d_{R1}$ between the coordinates of point 320A (also illustrated in FIG. 10A) and the coordinates of distorted calculated point 334A (also illustrated in FIG. 13A). Processor 108 further determines a distance $d_{R2}$ between the coordinates of point 320B and the coordinates of distorted calculated point 334B. Processor 108 determines a first representative distance $D_R$ according to the set of distances $d_{R1}$ and $d_{R2}$, for example, by determining a sum of the absolute values of $d_{R1}$ and $d_{R2}$, a sum of the squares of $d_{R1}$ and $d_{R2}$, a median value of $d_{R1}$ and $d_{R2}$ (i.e., a sum of the absolute values of $d_{R1}$ and $d_{R2}$), and the like.

With reference to FIG. 14B, processor 108 determines a distance $d_{L1}$ between the coordinates of point 322A (also illustrated in FIG. 10B) and the coordinates of distorted calculated point 344A (also illustrated in FIG. 13B—procedure 252). Processor 108 further determines a distance $d_{L2}$ between the coordinates of point 322B and the coordinates of distorted calculated point 344B (procedure 252). Processor 108 determines a second representative distance $D_L$ according to the set of distances $d_{L1}$ and $d_{L2}$, for example, by determining a sum of the absolute values of $d_{L1}$ and $d_{L2}$, a sum of the squares of $d_{L1}$ and $d_{L2}$, a median value of $d_{L1}$ and $d_{L2}$, and the like.

In procedure 254, one of the auxiliary centers is selected as the center of distortion of the first distorted image and of the second distorted image, which corresponds to the minimum characteristic value respective of the first set of distances and the second set of distances. Processor 108 determines a characteristic value for example, according to a sum of the first representative distance $D_R$ and the second representative distance $D_L$, a sum of the squares of $D_R$ and $D_L$, a median value of $D_R$ and $D_L$, a median value of $d_{R1}$, $d_{R2}$, $d_{L1}$ and $d_{L2}$, and the like. Processor 108 selects the auxiliary center as the center of distortion of first distorted image 316 (FIG. 10A) and second distorted image 318 (FIG. 10B), which corresponds to a characteristic value which is the smallest among all the rest.

For example, if processor 108 determines that while setting $x_0$ and $y_0$ of the image distortion models $f_d^X(X,Y)$ and $f_d^Y(X,Y)$ to auxiliary center 340 (FIG. 9), the least characteristic value is obtained, then processor 108 determines auxiliary center 340 as the center of distortion for distorted image 316 (FIG. 10A) and distorted image 318 (FIG. 10B).

It is noted that the method for determining the center of distortion described herein above according to FIG. 6, applies to a right image and a left image of an object detected by a single image detector, as well as to those detected by two separate image detectors. In case of two image detectors, a center of distortion is determined with respect to each image detector, while taking into account a first minimum characteristic value respective of the first set of distances and a second minimum characteristic value respective of the second set of distances.

A user can experience a stereoscopic perception of an object, due to the fact that the pupils are separated by a certain distance (i.e., IPD). Each eye detects an image of the object from slightly different view points, and the brain produces a stereoscopic sensation due to this difference (i.e., a shift between the two images). When two differently polarized images of a scene are displayed on a display with a certain shift there between, and a user views the display with an appropriated pair of polarizers, she obtains a stereoscopic perception of the scene.

Applicant has found that the degree by which the user experiences a stereoscopic perception of the scene, is directly proportional to the amount of this shift. Different subjects obtain stereoscopic perception of the same scene, differently. Some are able to detect the difference between the disparity of an image viewed with naked eye, and the disparity of the pair of images displayed by a display (i.e., disparity shift) at a substantially high resolution, while others are very sensitive to this disparity shift (e.g., due to aberrations in the eyes), and very quickly experience fatigue and vision associated complexions, such as headache. According to another aspect of the disclosed technique, there is provided a method to reduce these vision associated complexions, and produce a more comfortable stereoscopic perception for the user.

Figure 15:
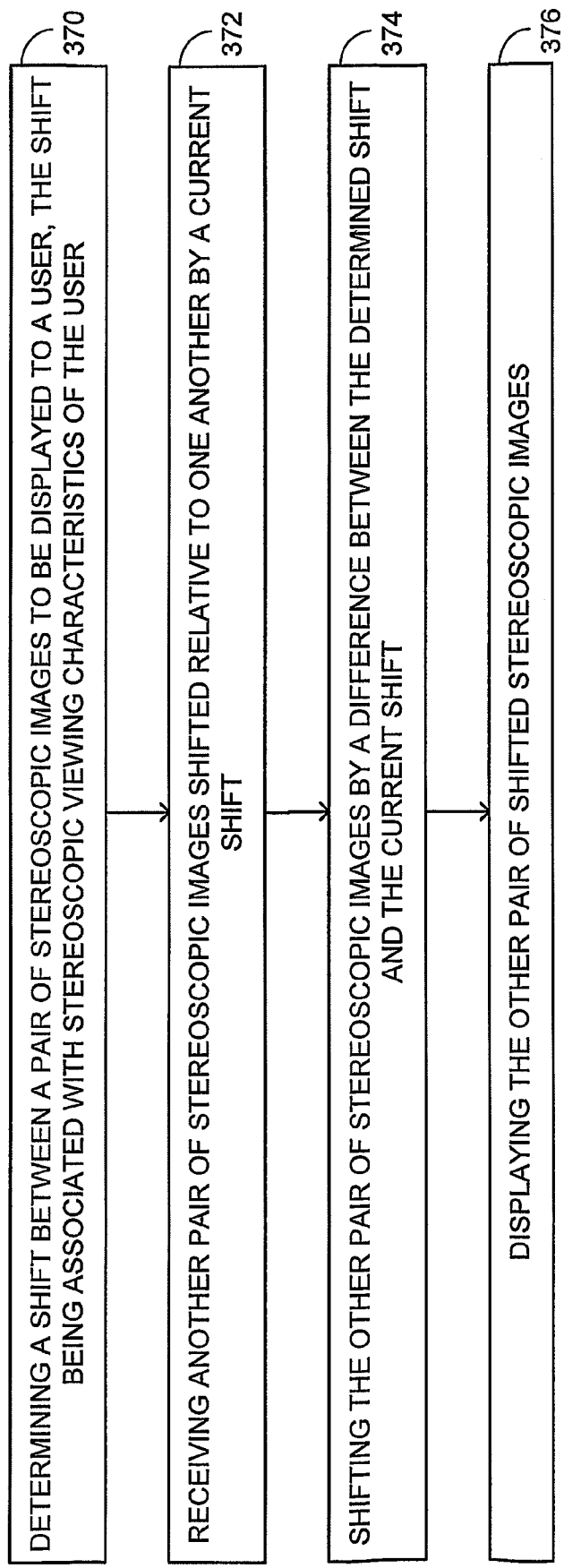
FIG. 15 is a schematic illustration of a method for providing a stereoscopic perception of a scene for a user, such that the vision associated complexions experienced by the user are minimized, operative in accordance with another embodiment of the disclosed technique.

Reference is now made to FIG. 15, which is a schematic illustration of a method for providing a stereoscopic perception of a scene for a user, such that the vision associated complexions experienced by the user are minimized, operative in accordance with another embodiment of the disclosed technique. In procedure 370, a shift between a pair of stereoscopic images to be displayed to a user, is determined, the shift being associated with stereoscopic viewing characteristics of the user. In a cohort study, a pair of stereoscopic images with different shifts are presented to different subjects having different IPD's, and the shift which is suitable for each IPD is determined.

In procedure 372, another pair of stereoscopic images which are shifted relative to one another, is received. A processor receives two stereoscopic images which are shifted relative to one another by a certain amount.

In procedure 374, the other pair of images are shifted by the determined amount. The processor shifts the two images received in procedure 372, by the shift determined in procedure 370, and in procedure 376, a display displays the images which were shifted in procedure 374. Alternatively, a user interface, such as a knob, and the like, can be provided for the user to adjust the amount of the shift in the display. It is noted that shifting the pair of images relative to one another, varies the depth of the image relative to the surface of the display, as perceived by the user.

According to another aspect of the disclosed technique, the local disparity between the right view images and left view images of a stereoscopic image pair, at selected depths, is varied, by moving each pair of the right view image and the left view image at that depth, relative to one another. For this purpose, a three-dimensional reconstructed image is produced according to the stereoscopic image pair, a plurality of depth planes in this three-dimensional reconstructed image are determined, the depth of each pixel in the three-dimensional reconstructed image is determined, and each pixel is associated with a right view image and a left view image at a depth nearest to the depth of that pixel. Moving each of the right view image and the left view image at each depth, relative to one another, changes the disparity at that depth. The values of the disparity variations at different levels, can be adjusted specifically according to the visual characteristics of a given observer, in order to provide a comfortable stereoscopic viewing experience of the image displayed by a display, and reduce stress and eye fatigue.

Reference is now made to FIGS. 16A, 16B, 17A, and 17B. FIG. 16A is a schematic illustration of a first set of depth planes of a first view image of a stereoscopic image pair of an object observed by a first eye of an observer. FIG. 16B is a schematic illustration of a second set of depth planes of a second view image of the stereoscopic image pair, observed by a second eye of the observer. FIG. 17A is a schematic illustration of the depth planes of the first set of depth planes of FIG. 16A, displaced in a first direction relative a first line of sight of the first eye, constructed and operative according to a further embodiment of the disclosed technique. FIG. 17B is a schematic illustration of the depth planes of the second set of depth planes of FIG. 16B, displaced in a second direction, relative to a second line of sight of the second eye, constructed and operative according to another embodiment of the disclosed technique.

Initially, a stereoscopic image pair (i.e., a right view image—not shown and a left view image—not shown) of an object (not shown), is acquired by an image detector (not shown). A processor (not shown) produces a three-dimensional reconstruction of the volume represented by the stereoscopic image pair, and determines a depth value for each of the pixels in the right view image and in the left view image, according to the three-dimensional reconstruction.

With reference to FIG. 16A, the processor determines a plurality of depth planes $400_1$, $400_2$, $400_3$, $400_4$, $400_5$, $400_6$, and $400_N$, substantially perpendicular to a left line of sight (LOS) 402 of a left eye 404 of an observer (not shown). A center (not shown) of each of depth planes $400_1$, $400_2$, $400_3$, $400_4$, $400_5$, $400_6$, and $400_N$, is located on left LOS 402 of a left eye 404 of the observer. Similarly, the right view image can be regarded as a plurality of depth planes $406_1$ (FIG. 16B), $406_2$, $406_3$, $406_4$, $406_5$, $406_6$, and $406_N$. A center (not shown) of each of depth planes $406_1$, $406_2$, $406_3$, $406_4$, $406_5$, $406_6$, and $406_N$, is located on a right LOS 408 of a right eye 410 of the observer. Depth planes $400_1$ and $406_1$ are located at a depth $D_1$. Depth planes $400_2$ and $406_2$ are located at a depth $D_2$. Depth planes $400_3$ and $406_3$ are located at a depth $D_3$. Depth planes $400_4$ and $406_4$ are located at a depth $D_4$. Depth planes $400_5$ and $406_5$ are located at a depth $D_5$. Depth planes $400_6$ and $406_6$ are located at a depth $D_6$. Depth planes $400_N$ and $406_N$ are located at a depth $D_N$.

The processor determines a plurality of depth plane pairs among the depth planes from the right view image and the left view image. For example, the processor determines a first depth plane pair, by associating depth plane $400_1$ with depth plane $406_1$. The processor associates each pixel of the stereoscopic image pair, with a depth plane nearest to that pixel. For example, if a pixel (not shown) is located at a depth $D_{4,5}$ between depths $D_4$ and $D_5$, and closer to depth $D_5$, then the processor associates that pixel with depth plane $400_5$. The processor associates that pixel also with depth plane $406_5$.

With reference to FIG. 17A, the processor moves depth plane $400_1$ in a first direction designated by an arrow 412, relative to left LOS 402, such that a center $414_1$ of depth plane $400_1$ is displaced by a distance $L_1$ from left LOS 402. Similarly, the processor moves each of the depth planes $400_2$, $400_3$, $400_4$, $400_5$, $400_6$, and $400_N$, in direction 412, relative to left LOS 402, in a uniform manner. For example, the processor moves depth plane $400_2$ in direction 412 by a distance $L_2$, and depth plane $400_N$ in direction 412 by a distance $L_N$.

The processor can displace depth planes $400_1$, $400_2$, $400_3$, $400_4$, $400_5$, $400_6$, and $400_N$, in a certain manner (e.g., according to a predetermined function, a lookup table, a discrete criterion or user instructions). In the example set forth in FIG. 16B, the processor displaces depth planes $400_1$, $400_2$, $400_3$, $400_4$, $400_5$, $400_6$, and $400_N$ according to a linearly decreasing function, such that after performing the displacement to depth planes $400_1$, $400_2$, $400_3$, $400_4$, $400_5$, $400_6$, and $400_N$, the centers thereof trace a substantially straight line 416.

With reference to FIG. 17B, the processor moves each of depth planes $406_1$, $406_2$, $406_3$, $406_4$, $406_5$, $406_6$, and $406_N$, in a direction designated by an arrow 418, relative to right LOS 408, such that each center (not shown) of the respective depth plane, is displaced according to a predetermined discrete criterion. For example, the processor moves depth plane $406_1$ by a distance $L_3$ from right LOS 408, in direction 418, depth plane $406_2$ by a distance $L_4$ from right LOS 408, in direction 418, and depth plane $406_N$ by a distance $L_M$ from right LOS 408, in direction 418. In the example set forth in FIG. 17B, the predetermined function is a parabolic increasing function (i.e., a non-linear function). The centers of depth planes $406_1$, $406_2$, $406_3$, $406_4$, $406_5$, $406_6$, and $406_N$, trace a parabola 420. In this manner, the processor moves each pair of the right view image and the left view image, at each depth, relative to one another, thereby changing the disparity at that depth (i.e., local disparity).

For example, the local disparity of the stereoscopic image pair at depth $D_1$ is changed by a distance equal to the difference between $L_1$ and $L_3$. The local disparity of the stereoscopic image pair at depth $D_2$ is changed by a distance equal to the difference between $L_2$ and $L_4$. The local disparity of the stereoscopic image pair at depth $D_N$ is changed by a distance equal to the difference between $L_N$ and $L_M$.

Alternatively, the direction of arrow 412 can be the same as that of arrow 418. Further alternatively, the predetermined function employed for moving the depth planes of the right view image, can be the same as that employed for moving the depth planes of the left view image. In the example set forth in FIGS. 16A and 16B, the depth planes are substantially flat. It is noted that alternatively, certain ones of the depth planes can be curved.

The displacement of one depth plane in a direction perpendicular to an LOS, relative to the displacement of another depth plane of the same depth plane pair, at the same depth, determines the local disparity of the stereoscopic image pair. By varying the disparity of the stereoscopic image pair in this manner, it is possible to display the stereoscopic image pair for a given observer, such that the observer experiences minimal stress and fatigue, while viewing the stereoscopic image pair, through a viewing device (e.g., stereoscopic glasses).

Figure 18:
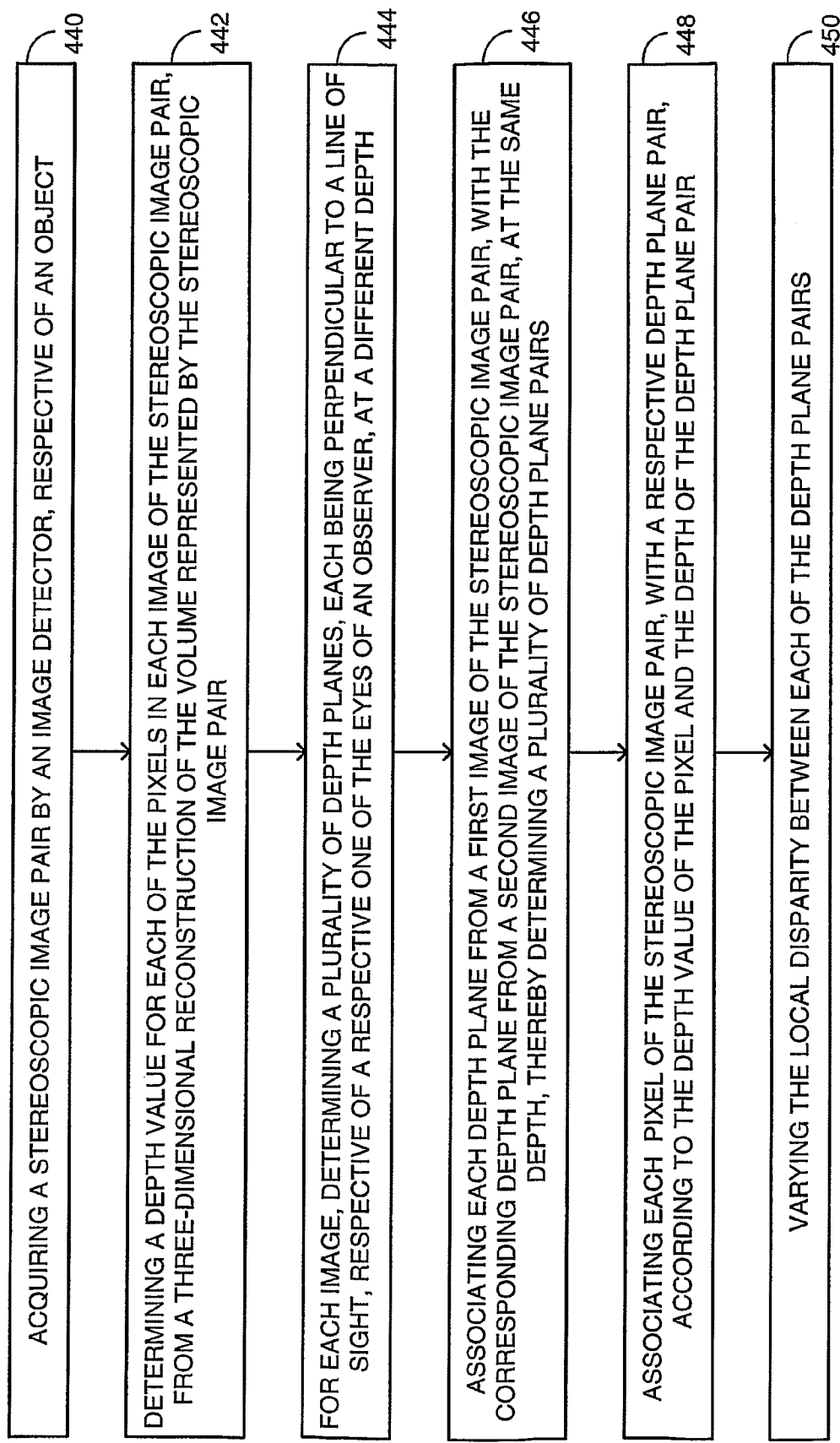
FIG. 18, is a schematic illustration of a method for varying the local disparity between each of a plurality of depth plane pairs, wherein each depth plane defines the depth of a given set of pixels in a given image of a stereoscopic image pair of an object, the method being operative according to a further embodiment of the disclosed technique.

Reference is now made to FIG. 18, which is a schematic illustration of a method for varying the local disparity between each of a plurality of depth plane pairs, wherein each depth plane defines the depth of a given set of pixels in a given image of a stereoscopic image pair of an object, the method being operative according to a further embodiment of the disclosed technique. In procedure 440, a stereoscopic image pair respective of an object, is acquired by an image detector. In procedure 442, a depth value for each of the pixels in each image of the stereoscopic image pair is determined, from a three-dimensional reconstruction of the volume represented by the stereoscopic image pair. The processor produces a three-dimensional reconstruction according to the volume represented by the stereoscopic image pair, and determines the depth of every set of pixels in the stereoscopic image pair, relative to the image detector.

In procedure 444, a plurality of depth planes is determined for each image, each depth plane being perpendicular to an LOS respective of a respective one of the eyes of an observer, at a different depth. With reference to FIG. 16A, the processor determines depth planes $400_1$, $400_2$, $400_3$, $400_4$, $400_5$, $400_6$, and $400_N$, for the left view image of the stereoscopic image pair of the object, wherein each depth plane is located at a different depth. Depth planes $400_1$, $400_2$, $400_3$, $400_4$, $400_5$, $400_6$, and $400_N$, are substantially perpendicular to left LOS 402 of left eye 404. Similarly, the processor determines depth planes $406_1$, $406_2$, $406_3$, $406_4$, $406_5$, $406_6$, and $406_N$, for the right view image of the stereoscopic image pair of the object. Depth planes $406_1$, $406_2$, $406_3$, $406_4$, $406_5$, $406_6$, and $406_N$, are substantially perpendicular to right LOS 408 of right eye 410. For example, the processor determines that depth planes $400_1$ and $406_1$ are located at depth $D_1$, depth planes $400_2$ and $406_2$ are located at depth $D_2$, and that depth planes $400_N$ and $406_N$ are located at depth $D_N$.

In procedure 446, each depth plane from a first image of the stereoscopic image pair, is associated with the corresponding depth plane from a second image of the stereoscopic image pair, at the same depth, thereby determining a plurality of depth plane pairs. With reference to FIGS. 17A and 17B, the processor associates depth plane $400_1$ with depth plane $406_1$, $400_2$ with $406_2$, $400_3$ with $406_3$, $400_4$ with $406_4$, $400_5$ with $406_5$, $400_6$ with $406_6$, and $400_N$ with $406_N$, thereby determining a plurality of depth plane pairs.

In procedure 448, each pixel of the stereoscopic image pair is associated with a respective depth plane pair, according to the depth value of the pixel and the depth of the depth plane pair. In procedure 450, the local disparity between each of the depth plane pairs is varied. With reference to FIGS. 17A and 17B the processor imparts for example, a change in the local disparity at depth $D_1$, equal to the difference between $L_1$ and $L_3$, a change in the local disparity at depth $D_2$, equal to the difference between $L_2$ and $L_4$, and a change in the local disparity at depth $D_N$, equal to the difference between $L_N$ and $L_M$.

It will be appreciated by persons skilled in the art that the disclosed technique is not limited to what has been particularly shown and described hereinabove. Rather the scope of the disclosed technique is defined only by the claims, which follow.

The invention claimed is:

1. Image distortion correction model for correcting an image distortion in a first distorted image and in a second distorted image of a stereoscopic image pair of an object being detected by an optical device, the image distortion correction model being defined by, $$f_c^X(X,Y) = a_{00} + a_{01}x' + a_{20}x'^2 + a_{30}x'^3 + a_{50}x'^5 +$$
$$a_{02}y'^2 + a_{12}x'y'^2 + a_{22}x'^2y'^2 + a_{32}x'^3y'^2 + a_{52}x'^5y'^2$$

in a horizontal direction, and by, $$f_c^Y(X,Y) = c_{01}y' + c_{11}x'y' + c_{21}x'^2y' + c_{30}y'^3 +$$
$$c_{13}x'y'^3 + c_{23}x'^2y'^3 + c_{05}y'^5 + c_{15}x'y'^5 + c_{25}x'^2y'^5$$

in a vertical direction, wherein x' is defined by, $$x' = \frac{(x-x_0)}{x_{max}}$$

and y' is defined by, $$y' = \frac{(y-y_0)}{y_{max}}$$

wherein x and y are the indices of a current pixel in each of said first distorted image and said second distorted image, wherein $x_0$ and $y_0$ define a center of distortion of said first distorted image and of said second distorted image, wherein $x_{max}$ is a distance along said horizontal direction, between a center of a substantially rectangular undistorted calculated image and a side of said substantially rectangular undistorted calculated image, said substantially rectangular undistorted calculated image being respective of said optical device, wherein $y_{max}$ is another distance along said vertical direction, between said center and another side of said substantially rectangular undistorted calculated image, wherein parameters $a_{00}$, $a_{01}$, $a_{20}$, $a_{30}$, $a_{50}$, $a_{02}$, $a_{12}$, $a_{22}$, $a_{32}$, $a_{52}$, $c_{01}$, $c_{11}$, $c_{21}$, $c_{30}$, $c_{13}$, $c_{23}$, $c_{05}$, $c_{15}$ and $c_{25}$ are a set of coefficients which are determined by solving a set of simultaneous Equations for a set of points, each point having the indices x and y, said points being respective of a target being detected by said optical device, the coordinates of said points being known in a global coordinate system, wherein $f_c^X(X,Y)$ designates a horizontal distortion of a point among said points, said horizontal distortion being along said horizontal direction, wherein $f_c^Y(X,Y)$ designates a vertical distortion of said point along said vertical direction, and wherein $x_0$ and $y_0$ are set to an image center of said substantially rectangular undistorted calculated image.

2. Method for determining a disparity value of a disparity of a point on an object being detected by at least one image detector, according to a stereoscopic color image pair of the object, the point being represented by a plurality of pixels in each image of the stereoscopic color image pair, the method comprising the procedures of:

produgin a first set of distortion-corrected color images respective of each of a plurality of colors of said at least one image detector, by applying an image distortion correction model to a first distorted image among said stereoscopic color image pair;

producing a second set of distortion-corrected color images respective of said colors, by applying said image distortion correction model to a second distorted image among said stereoscopic color image pair;

applying a first filter to each of said distortion-corrected color images in said first set and in said second set;

producing a set of modified images by determining at least one interpolated pixel between every two adjacent actual pixels in each row of each of said filtered distortion-corrected color images of said second set of distortion-corrected color images;

determining a distance range between said object and said at least one image detector;

determining a disparity range respective of said stereoscopic color image pair, according to said distance range;

defining a window of a predetermined size around an actual pixel in each of said distortion-corrected color images of said first set of distortion-corrected color images;

defining a plurality of windows around a plurality of central pixels in each of said modified images, the size of each of said windows being the same as said predetermined size, said central pixels having the same row indices respective of the row of said actual pixel, and a plurality of column indices within said disparity range from the column index of said actual pixel;

determining a linear function of an absolute value of vectorial gradients, of another absolute value of vectorial gradient differences, and of the absolute value of the difference between color image intensities, respective of said window and of respective ones of each of said windows;

selecting a minimum value among said linear functions;

selecting a central pixel among said central pixels, as a pixel which matches said actual pixel, said central pixel corresponding to a selected window among said windows, said selected window corresponding to said selected minimum value; and determining said disparity value according to a difference between the coordinates of said actual pixel and of said selected central pixel.

3. The method according to claim 2, wherein each of said first filter and said second filter is a low-pass filter.

4. The method according to claim 2, further comprising the procedures of:

constructing a disparity map respective of a plurality of points of said object, according to a plurality of disparity values respective of said points, and eliminating said disparity value from said disparity map, according to a predetermined criterion.

5. The method according to claim 4, wherein said criterion is selected from the list consisting of:

said disparity value being larger than a certain multiple of a standard deviation of the average disparity of a predetermined number of pixels, in the neighborhood of a pixel in an image detected by an image detector;

a similarity level parameter respective of said procedure of identifying said matching pixel, is larger than a certain multiple of a standard deviation of the average similarity level parameter respective of said predetermined number of said pixels; and a cross validation of a surface normal associated with said pixel being unacceptable.

6. The method according to claim 2, wherein another disparity value is determined, by performing said procedure of selecting said central pixel, while said procedure of defining said window is performed with respect to each of said modified images, and said procedure of defining said windows is performed with respect to said first set of distortion-corrected color images, wherein a calculated disparity value is calculated for said point, when a sum of said disparity value and said other disparity value is within a predetermined range, said calculated disparity value being equal to an average of absolute values of said disparity value and said other disparity value, times the sign of said disparity value, wherein said disparity value is selected for said point, when said sum is equal to zero, wherein a disparity map is constructed respective of said points, according to said disparity value and said calculated disparity value, and wherein said disparity value is eliminated from said disparity map, when said sum is outside said predetermined range.

7. The method according to claim 2, further comprising a procedure of determining the validity of said method by, producing an empirical disparity map according to a plurality of disparity values, producing a controlled disparity map by applying a known disparity function to said first distorted image, and comparing said empirical disparity map with said controlled disparity map.

8. The method according to claim 7, wherein said known disparity function is a parabolic function.

9. Method for determining a center of distortion of a first distorted image and a second distorted image of a target, the method comprising the procedures of:

determining two-dimensional coordinates of a plurality of known points of said target, in said first distorted image and in said second distorted image;

correcting two-dimensional locations of said two-dimensional coordinates, in said first distorted image and in said second distorted image, according to an image distortion correction model, whose origin is selected as an image detector center;

determining a first transformation model and a second transformation model, according to respective ones of said corrected two-dimensional locations, and according to three-dimensional coordinates of said known points;

determining a first set of calculated points and a second set of calculated points, by applying said first transformation model and said second transformation model, respectively, to said three-dimensional coordinates;

determining a first set of distorted calculated points and a second set of distorted calculated points, by applying an image distortion model to said first set of calculated points and to said second set of calculated points, respectively, about a set of auxiliary centers different than said image detector center;

determining a first set of distances between respective points in said first distorted image and said first set of distorted calculated points;

determining a second set of distances between respective points in said second distorted image and said second set of distorted calculated points; and selecting one of said auxiliary centers as said center of distortion, said auxiliary center corresponding to a minimum characteristic value respective of said first set of distances and said second set of distances.

10. The method according to claim 9, wherein each of said first transformation model and said second transformation model is represented by a matrix which is equal to a product of an intrinsic parameter matrix and an extrinsic parameter matrix, said intrinsic parameter matrix being respective of a plurality of intrinsic parameters respective of at least one image detector detecting first distorted image and said second distorted image, and said extrinsic parameter matrix being respective of a plurality of extrinsic parameters respective of said at least one image detector.

11. The method according to claim 9, further comprising the procedures of:
    determining a first representative distance according to said first set of distances; and
    determining a second representative distance according to said second set of distances.

12. The method according to claim 11, wherein said procedure of determining said first representative distance is performed by performing a procedure selected from the list consisting of:
    determining a sum of absolute values of said first set of distances;
    determining a sum of squares of said first set of distances; and
    determining a median value of said first set of distances, and
    wherein said procedure of determining said second representative distance is performed by performing a procedure selected from the list consisting of:
    determining a sum of absolute values of said second set;
    determining a sum of squares of said second set of distances; and
    determining a median value of said second set of distances.

13. The method according to claim 11, wherein said procedure of determining said minimum characteristic value is determined by performing a procedure selected from the list consisting of:
    determining a sum of said first representative distance and said second representative distance;
    determining a sum of squares of said first representative distance and said second representative distance;
    determining a median value of said first representative distance and said second representative distance; and
    determining a median value of first set of distances and said second set of distances.

14. Method for determining a disparity value of a disparity of each of a plurality of points on an object, the method comprising the procedures of:

detecting by a single image detector, a first image of said object through a first aperture, and a second image of said object through a second aperture;

correcting the distortion of said first image, and the distortion of said second image, by applying an image distortion correction model to said first image and to said second image, respectively, thereby producing a first distortion-corrected image and a second distortion-corrected image, respectively;

for each of a plurality of pixels in at least a portion of said first distortion-corrected image representing a selected one of said points, identifying a matching pixel in said second distortion-corrected image; and determining said disparity value according to coordinates of each of said pixels and the respective said matching pixel.

15. The method according to claim 14, further comprising a procedure of determining a confidence percent level respective of said procedure of identifying said matching pixel.

16. The method according to claim 14, further comprising the procedures of:
    reconstructing an image according to said first image and said second image;
    marking a point among said points, on said reconstructed image by a user, via a user interface;
    determining a distance value of a distance from said point to said single image detector, according to said disparity value; and
    displaying said distance value on a display.

17. The method according to claim 16, further comprising the procedures of:
    determining a confidence percent level respective of said distance value; and
    displaying said confidence percent level on said display.

18. The method according to claim 14, further comprising a procedure of determining a geometric parameter respective of said object, according to said disparity value.

19. The method according to claim 18, wherein said geometric parameter is selected from the list consisting of:
    volume;
    mass;
    surface area; and
    the amount by which said object protrudes from a background.

20. The method according to claim 14, wherein said procedure of identifying said matching pixel is performed by a method selected from the list consisting of:
    cross correlation;
    vectorial gradient;
    cross entropy;
    squares of differences;
    absolute value of differences;
    histogram; and
    Kalmagorov distance method.

21. The method according to claim 14, wherein said procedure of identifying said matching pixel is performed according to a parameter of said pixels, said parameter being selected from the list consisting of:
    intensity;
    directional differential of an intensity of each of said pixels along a horizontal axis of said single image detector; and
    directional differential of said intensity along a vertical axis of said single image detector.

22. The method according to claim 14, further comprising the procedures of:
    constructing a disparity map respective of said points, according to said disparity values, and eliminating said disparity value from said disparity map, according to a predetermined criterion.

23. The method according to claim 22, wherein said criterion is selected from the list consisting of:
said disparity value being larger than a certain multiple of a standard deviation of the average disparity of a predetermined number of pixels, in the neighborhood of a pixel in an image detected by said single image detector;
a similarity level parameter respective of said procedure of identifying said matching pixel, is larger than a certain multiple of a standard deviation of the average similarity level parameter respective of said predetermined number of said pixels; and
a cross validation of a surface normal associated with said pixel being unacceptable.

24. The method according to claim 22, further comprising a procedure of determining an interpolated disparity value in place of said eliminated disparity value, by employing an interpolation procedure to interpolate between disparity values adjacent to said eliminated disparity value.

25. The method according to claim 24, wherein said interpolation procedure is a radial basis function.

26. The method according to claim 24, further comprising a procedure of determining the validity of said interpolation procedure by,
producing an empirical disparity map according to said disparity values,
producing a controlled disparity map by applying a known disparity function to said first image, and
comparing said empirical disparity map with said controlled disparity map.

27. The method according to claim 26, wherein said known disparity function is a parabolic function.

28. The method according to claim 14, wherein another disparity value is determined, by performing said procedure of identifying said matching pixel, while said first distortion-corrected image is replaced with said second distortion-corrected image,
wherein a calculated disparity value is calculated for said point, when a sum of said disparity value and said other disparity value is within a predetermined range, said calculated disparity value being equal to an average of absolute values of said disparity value and said other disparity value, times the sign of said disparity value,
wherein said disparity value is selected for said point, when said sum is equal to zero,
wherein a disparity map is constructed respective of said points, according to said disparity value and said calculated disparity value, and
wherein said disparity value is eliminated from said disparity map, when said sum is outside said predetermined range.

29. Method for determining disparity value of a disparity of a point on an object being detected by at least one image detector, according to a stereoscopic color image pair of the object, the point being represented by a plurality of pixels in each image of the stereoscopic color image pair, the method comprising the procedures of:
producing a first set of distortion-corrected color images respective of each of a plurality of colors of said at least one image detector, by applying an image distortion correction model to a first distorted image among said stereoscopic color image pair;
producing a second set of distortion-corrected color images respective of said colors, by applying said image distortion correction model to a second distorted image among said stereoscopic color image pair;
producing a set of modified images by determining at least one interpolated pixel between every two adjacent actual pixels in each row of each of said distortion-corrected color images of said second set of distortion-corrected color images;
determining a distance range between said object and said at least one image detector;
determining a disparity range respective of said stereoscopic color image pair, according to said distance range;
defining a window of a predetermined size around an actual pixel in each of said distortion-corrected color images of said first set of distortion-corrected color images;
defining a plurality of windows around a plurality of central pixels in each of said modified images, the size of each of said windows being the same as said predetermined size, said central pixels having the same row indices respective of the row of said actual pixel, and a plurality of column indices within said disparity range from the column index of said actual pixel;
determining a plurality of color intensity distribution differences between the color intensity distribution of said window and each of said windows;
selecting a minimum color intensity distribution difference among said color intensity distribution differences;
selecting a central pixel among said central pixels, as a pixel which matches said actual pixel, said central pixel corresponding to a selected window among said windows, said selected window corresponding to said minimum color intensity distribution difference; and
determining said disparity value according to a difference between the coordinates of said actual pixel and of said selected central pixel.

30. The method according to claim 29, wherein said procedure of producing said set of modified images is performed by interpolating between every two of said adjacent pixels.

31. The method according to claim 29, wherein said procedure of defining said windows is performed around respective ones of said central pixels, selected as said at least one interpolated pixel.

32. The method according to claim 29, wherein said procedure of selecting said central pixel is performed by:
determining a similarity level parameter between said window associated with each of said first set of distortion-corrected color images, and each of said windows in said modified images; and
selecting said similarity level parameter as the one having the lowest value among said similarity level parameters.

33. The method according to claim 29, wherein each of said windows in said modified images includes selected ones of said at least one interpolated pixels, when a central pixel of said central pixels is an interpolated pixel, and
wherein said windows in said modified images includes said actual pixels, when said central pixel is not an interpolated pixel.

34. The method according to claim 29, further comprising the procedures of:
determining a confidence percent level respective of said procedure of selecting said central pixel; and
reducing said disparity range when said confidence percent level is greater than a predetermined threshold.

35. The method according to claim 29, further comprising a procedure of determining the validity of said method by,
producing an empirical disparity map according to a plurality of disparity values,
producing a controlled disparity map by applying a known disparity function to said first distorted image, and comparing said empirical disparity map with said controlled disparity map.

36. The method according to claim 35, wherein said known disparity function is a parabolic function.

37. Method for varying a local disparity between each depth plane pair of each of a plurality of depth plane pairs, each depth plane of the depth plane pairs defining the depth of a given set of pixels in a first image and a second image of a stereoscopic image pair of an object, relative to an image detector detecting the stereoscopic image pair, the method comprising the procedures of:

determining a pixel depth for each of said pixels, in said first image and in said second image, from a three-dimensional reconstruction of a volume represented by said stereoscopic image pair;

determining a plurality of depth planes at a plurality of different plane depths, for said first image and said second image, each of said depth planes being substantially perpendicular to a line of sight respective of a respective one of the eyes of an observer;

associating each of said depth planes from said first image, with a corresponding depth plane from said second image, at the same plane depth, thereby determining a plurality of depth plane pairs;

associating each of said pixels with a respective one of said depth plane pairs, according to a respective one of said pixel depths, and according to a respective one of said plane depths; and varying said local disparity by moving every pair of said depth plane pairs, relative to one another, in a direction substantially perpendicular to said line of sight.

38. The method according to claim 37, further comprising a preliminary procedure of acquiring said stereoscopic image pair.

39. The method according to claim 37, wherein said procedure of varying is performed by moving a first set of said depth planes associated with said first image, and a second set of said depth planes associated with said second image, in a uniform manner.

* * * * *